US009591031B2

United States Patent
Cartmell et al.

(10) Patent No.: US 9,591,031 B2
(45) Date of Patent: Mar. 7, 2017

(54) LAWFUL INTERCEPTION FOR LOCAL SELECTED IP TRAFFIC OFFLOAD AND LOCAL IP ACCESS PERFORMED AT A NON-CORE GATEWAY

(71) Applicant: INTERDIGITAL PATENT HOLDINGS, INC., Wilmington, DE (US)

(72) Inventors: John Cartmell, Lynbrook, NY (US); Arty Chandra, Manhasset Hills, NY (US); Prabhakar R. Chitrapu, Blue Bell, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/909,123

(22) Filed: Jun. 4, 2013

(65) Prior Publication Data
US 2013/0326631 A1   Dec. 5, 2013

Related U.S. Application Data

(60) Provisional application No. 61/655,370, filed on Jun. 4, 2012, provisional application No. 61/693,615, filed on Aug. 27, 2012.

(51) Int. Cl.
H04L 29/06 (2006.01)
H04W 12/02 (2009.01)
H04W 84/04 (2009.01)

(52) U.S. Cl.
CPC ........... *H04L 63/306* (2013.01); *H04W 12/02* (2013.01); *H04W 84/045* (2013.01)

(58) Field of Classification Search
CPC ......... H04W 8/02; H04W 8/04; H04W 8/042; H04W 8/06; H04W 8/082
See application file for complete search history.

(56) References Cited

U.S. PATENT DOCUMENTS 7,302,702 B2 * 11/2007 Hippelainen .................. 726/13
7,616,597 B2 * 11/2009 Liu ..................... H04L 63/0272
                                                                 370/328

(Continued)

OTHER PUBLICATIONS

3rd Generation Partnership Project (3GPP), TS 33.106, V10.0.0, "3rd Generation Partnership Project; Technical Specification Group Services and System Aspects; 3G security; Lawful Interception requirements (Release 10)", Jun. 2010, 14 pages.

(Continued)

*Primary Examiner* — Gregory Sefcheck
(74) *Attorney, Agent, or Firm* — Condo Roccia Koptiw LLP

(57) ABSTRACT

Systems, methods, and instrumentalities are described to implement reporting of surveillance information associated with a device. A gateway device may intercept a communication associated with the device. The gateway device may route the communication such that the communication bypasses a core network. The gateway device may report information associated with the communication to a core network entity. The gateway device may receive a command message. The command message may include a request for a surveillance status of the device. The gateway device may send a response message. The response message may indicate a surveillance status of the device. The gateway device may receive an activate surveillance signal for the device. The gateway device may receive a deactivate surveillance signal for the device. Upon receiving the deactivate surveillance signal, the gateway device may stop further reporting.

20 Claims, 41 Drawing Sheets

(56) References Cited

U.S. PATENT DOCUMENTS

| | | | | |
|---|---|---|---|---|
| 7,899,039 | B2* | 3/2011 | Andreasen et al. | 370/354 |
| 8,064,909 | B2* | 11/2011 | Spinelli et al. | 455/436 |
| 8,179,903 | B2* | 5/2012 | Gupta et al. | 370/400 |
| 8,274,932 | B2* | 9/2012 | Iovieno et al. | 370/328 |
| 8,331,384 | B2* | 12/2012 | Ghai | H04L 63/0272 370/328 |
| 8,565,150 | B2* | 10/2013 | Hu et al. | 370/328 |
| 8,634,346 | B2* | 1/2014 | Velandy et al. | 370/328 |
| 8,699,462 | B2* | 4/2014 | Spinelli et al. | 370/331 |
| 8,706,089 | B2* | 4/2014 | Di Donato et al. | 455/412.2 |
| 8,711,847 | B2* | 4/2014 | Andreasen et al. | 370/354 |
| 8,724,509 | B2* | 5/2014 | Cheng et al. | 370/254 |
| 8,781,474 | B2* | 7/2014 | Bachmann | H04W 36/0066 455/436 |
| 8,787,331 | B2* | 7/2014 | Liu | H04W 36/0022 370/338 |
| 8,831,566 | B2* | 9/2014 | Liu | H04W 36/0022 370/328 |
| 8,869,235 | B2* | 10/2014 | Qureshi | H04L 63/20 713/150 |
| 8,964,647 | B2* | 2/2015 | Hu et al. | 370/328 |
| 9,107,063 | B2* | 8/2015 | Liu | H04W 36/0022 |
| 9,185,543 | B2* | 11/2015 | Liu | H04W 36/0022 |
| 9,357,581 | B2* | 5/2016 | Eriksson | H04L 29/08729 |
| 9,445,341 | B2* | 9/2016 | Spinelli | H04W 36/36 |
| 2011/0287781 | A1* | 11/2011 | Santoro et al. | 455/456.1 |
| 2012/0076303 | A1* | 3/2012 | O'Leary | 380/270 |
| 2012/0129517 | A1* | 5/2012 | Fox et al. | 455/425 |

OTHER PUBLICATIONS

3rd Generation Partnership Project (3GPP), TS 33.107, V10.4.0, "3rd Generation Partnership Project; Technical Specification Group Services and System Aspects; 3G security; Lawful interception architecture and functions (Release 10)", Jun. 2011, 134 pages.

3rd Generation Partnership Project (3GPP), TS 33.108, V10.4.0, "3rd Generation Partnership Project; Technical Specification Group Services and System Aspects; 3G security; Handover interface for Lawful Interception (LI) (Release 10)", Jun. 2011, 193 pages.

3rd Generation Partnership Project (3GPP), TR 23.859, V0.4.0, "3rd Generation Partnership Project; Technical Specification Group Services and System Aspects; LIPA Mobility and SIPTO at the Local Network; (Release 11)", Jul. 2011, 55 pages.

3rd Generation Partnership Project (3GPP), TS 24.312, V10.4.0, "3rd Generation Partnership Project; Technical Specification Group Core Network and Terminals; Access Network Discovery and Selection Function (ANDSF) Management Object (MO) (Release 10)", Sep. 2011, 156 pages.

3rd Generation Partnership Project (3GPP), TS 23.060, V10.4.0, section 6.13.2 "3rd Generation Partnership Project; Technical Specification Group Services and System Aspects; General Packet Radio Service (GPRS); Service description; Stage 2 (Release 10)", Jun. 2011, 14 pages.

\* cited by examiner

| Message | Description | Direction |
|---|---|---|
| Ready | Indicates the CGW is ready to be configured for LI. | CGW → LEMF |
| Command | Controls LI function within the CGW. | LEMF → CGW |
| Response | CGW response to Command message. | CGW → LEMF |

FIG. 16

| Message | Description | Direction |
|---|---|---|
| IRI Report | Reports IRI events to the LEMF | CGW → LEMF |

FIG. 18

| Message | Description | Direction |
|---|---|---|
| CC Report | Reports CC to the LEMF | CGW → LEMF |

FIG. 20

LAWFUL INTERCEPTION FOR LOCAL SELECTED IP TRAFFIC OFFLOAD AND LOCAL IP ACCESS PERFORMED AT A NON-CORE GATEWAY

CROSS REFERENCE TO RELATED APPLICATIONS

This application claims the benefit of U.S. Provisional Patent Application Nos. 61/655,370 filed on Jun. 4, 2012, and 61/693,615 filed on Aug. 27, 2012, the contents of which are hereby incorporated by reference herein.

BACKGROUND

Lawful interception (LI) may comprise obtaining communications network data pursuant to lawful authority, for example by intercepting data as it traverses one or more communications networks. The network data may be intercepted for purposes of analysis, evidence gathering, or in support of other law enforcement activities. LI may be initiated at the request of at least one interested law enforcement agency (LEA).

In a typical LI architecture, data that traverses a communications network passes through one or more devices resident in a core of the communications network, such that a law enforcement management function (LEMF) that is resident in the core network may direct one or more core network devices to intercept the desired communications network data. LI architectures that rely on data passing through the core network may be incapable of intercepting traffic routed by a local gateway.

SUMMARY

Systems, methods, and instrumentalities are described to implement reporting of information (e.g., surveillance information) associated with a device. A gateway device (e.g., a converged gateway (CGW) or a local gateway (LGW)) may intercept a communication associated with the device. The gateway device may route the communication such that the communication bypasses a core network (e.g., an evolved packet core (EPC) network). The gateway device may report information associated with the communication to a core network entity. The information may include at least one of an intercept related information (IRI) event or a content of communications (CC) data. The gateway device may send IRI event information via an X2 interface. The gateway device may send CC data via an X3 interface.

Core network entities to which the information may be reported may include, for example, a secure gateway (SeGW), a law enforcement management function (LEMF), or a lawful interception functions (LI functions). The LI functions may include an LEMF, which may be a part of LEA. The reporting gateway device may be located outside the core network. When the gateway device reports to a secure gateway, the information associated with the communication may be reported via a secure tunnel, e.g., an internet protocol security (IPsec) tunnel.

The gateway device may receive a command message. The command message may include a request for a surveillance status of the device. The gateway device may send a response message. The response message may indicate a surveillance status of the device. The gateway device may receive an activate surveillance signal for the device. The gateway device may report information relating to the device (e.g., relating to a communication to/from the device) to a core network entity. The gateway device may receive a deactivate surveillance signal for the device. Upon receiving the deactivate surveillance signal, the gateway device may stop further reporting.

BRIEF DESCRIPTION OF THE DRAWINGS

A more detailed understanding may be had from the following description, given by way of example in conjunction with the accompanying drawings.

FIG. 16 is a diagram illustrating an example of X1-1 interface messages.

FIG. 18 is a table illustrating an example X2 interface messages.

FIG. 20 is a table illustrating an example X3 interface messages.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate message charts, which are meant to be exemplary. Other embodiments may be used. The order of the messages may be varied where appropriate. Messages may be omitted if not needed, and, additional flows may be added.

Figure 1A:
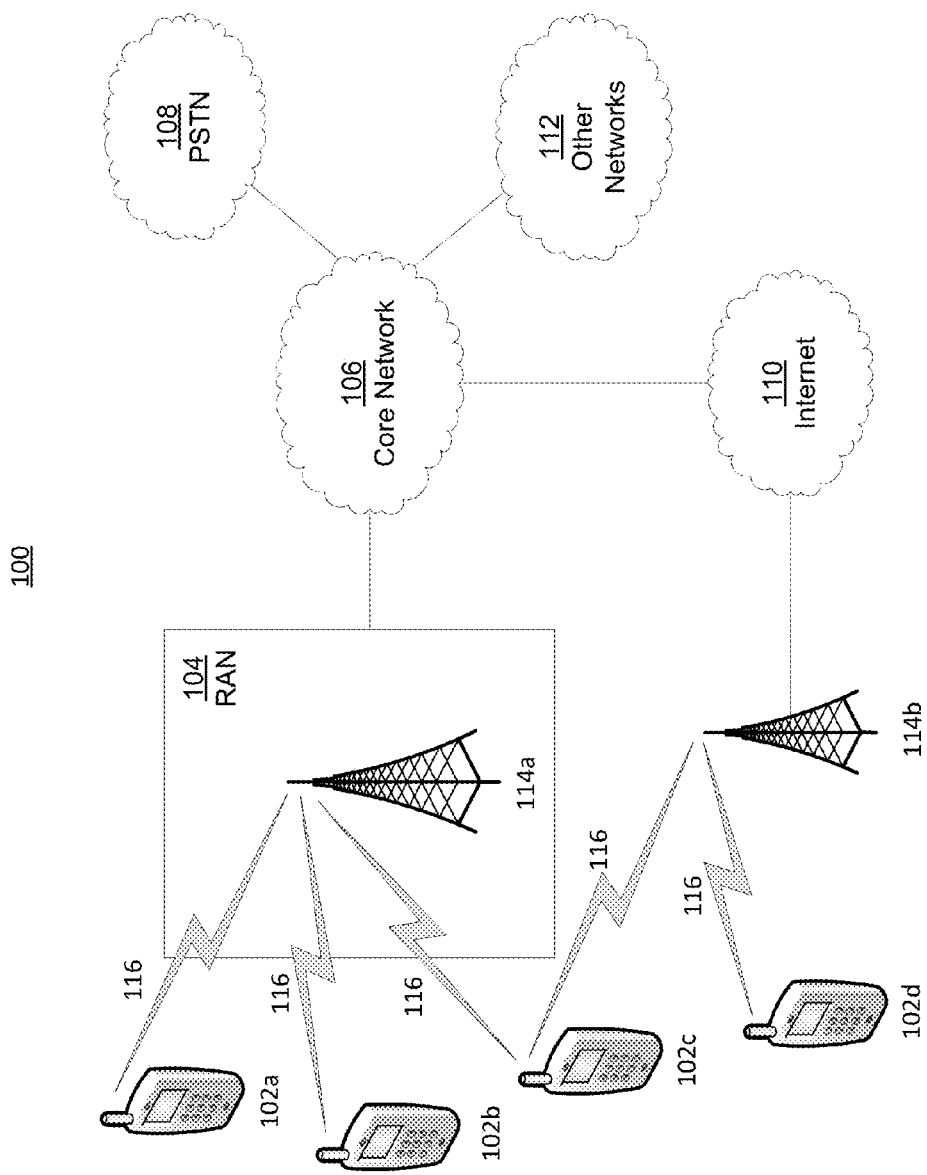
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite.

The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
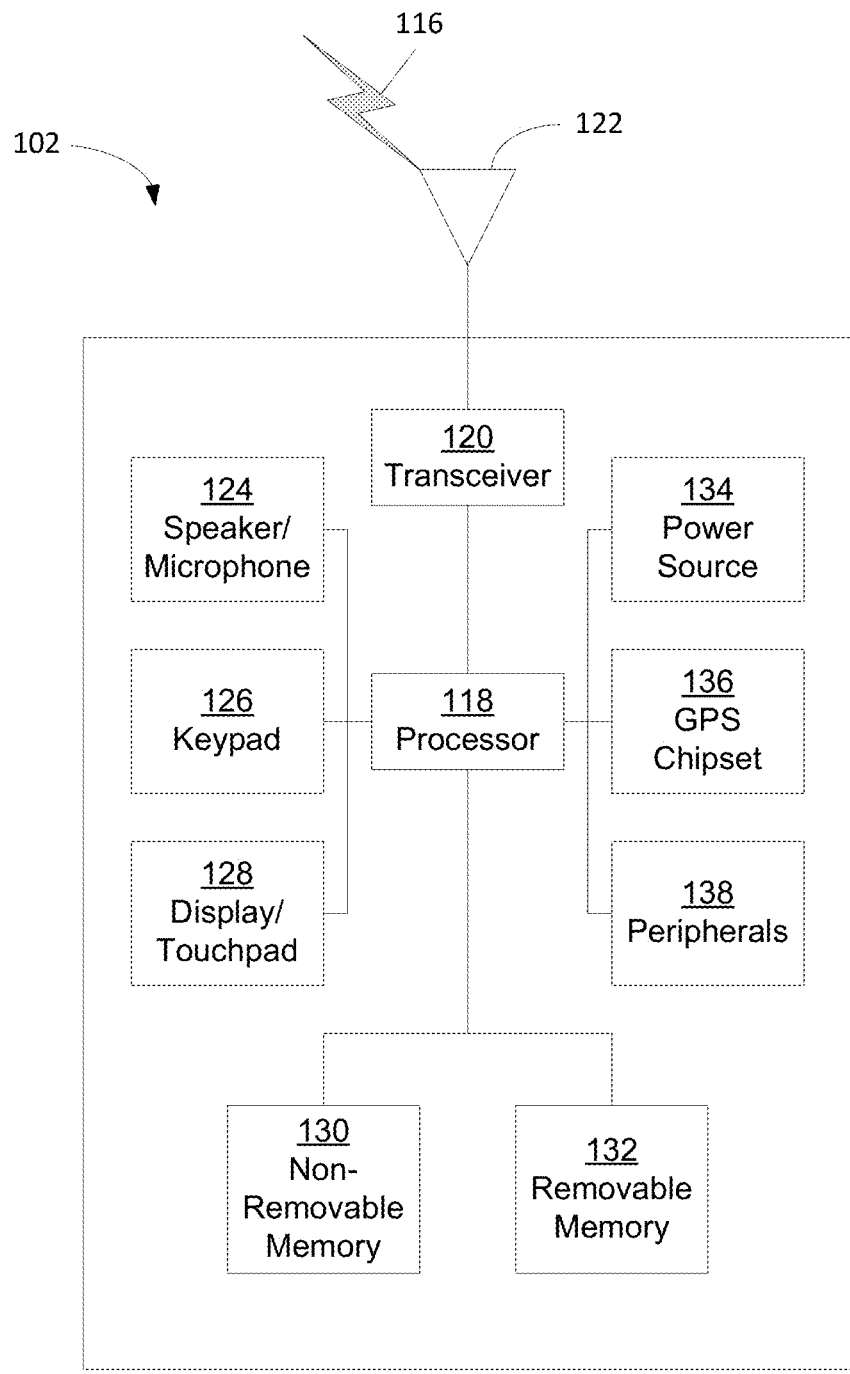
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
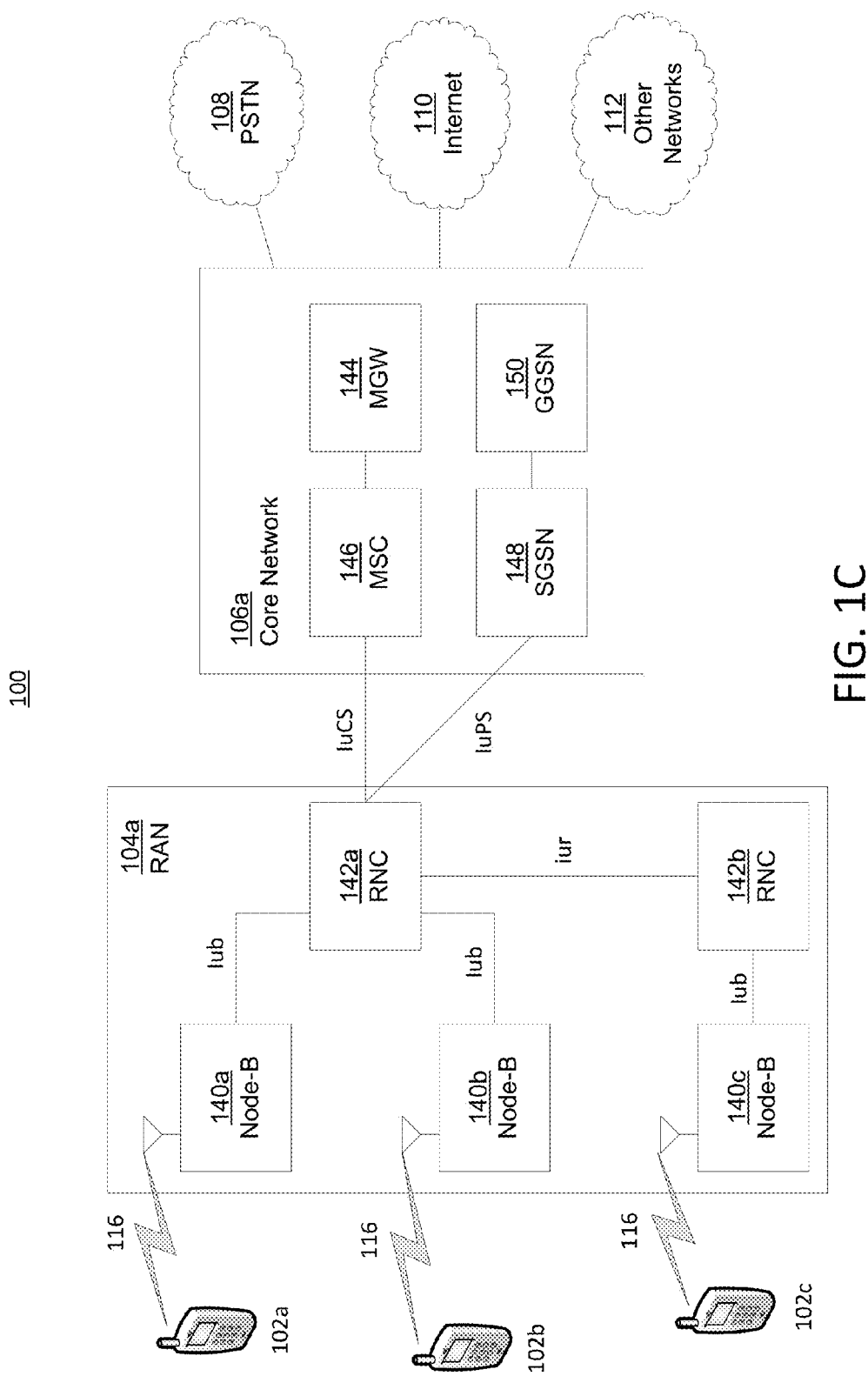
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
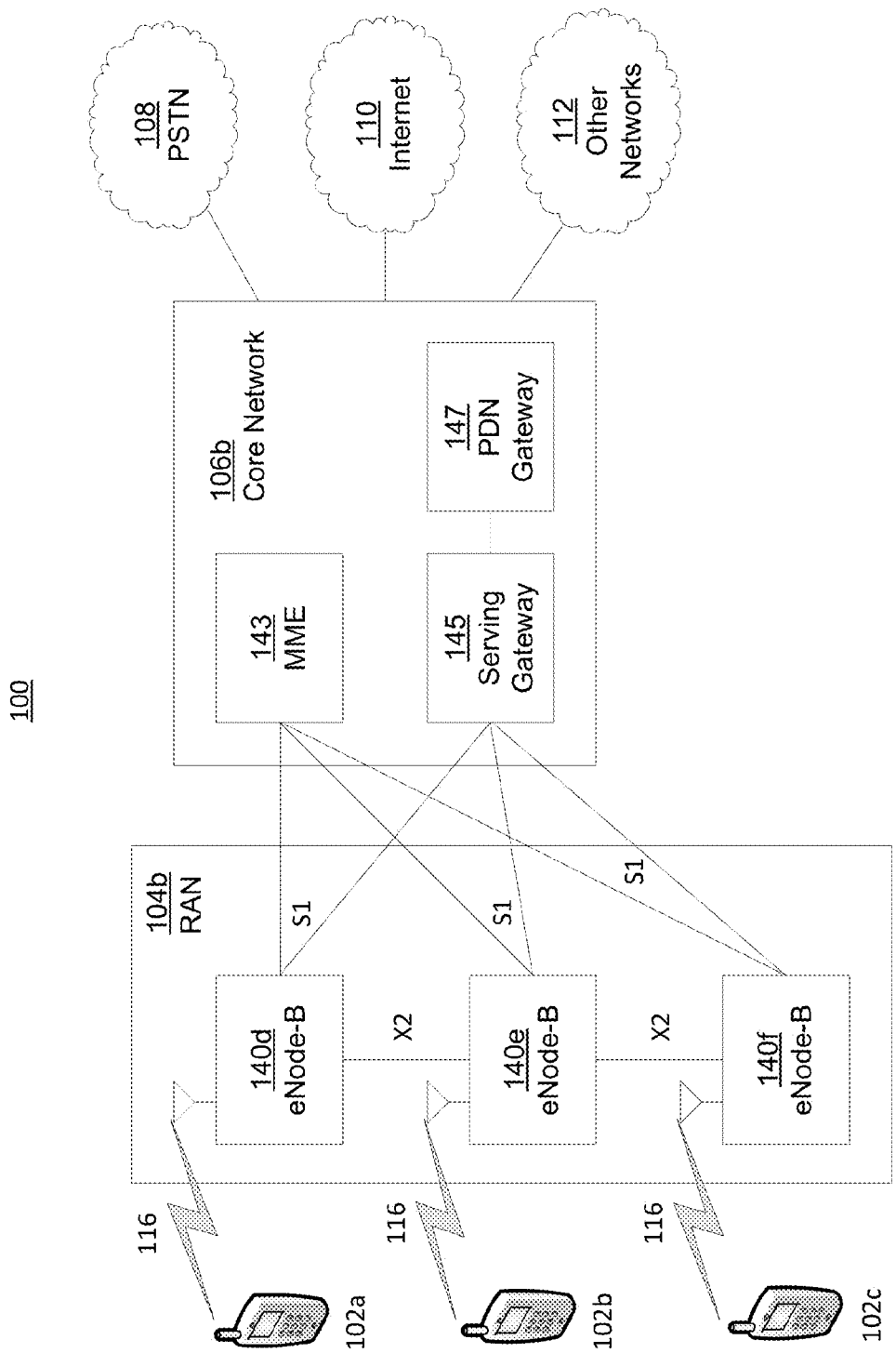
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
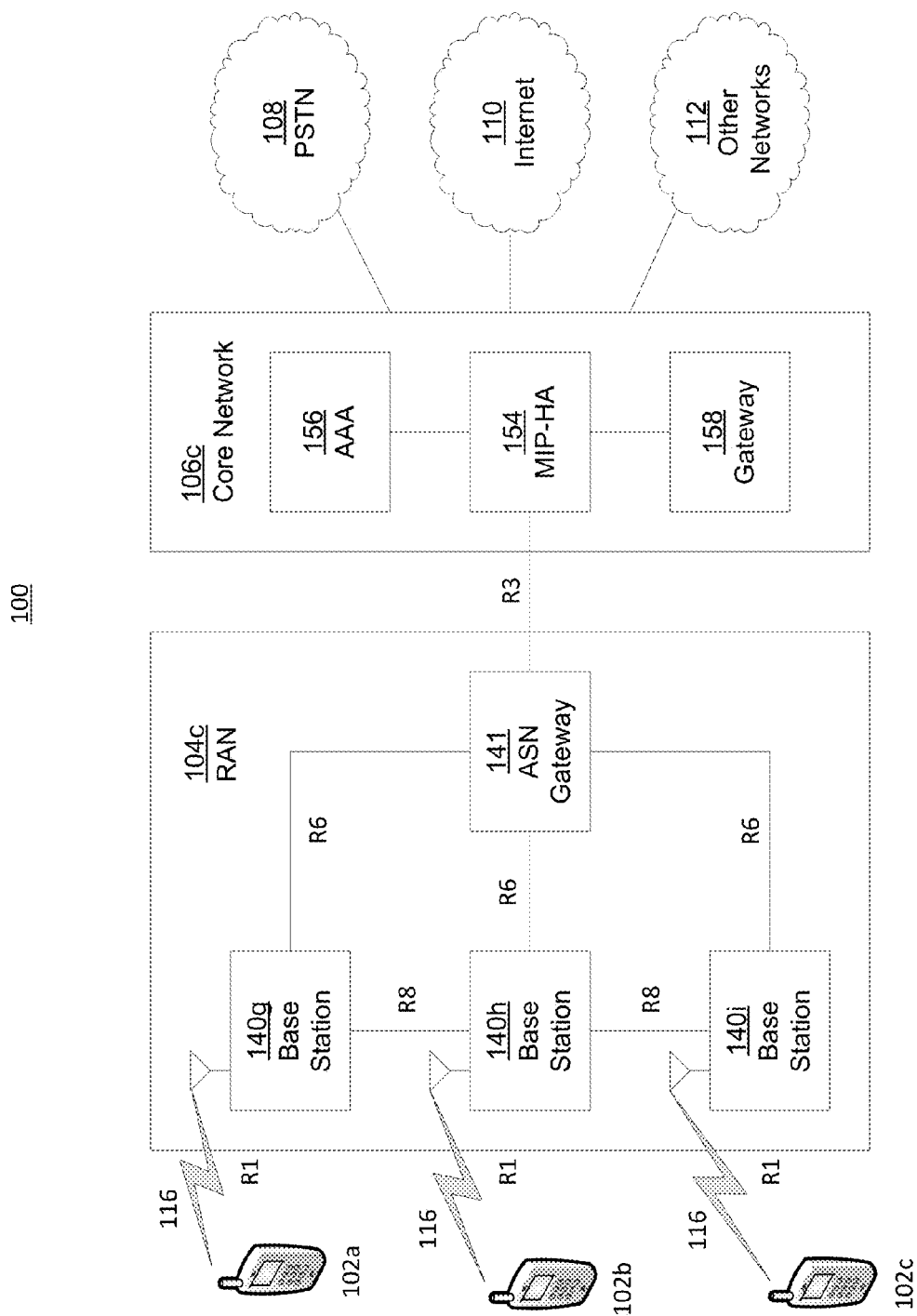
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5l reference, which may include protocols for facilitating interworking between home core networks and visited core networks.

The above-referenced communications systems may be implemented, for example as described herein, for performing a Selected IP Traffic Offload (SIPTO) function. For example, a Converged Gateway (CGW) may perform a Local SIPTO function. When an IP flow starts, the CGW may determine the type of IP flow. If the IP flow is of a certain type, for example video or sent to or from a certain address range, the CGW may bypass the EPC and/or route the data directly to an Application Server. The CGW may provide surveillance information associated with a device and/or a communication associated with a device.

The CGW may be configured for processing to perform the embodiments described herein. The CGW may provide a function that may be controlled by a policy. The policy, for example, based on traffic type may route user's traffic in such a way so that the traffic bypasses a core network. The traffic type, for example, may be based on a user ID, a group of users, 5-tuple of traffic, application type (video, voice over IP, FTP) etc. For example, an IP flow may be initiated in the uplink and/or the CGW may decide, based on user policy for example, to perform SIPTO on the IP flow by routing it (e.g., directly) to the Application Server (e.g., instead of routing it through the EPC). In another example, an IP flow may be initiated in the downlink, e.g., through the EPC. The CGW may route uplink packets to the Application Server, e.g., via the EPC. The CGW may route the associated uplink packets via the EPC even if the policy for this IP flow for this user is to perform SIPTO.

Figure 2:
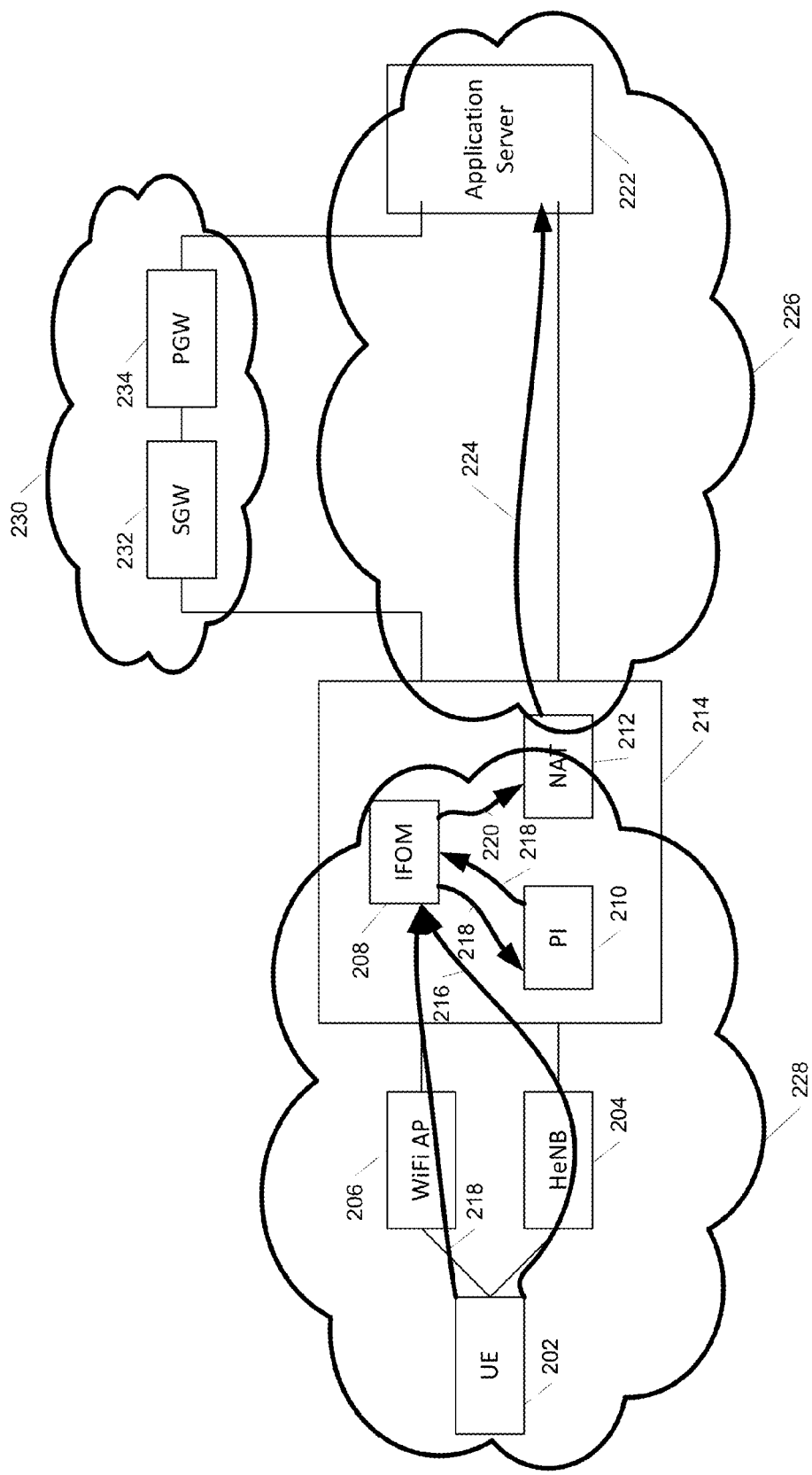
FIG. 2 is a diagram illustrating an example of processing that may be implemented for an IP flow that may originate in the uplink direction.

FIG. 2 illustrates an example of processing that may be implemented for an IP flow that may originate in the uplink direction. As illustrated in FIG. 2, a user equipment (UE) 202 may be connected to a home eNode-B (HeNB) 204 and/or a WiFi access point (AP) 206. If the UE is connected to the HeNB 204 or the WiFi AP 206, the CGW 214 may know that the connection to the HeNB and the WiFi AP may terminate at the same device. For example, a simple object access protocol (SOAP) session may be established between an SOAP server, in the CGW and an SOAP client, in the UE. The CGW may comprise Internet Protocol flow mobility (IFOM) 208, packet inspection (PI) 210, and/or network address translation (NAT) functionality 212.

As illustrated in FIG. 2, e.g., via 216 an uplink packet may reach the IFOM functionality 208 within the CGW 214. The uplink packet may reach the CGW via WiFi and/or cellular communications. At 218, the CGW may look at the 5-tuple and may realize that it is a different IP flow. The CGW may route the packet to the PI 210. The PI may identify the IP flow based on its 5-tuple and/or send the type back to the IFOM 208.

A deep packet inspection (DPI) or another PI may be used. DPI may use one or more packets to determine the IP flow type (e.g., SIP, FTP, video, etc.). SIPTO may be decided on the initial packet of an IP flow. An IP address and/or a port number may be used to determine whether an IP flow may be SIPTO'ed and/or allowed to flow through the evolved packet core (EPC) 230. The EPC may include core nodes, e.g., SGW 232, PGW 234, etc.

The CGW may consult one or more policies associated with the user for the type of data received. Based on the one or more policies, the CGW may realize that the data is an IP flow that may be sent via SIPTO. At 220, the CGW may send the packet to the NAT functionality within the CGW where the packet may be network address translated (NATed). As illustrated in FIG. 2, the packet may be pushed towards the Internet 226 or the LAN 228, e.g., via 224. The Internet 226 or the LAN 228 may have an Application Server 222. This may allow the Application Server to send a downlink packet that may be destined to the client, directly to the CGW 214. The packets may be un-NAT'ed and/or sent to the UE 202 over the transport used for the uplink packet.

Figure 3:
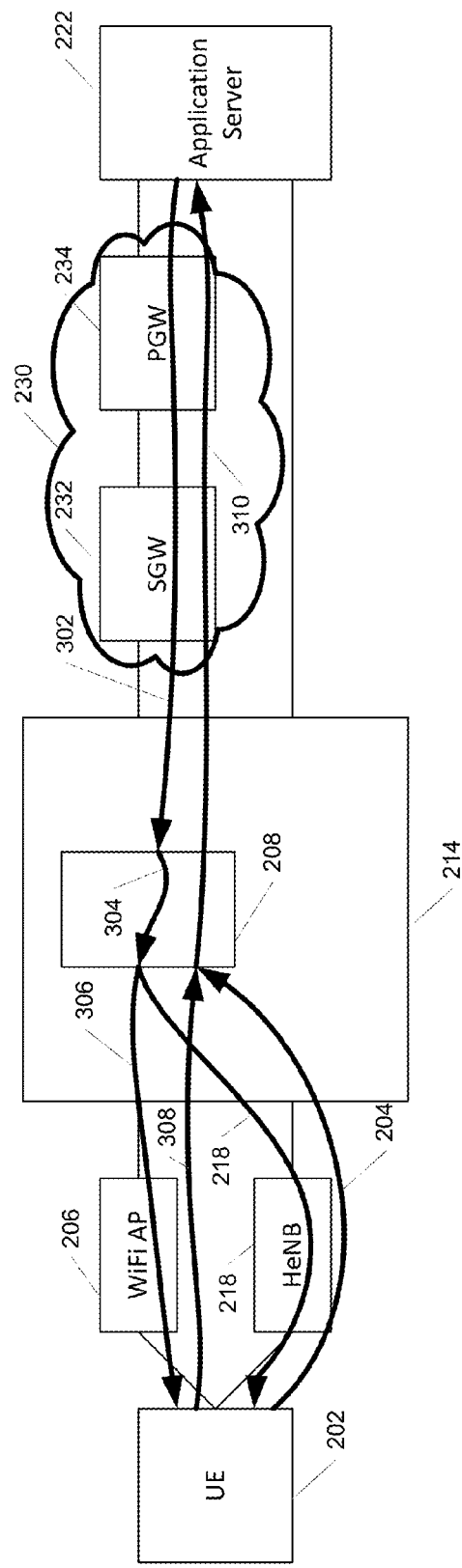
FIG. 3 is a diagram illustrating an example of processing that may be implemented for an IP flow that may originate in the downlink direction.

FIG. 3 illustrates an example of processing that may be implemented for an IP flow that may originate in the downlink direction (e.g., from the Application Server 222 to the UE 204). In FIG. 3, the UE 202 may be connected to the HeNB 204 and/or WiFi AP 206. If the UE is connected to the HeNB and the WiFi AP, the CGW 214 may know the connection to the HeNB and the WiFi AP may terminate at the same device. A SOAP session may be established between the SOAP Server, in the CGW for example, and the SOAP Client, in the UE for example. The CGW may have IFOM, packet inspection (PI), and/or NAT functionality.

As illustrated in FIG. 3, at 302, a downlink packet may reach the IFOM 208, having passed from the Application Server 222 to the CGW 214 via the EPC 230 for example. At 304, the CGW may look at the 5-tuple and may realize it is a different IP flow. The CGW may store the 5-tuple information within the CGW. The CGW may review one or more policies for how the downlink packet may be routed to the UE.

At 306, the CGW may dispatch the downlink packet to the client, for example over the transport indicated by the policy. For example, the downlink packet may be sent via WiFi and/or cellular communications. At 308, the client may send an uplink packet associated with this IP flow to the CGW. The uplink packet may be sent to the CGW over cellular and/or WiFi communications. Upon receipt of the downlink packet, at 310, the CGW may check if the packet is pushed towards the Application Server 222 via the EPC 230, since the associated downlink packet(s) with this IP flow were received via the EPC, for example. The CGW may perform this check even if the policy for this 5-tuple is to SIPTO the data.

Various policy settings may be described. For example, to SIPTO some IP flows, the CGW may discern between the IP flows that may be routed through the EPC and the IP flows that may be SIPTO'ed. An XML schema may be used for this purpose. For one of the fields, a value may be used to cue the CGW that an IP flow may be SIPTO'ed. To identify (e.g., uniquely identify) an IP flow, a number or a combination of discriminator fields may be used. For example, an IP flow may be identified in the Start Destination IP Address field, the End Destination IP Address field, the Start Source IP Address field, the End Source IP Address field, the Start Source Port Number field, the End Source Port Number field, the Protocol field, and/or the QOS field.

The CGW may have a policy for one or more different IMSIs whose devices may attach to the CGW. The CGW may have a default policy. Each of the policies may include an ISRP entry (e.g., as defined in 3GPP 25.312). The ISRP entry may include one or more ForFlowBased entries that may define how each IP flow may be handled. Example policies are described herein. For example, the first ForFlowBased entry may be for FTP IP flows. The FTP IP flows may be routed over WiFi, as the cellular transport may not be permitted, for example. The second ForFlowBased entry may be for SIP IP flows. The SIP IP flows may be routed over either transport, since both may have the same priority.

Described herein is an example ISRP list policy comprising a number of ForFlowBased entries:

```
ISRP
    ForFlowBased(1)
        IPFlow
            StartSourcePortNumber = 20
            EndSourcePortNumber = 21
        RoutingCriteria = DC or NI
        RoutingRule(1)
            AccessTechnology = 1              /Cellular/
            AccessNetworkPriority = 255
        RoutingRule(2)
            AccessTechnology = 3              /WiFi/
            AccessNetworkPriority = 1
        RulePriority = 1
    ForFlowBased(2)
        IPFlow
            StartSourcePortNumber =5060
            EndSourcePortNumber = 5061
        RoutingCriteria = DC or NI
        RoutingRule(1)
            AccessTechnology = 1              /Cellular/
            AccessNetworkPriority = 250
        RoutingRule(2)
            AccessTechnology = 3              /WiFi/
            AccessNetworkPriority = 250
        RulePriority = 1
```

A Routing Rule may be added for each IP flow that may be SIPTO'ed. For IP flows that are not to be SIPTO'ed, there may be little or no change to the policies. When an IP flow is to be SIPTO'ed, it may include routing rules. The routing rules may enable the CGW to know which access it may use to route data from or to the client. A routing rule may be included, which may have an AccessTechnology ID. The AccessTechnology ID may indicate to the CGW that the IP flow may be SIPTO'ed. Reusing the example ISRP policy list above, another example ISRP policy list may be provided where the FTP data may be SIPTO'ed while the SIP data may not be SIPTO'ed:

```
ISRP
    ForFlowBased(1)
        IPFlow
            StartSourcePortNumber = 20
            EndSourcePortNumber = 21
        RoutingCriteria = DC or NI
        RoutingRule(1)
            AccessTechnology = 1              /Cellular/
            AccessNetworkPriority = 255
        RoutingRule(2)
            AccessTechnology = 3              /WiFi/
            AccessNetworkPriority = 1
        RoutingRule(3)
            AccessTechnology = 5              /SIPTO/
            AccessNetworkPriority = 1
        RulePriority = 1
    ForFlowBased(2)
        IPFlow
            StartSourcePortNumber =5060
            EndSourcePortNumber = 5061
        RoutingCriteria = DC or NI
        RoutingRule(1)
            AccessTechnology = 1              /Cellular/
            AccessNetworkPriority = 250
        RoutingRule(2)
            AccessTechnology = 3              /WiFi/
            AccessNetworkPriority = 250
        RulePriority = 1
```

In the first ForFlowBased entry, there may be a RoutingRule for AccessTechnology five. This may be a cue to the CGW to SIPTO FTP IP flows. If there is no RoutingRule for AccessTechnology five, as illustrated in the second ForFlowBased entry, for example, the CGW may not SIPTO SIP IP flows. While the above example shows specific IP flows that may be offloaded via Local SIPTO, the decision to SIPTO or not may be based on the IMSI. The IP flows for a user may be subject to offload and/or none of the IP flows for a user may be SIPTO'ed. This may give flexibility to the CGW as to which IP flows to SIPTO and/or which to pass through the EPC for example.

Various implementations are described herein for populating the one or more policies. For example, the CGW may intercept DNS queries from a UE and/or learn the IP address of the Application Server(s) associated with the FQDN used in the DNS query. In another example, the CGW may issue (e.g., periodically) its own DNS queries to resolve the FQDN of those Application Servers whose IP flows it wishes to offload. In each of these examples, the CGW may have a list of websites, Application Servers, and/or entities that the CGW may offload via local SIPTO. The CGW may be pre-provisioned with the list of FQDNs.

Figure 4:
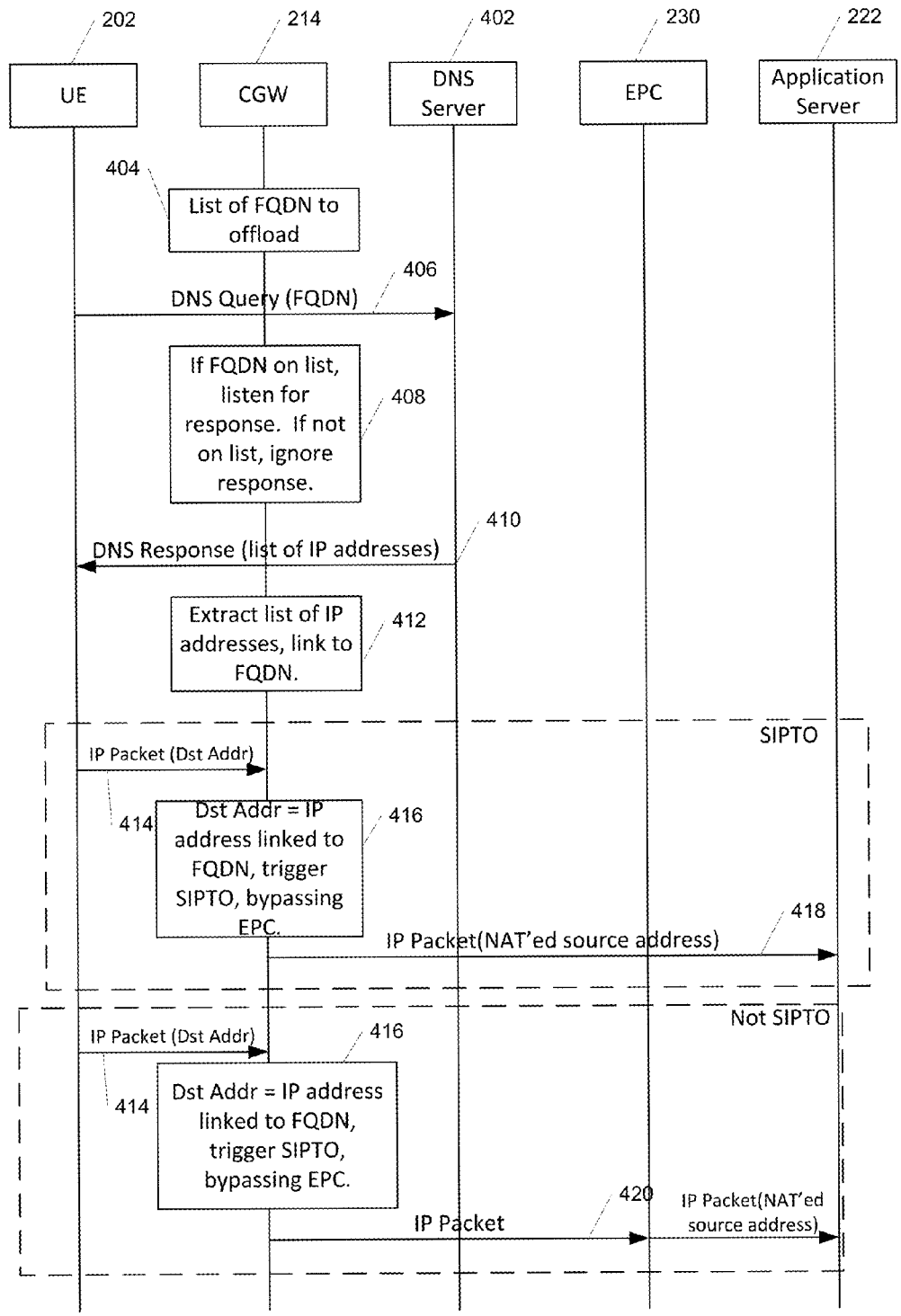
FIG. 4 is a diagram illustrating an example of populating one or more policies.

FIG. 4 illustrates an example message chart of an embodiment in which the CGW may intercept DNS queries for populating the one or more policies. As illustrated in FIG. 4, at 406, a UE 202 may send a DNS Request towards the DNS Server, the CGW 214 may intercept this message and/or decode it. The CGW may compare the FQDN against the pre-provisioned list of FQDNs to offload 404. At 408, if the CGW does not find a match, the CGW may not listen for a DNS response. If the CGW does find a match, at 410, the CGW may listen for the DNS response. When the DNS response is intercepted by the CGW, at 412, it may decode the response and/or link the IP addresses with the FQDN name. This linkage may be maintained within the CGW.

At 414, the UE may begin a session with an Application Server. The UE may push a message towards the server, via the CGW for example. The CGW may look at the destination address. At 416, If the destination address matches an IP address within the linkage table, at 418, the CGW may SIPTO this packet (e.g., directly) to the Application Server. The Application Server and UE may exchange packets, via the CGW for example, with the packets bypassing the mobile core network. If the destination IP address does not match an IP address in the linkage table, at 420, the CGW may route the uplink packet towards the Application Server 222 via the mobile core network. The Application Server and UE may exchange packets via the CGW and/or the mobile core network. As illustrated in FIG. 4, the CGW 214 may intercept the DNS query 406 and/or the DNS response 408. For example, the CGW may intercept the DNS response message 408, which may also include the query information within it.

Figure 5:
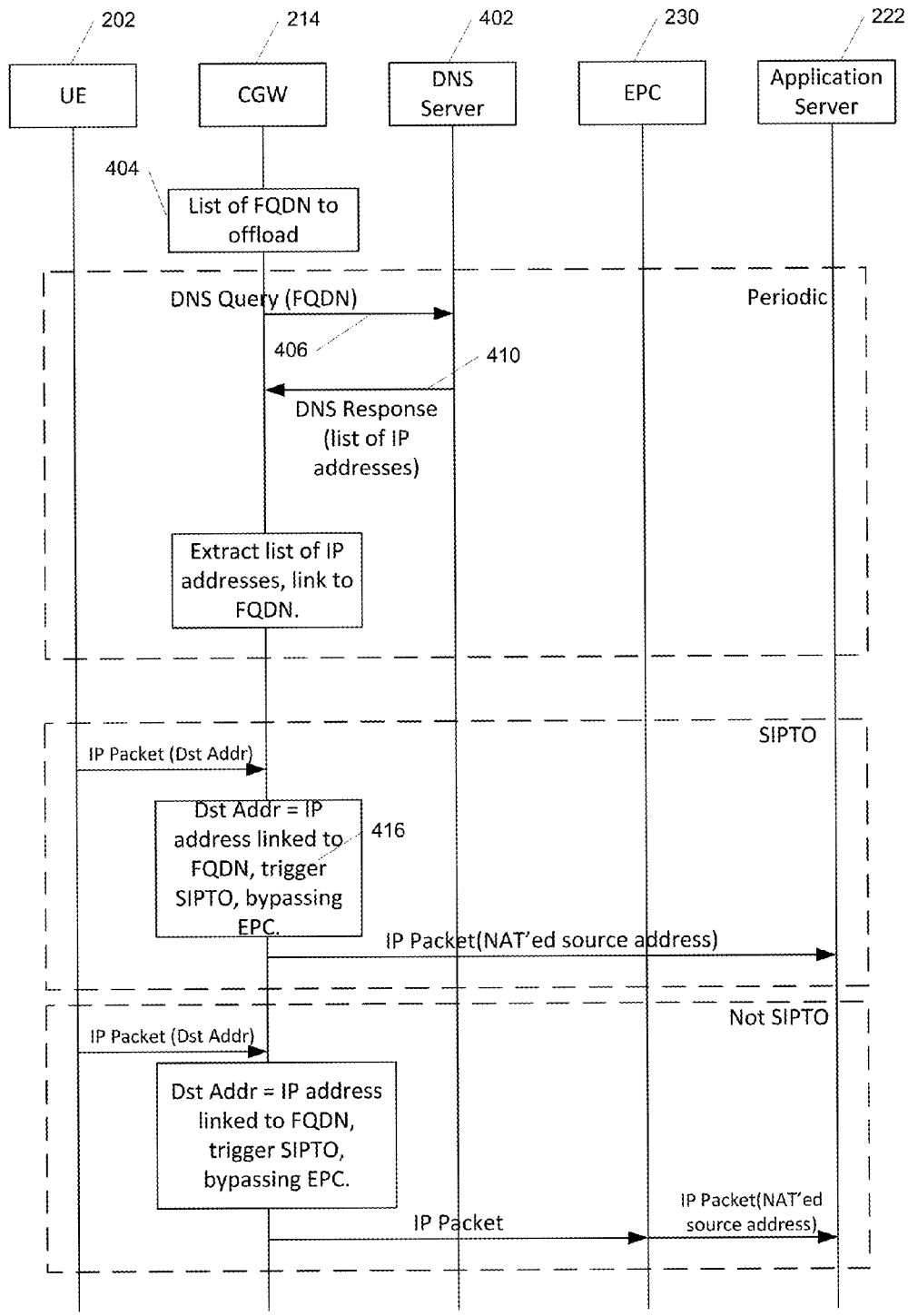
FIG. 5 is an message chart illustrating an example in which a CGW may autonomously issue an DNS query.

FIG. 5 is a message chart illustrating an example embodiment in which the CGW may autonomously issue DNS queries. The CGW may have a list of FQDNs 404 for traffic that may be offloaded via SIPTO at the CGW. The CGW may (e.g., periodically) issue DNS queries 406 for each FQDN in the list. The CGW may store the IP addresses returned by the DNS Server (e.g., via DNS response 410).

This linkage table may be used by the CGW to determine if an IP flow may be offloaded via SIPTO. The periodicity in which a CGW may issue the DNS queries may be set to a value. When an IP flow begins, a UE may send an uplink packet towards the Application Server. When it reaches the CGW, at 416 the CGW may compare the destination address to the list of IP address linked to the FQDNs of traffic to be offloaded. If it matches, the CGW may offload the traffic (e.g., directly) to the public Internet, rather than pushing towards the Application Server via the mobile core network, for example. If the destination IP address does not match an entry in the list, the CGW may push the traffic to the mobile core network.

For either of the embodiments illustrated in FIGS. 4 and 5, if the CGW decides to SIPTO the traffic, the CGW may perform NAT'ing, as described herein, for example. While the embodiments described herein for populating policies for a CGW may be applied to local SIPTO, the same, or similar, embodiments may be used for populating policies for CGW based IFOM. This functionality may be placed within an ANDSF Server where it may be used to populate the policies stored within the ANDSF Server. This functionality may be placed within the ANDSF Server regardless of the ANDSF Server location, for example in the CGW, on the public Internet, or within the mobile core network or any other location.

When an uplink packet is received from the client for an IP flow, it may be packet inspected. Once identified, the policy may be consulted as to how to route the packet towards the Application Server (e.g., either directly to the Application Server or through the EPC to the Application Server). This packet inspection may look at the 5-tuple of a packet for example.

Figure 6:
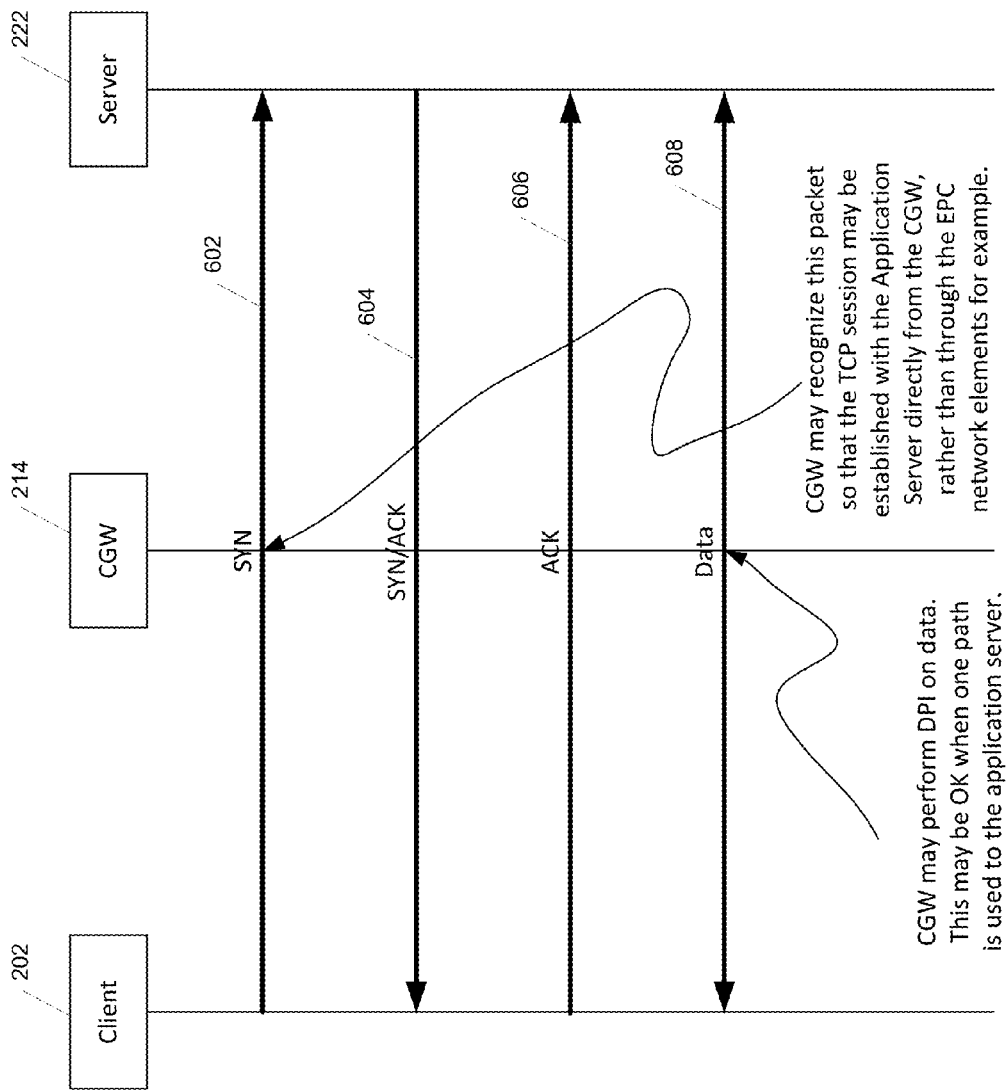
FIG. 6 is a diagram illustrating an example of identifying an IP flow based on TCP handshake signals.

The CGW may use a deep packet inspection (DPI) to identify an IP flow. Using the DPI engine, the first uplink packet may not be sufficient to identify an IP flow type. FIG. 6 illustrates an example of identifying flow of IP packets using, e.g., TCP handshake signals. When the IP flow between the client and the Application server uses TCP, there may be handshake signals that may pass between the client and the Application Server. As illustrated in FIG. 6, at 608, for example, the DPI may identify the IP flow based on the TCP handshake signals, e.g., SYN 602, SYN/ACK 604, ACK 606, etc.

In an example, the DPI may not be implemented. The IP address of the Application Server and/or the port numbers, which may be used to convey the handshake between the client and Application Serve, may be known. The IP address and/or the port numbers may be used to identify the IP flows that may be delivered to the Application Server, e.g., via the EPC or directly by SIPTO.

When the CGW 214 detects a 5-tuple, it may compare some combination of the 5-tuple parameters against the policies for the user device (e.g., based on IMSI). If the CGW finds a match, it may determine whether to route the IP flow, for example to the Application Server (e.g., directly via SIPTO) or via the EPC. If the IP flow is routed via the EPC, the CGW may push the packet towards the EPC. If the IP flow is routed (e.g., directly) to the Application Server, the CGW may push the packet to the NAT processing, which may push it towards the Application Server (e.g., after it has performed its NAT function).

For IP packets, and/or for items such as TCP handshakes for example, that may be sent by the client to the CGW via the HeNB, the source IP address may be the EPC-assigned IP address. For IP packets, and/or for items such as TCP handshakes for example, that may be sent by the client to the CGW via the WiFi AP, the source IP address may be the EPC-assigned IP address. If the CGW decides to route an IP flow to the EPC, the source IP address may be set by the CGW to the EPC-assigned IP address. The CGW may set the source IP address to the EPC-assigned IP address regardless of how the client delivered the packet to the CGW. If the CGW decides to route an IP flow to the Application Server (e.g., directly), it may perform an NAT on the uplink packet so that the Application Server may deliver downlink packets for the same IP flow directly to the CGW.

Figure 7:
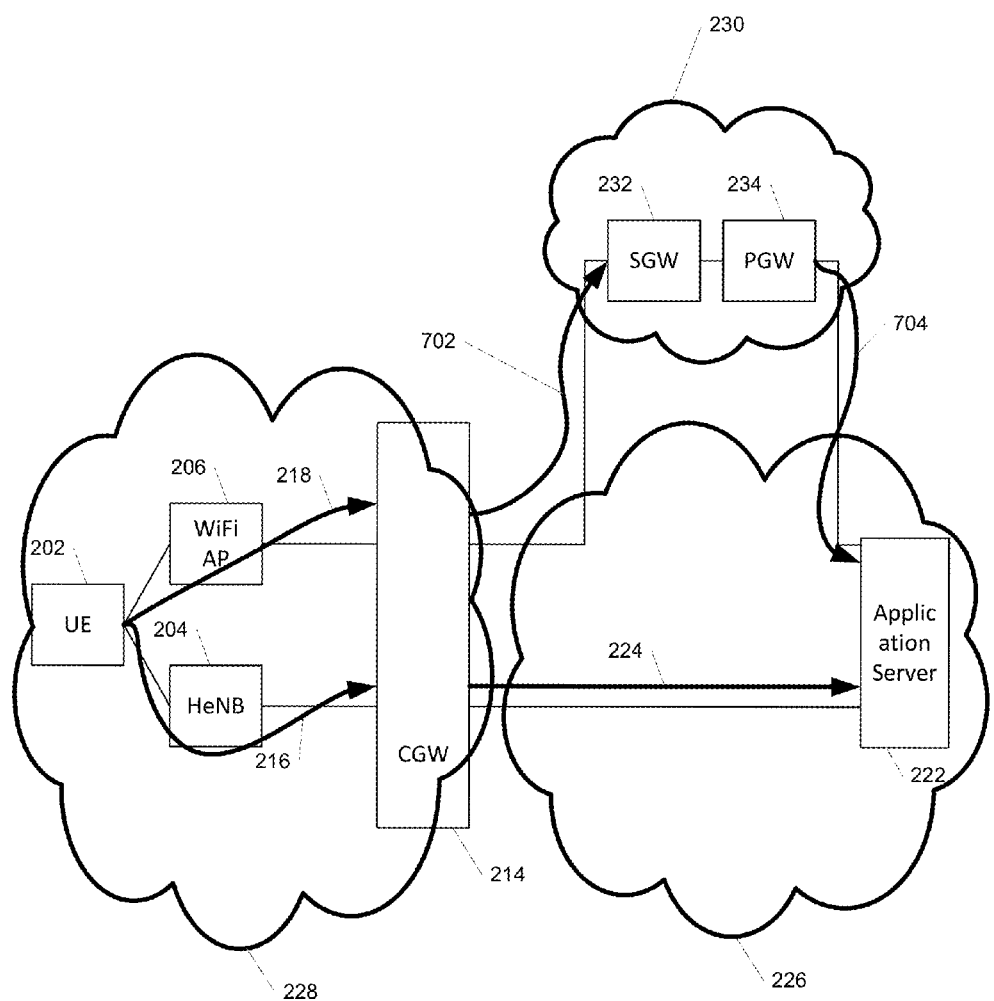
FIG. 7 is a diagram illustrating an example of routing uplink packets.

FIG. 7 illustrates an example of routing uplink packets. For example, a first packet may arrive at the CGW, e.g., via 218 with source IP address as an EPC-assigned WiFi IP address and destination as the Application Server 222 IP address. A second packet may arrive at the CGW, e.g., via 216 with source as ECP-assigned IP address and destination as the Application Server 222 IP address. The CGW may send the second packet, e.g., via 702 with source IP address as EPC-assigned IP address to the EPC 230. After traversing SGW 232 and PGW 234, the second packet with source IP address as PDN-GW public IP address and destination IP address as Application Server IP address may be sent to the Application Server 222, e.g., via 704. The first packet may be sent to Application Server 222, e.g., via 224 over the Public Internet 226. The source IP address of the first packet may be the CGW public IP Address and the destination IP address as the Application Server IP address.

Figure 8:
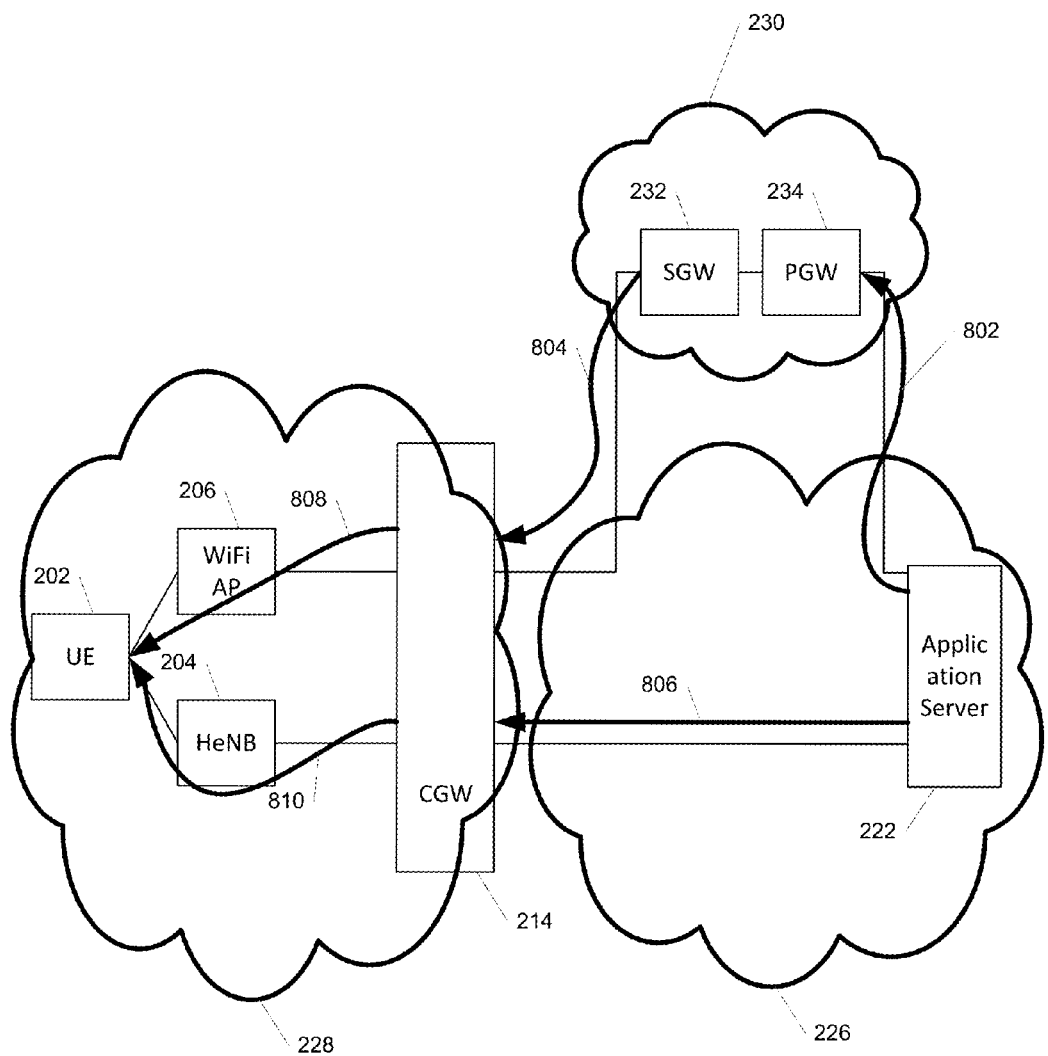
FIG. 8 is a diagram illustrating an example of routing downlink packets.

FIG. 8 illustrates an example of routing downlink packets. The downlink packets may be sent to the CGW 214, e.g., via the EPC 230. The downlink packets may be sent to the EPC 230, e.g., via 802 with source IP address as the Application Server IP address and the destination IP address as the PDN-Gateway (PGW) Public IP address. The packets may be forwarded to the CGW 214, e.g., via 804 with source IP address as the Application Server IP Address and the destination IP Address as the EPC-assigned IP address. The CGW may forward the downlink packets to the client 202 using the access (e.g., based on policies and/or DFM). The CGW may send the packets, e.g., via 808 with source IP address as the Application Server IP address and the destination IP address as the EPC-assigned IP address. For downlink packets that may be received by the CGW (e.g., directly from the Application Server via 806), the CGW may forward the packets to the client using the access (e.g., based on policies and DFM). The downlink packets via 806 may have the source IP address as the Application Server IP address and the destination IP address as the CGW Public IP address. The CGW may forward the packets to the client, e.g., via 810 with the source IP address as the Application Server IP address and the destination IP address as the EPC-assigned IP address.

SIPTO and cellular mobility may be provided. For example, when a client becomes mobile and/or moves outside the purview of a CGW, the client may handover from a HeNB managed by the CGW to a macrocell, or other HeNB/eNB not managed by the CGW. In this example, an IP flow routed through the EPC may be handled seamlessly. An IP flow that the CGW may decide to SIPTO may be lost once the client moves outside the range that may be controlled by the CGW.

SIPTO and Non-SIPTO flows may be provided. For example, when a CGW decides to route an IP flow from a client to an Application Server via SIPTO, that IP flow may be SIPTO'ed for the remainder of its existence. An IP flow to an Application Server may not be started directly and then routed through the EPC. A quasi-SIPTO function may be performed for an IP flow that may be initially routed through the EPC. In this case, an IP flow may traverse the CGW, a SGW, a PGW, and/or another entity. An entity, whether it is the CGW, SGW, PGW, or other entity may decide that the SGW may be offloaded. The Inter-SGSN Inter-system Change (e.g., as illustrated in 3GPP TS 23.060, Section 6.13.2) may define a procedure to allow for the change between SGSN/SGWs. This procedure may be reused to enable offloading an SGW.

Figure 9:
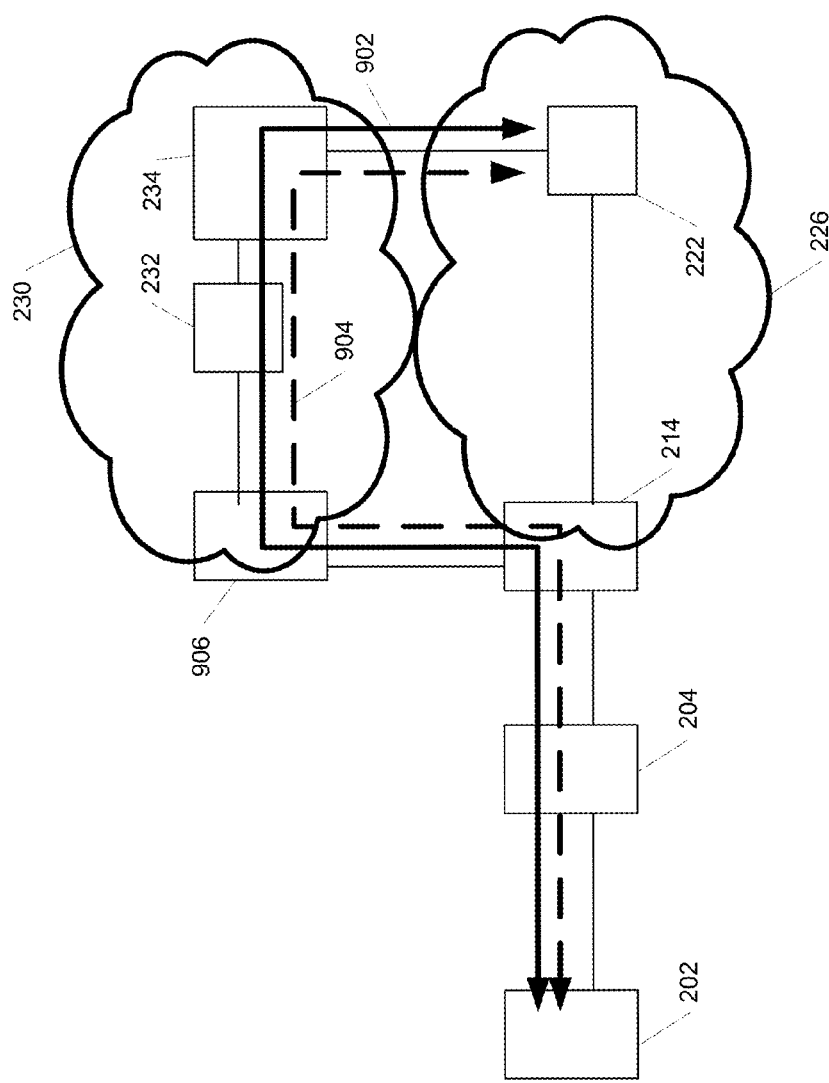
FIG. 9 is a diagram illustrating an example of a data path before and after an SGW offload may be performed.
Figure 10:
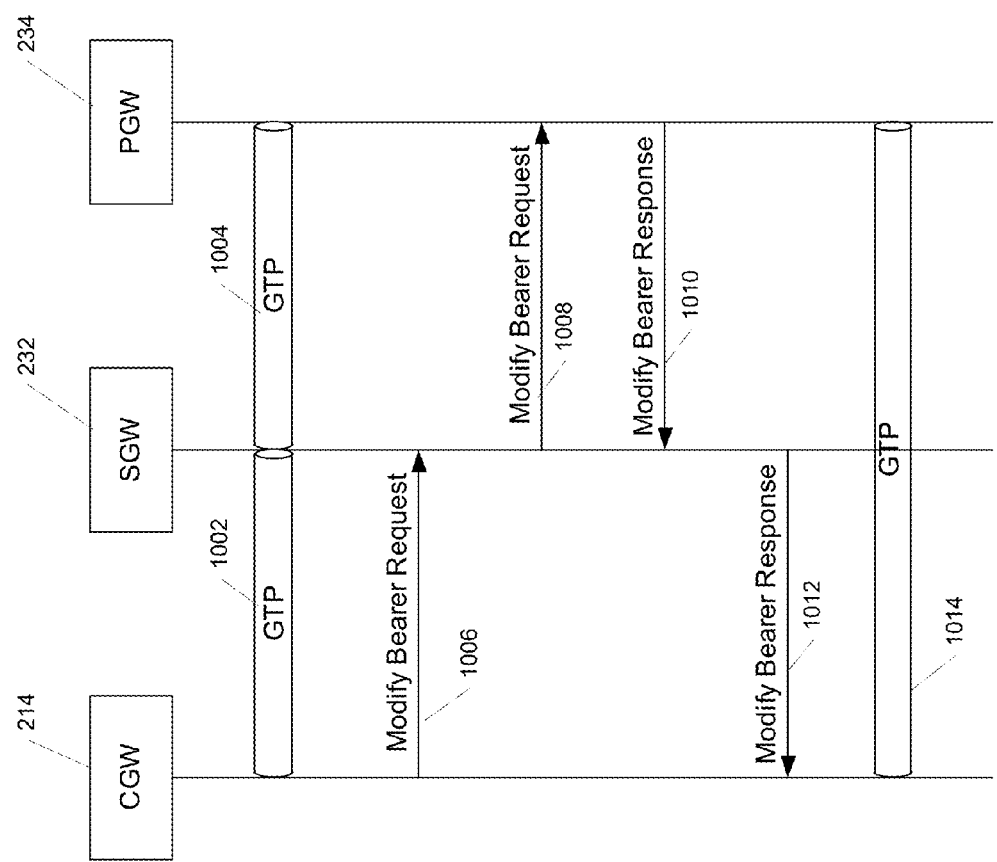
FIG. 10 is a diagram illustrating an example of the interaction between a CGW, an SGW, and a PGW.

FIG. 9 is a diagram illustrating an example of a data path before and after an SGW offload may be performed. Before the SGW offload, the data path 902 may pass through the SGW 232 of the EPC 230. After the offload, the data path 904 may not pass through the SGW and may go directly from the CGW 214 and into the PGW 234 within the EPC for example. The data path from a user to an application server may bypass the SGW based on type of traffic. The type of traffic may be determined based on, for example, user ID, group of users, 5-tuple of the traffic, application type (video, voice over IP, FTP), etc. The path 902 may pass through the security gateway 906. FIG. 10 is a message chart illustrating an example of an interaction between the CGW, SGW, and PGW. As illustrated in FIG. 10, a GPRS tunnel 1002 may exist between the CGW 214 and the SGW 232. Another tunnel 1004 may exist between the SGW 232 and the PGW 234. At 1006, the CGW may send a request to SGW to modify the bearers. The SGW may forward the request to the PGW. The PGW may reply with a response 1008 to the SGW. At 1012, the SGW may forward the response to the CGW. The tunnel between the SGW and PGW may be terminated and the tunnel between the CGW and SGW may be extended between the CGW and the PGW.

Dynamic policy update implementations may be provided. When an IP flow is to be SIPTO'ed or not SIPTO'ed, the IP flow routing between the CGW and Application Server may not be changed. The CGW may handle the case where the CGW operator changes the policy files for the end-user devices. If the operator changes, or causes to change, an end-user device policy, the CGW may continue to route existing IP flows as they were routed prior to the policy change. For additional IP flows, the additional policies may be used. For example, if an IP flow is currently being SIPTO'ed, and the policy for that device is being changed such that it may no longer be SIPTO'ed, the current IP flow may continue to employ SIPTO until the IP flow terminates. If an IP flow is being routed through the EPC as a result of its policy, for example, and if that policy is changed, then the IP flow may continue to be routed through the EPC.

Communications networks may include one or more local gateways (e.g., a CGW as disclosed herein). A local gateway may be associated with, but not resident in, a core network. A local gateway may be configured to locally route communications network data, for example via Local Selected Internet Protocol Traffic Offload (L-SIPTO) and/or Local Internet Protocol Access (LIPA), such that the data does not pass through devices resident in a core network with which the local gateway is associated. Typical LI architectures that rely on data passing through the core network may be incapable of intercepting traffic routed by a local gateway.

Figure 11:
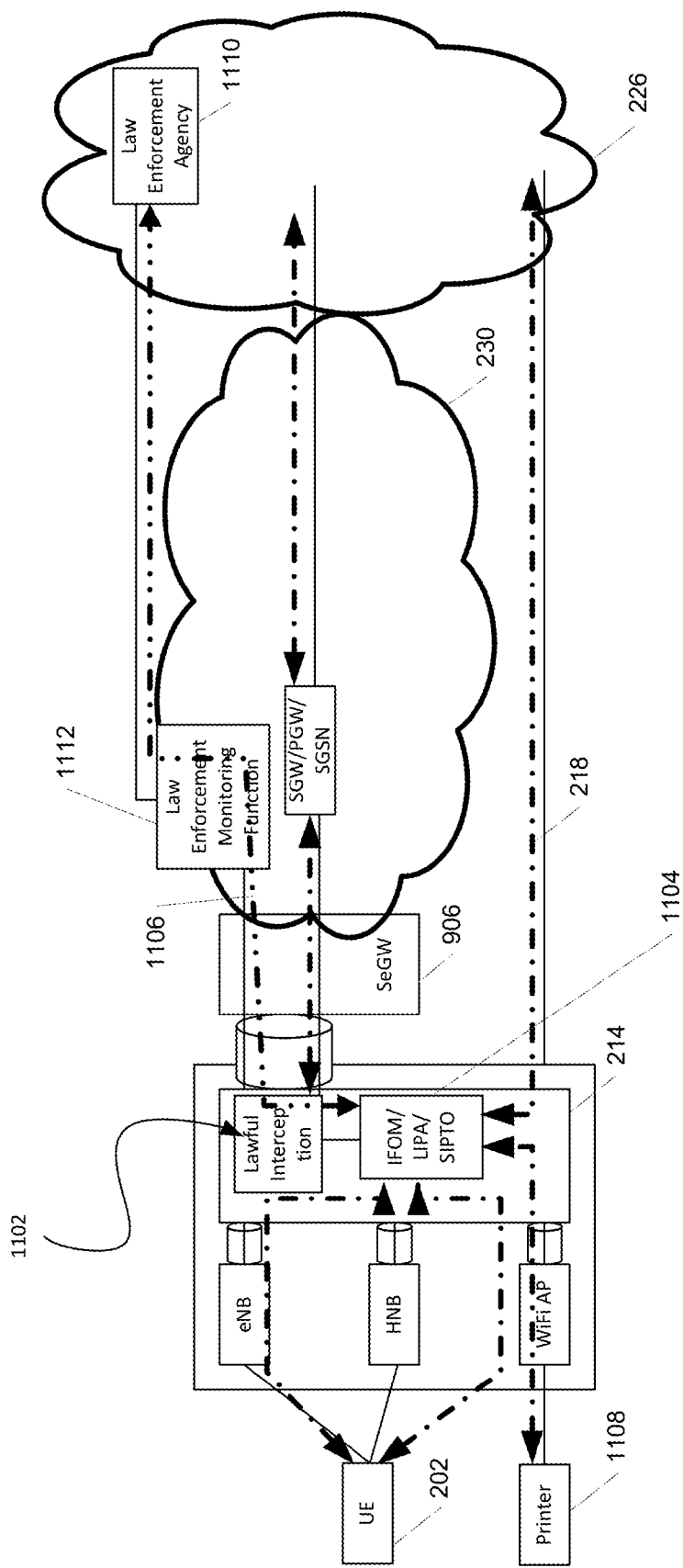
FIG. 11 is a diagram illustrating an example of flow of configuration information and data packets.

The CGW 214 may perform lawful interception of the traffic it may SIPTO. The CGW may have a function 1102 that may interface to the Law Enforcement Monitoring Function (LEMF) 1112 and/or the IFOM/LIPA/SIPTO function 1104. The interfaces to the LEMF 1106 may include one or more of the X1_1, X2, and/or X3 interfaces, as may be defined in 3GPP 33.107 for example. The CGW based function may act as the network element that may perform this function 1102. The function 1102 may be placed inside the CGW. The CGW may be placed at the edge of an enterprise or metro network for example. When the LEMF has configured the CGW as to which traffic to intercept, the CGW may replicate the packets and/or forward them to the LEMF. FIG. 11 is a diagram illustrating an example of the flow of configuration information and data packets. While the logic in FIG. 11 is shown for SIPTO, the same, or similar, logic may be applicable to LIPA traffic that may traverse the CGW, as well as extended LIPA or a traffic that may traverse the CGW for example. The implementations described herein may be applicable to various communications networks, such as universal mobile telecommunications system (UMTS) and/or long-term evolution (LTE) for example.

Figure 12:
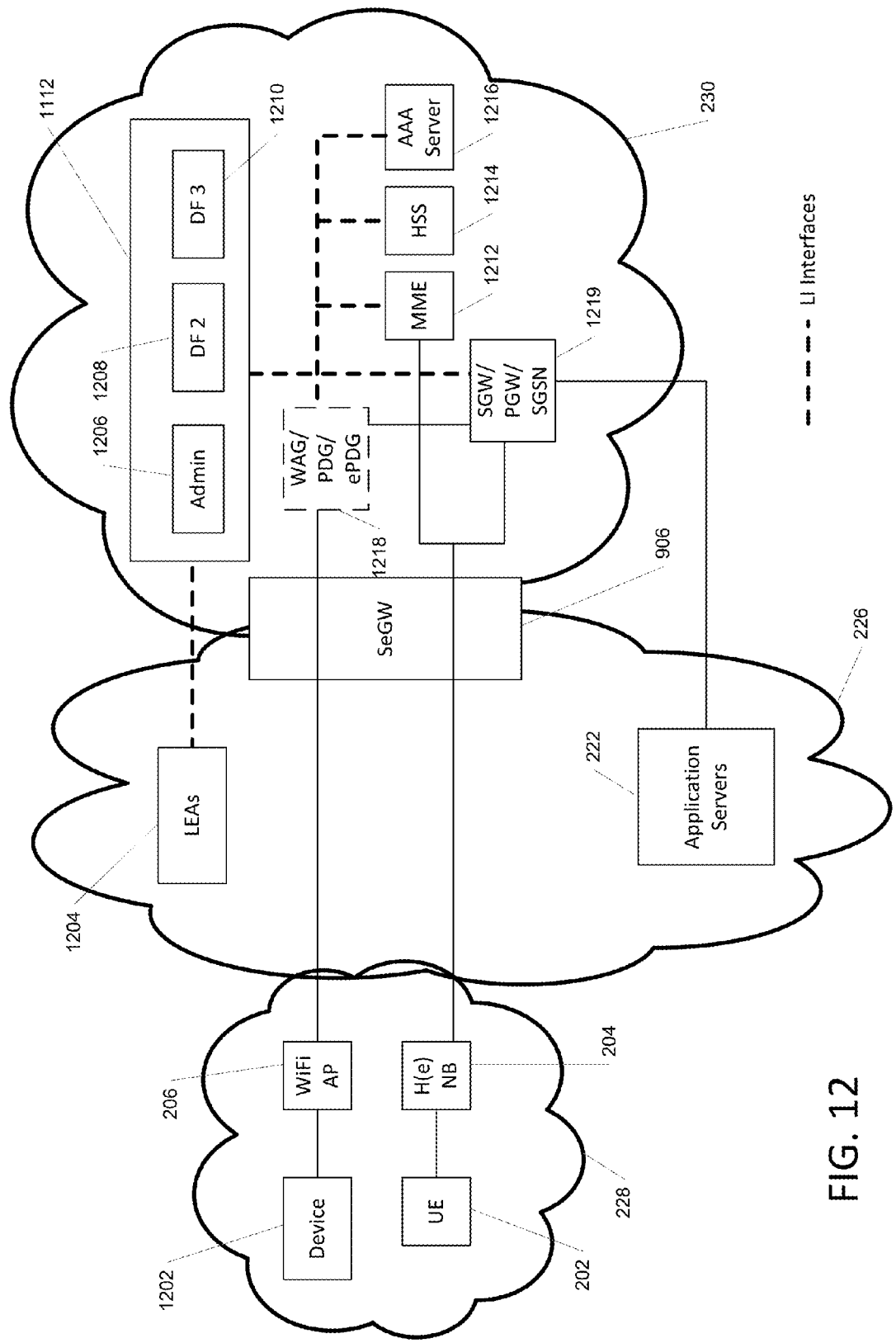
FIG. 12 is a diagram illustrating an example of lawful interception (LI) architecture.

FIG. 12 is a diagram illustrating an example architecture of lawful interception (LI) of traffic (e.g., Internet protocol (IP) voice or data traffic) that may be associated with one or more user devices 202, 1202. LI, as illustrated in FIG. 12, may be a function within a core network (e.g., an EPC 230) and may be referred to as a Law Enforcement Management Function (LEMF) 1112. The LEMF 1112 may act as an interface to at least one law enforcement agency (LEA), such as a plurality of LEAs 1204. The LEMF 1112 may be connected to one or more core network elements including, for example, a mobility management entity (MME), a home subscriber server (HSS), a serving gateway (SGW), a packet data network gateway (PGW), a GPRS support node (SGSN), a WiFi Access Gateway (WAG), a Packed Data Gateway (PDG), etc.

Figure 13:
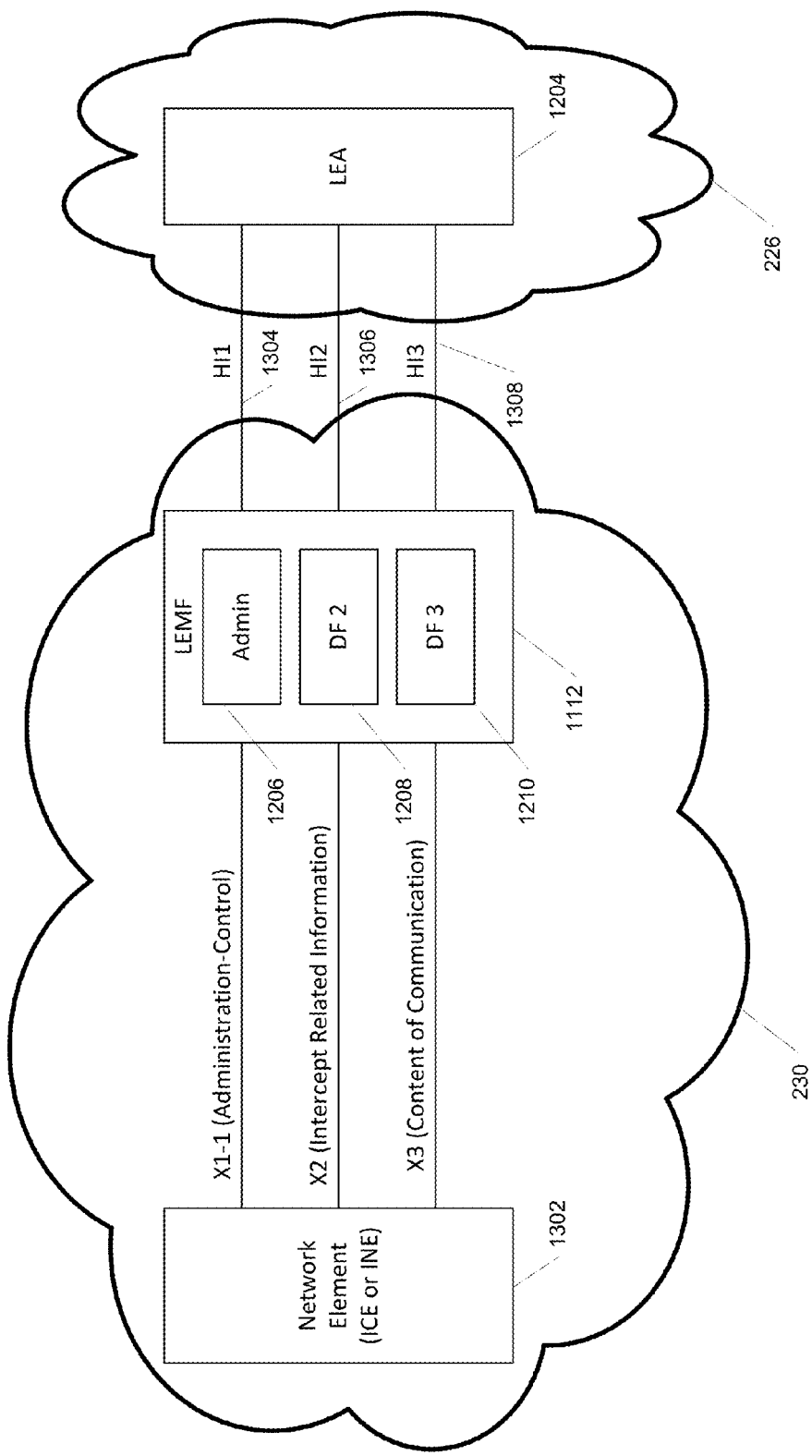
FIG. 13 is a diagram illustrating an example of lawful enforcement management function (LEMF).

FIG. 13 is a diagram illustrating an example of LEMF functionality. The LEMF 1112 may control LI functionality of other network elements. A LEMF 1112 may command network elements as to the information that may be collected for LI and may accept collected information from various network components. The network components may be classified into categories, such as an Intercepting Control Element (ICE) category and/or an Intercepting Network Element (INE) category. ICEs may include network devices (e.g., core network devices) that control connections, such as an MME. INE devices may include network devices (e.g., core network devices) that deal with the data plane, such as a Serving Gateway (SGW) or a PDN Gateway (PGW).

The WiFi interface depicted in FIG. 12 may be either trusted or untrusted. The WiFi Access Gateway (WAG) and/or the Packed Data Gateway (PDG) and/or the Evolved Packed Data Gateway (ePDG) may be present or omitted. A gateway device that is associated with, but not resident in, a core network (e.g., a local gateway such as a Converged Gateway (CGW) 214) may have a trusted WiFi interface and may not have an untrusted WiFi interface. As illustrated in FIG. 13, the LEMF 1112 may have elements that may include Admin 1206, DF2 1208, and DF3 1210. Each of these elements may handle one or more aspects of LI surveillance. Surveillance information may be categorized, for example as events and/or as contents of one or more communications. The events and the contents of one or more communications associated with surveillance may be handled by the DF2 and/or DF3 functions. The Admin element may handle enabling and disabling of surveillance, for example based on interactions with one or more LEAs. One or more interfaces may facilitate communications between a LEMF and core network devices. One or more interfaces may facilitate communications between a LEMF and one or more corresponding LEAs. As illustrated in FIG. 12, the LEMF may have one or more LI interfaces. As illustrated in FIG. 13, the LI interfaces may be associated with one or more ICE and/or INE devices (e.g., each of the ICE and/or INE devices 1302) within a network (e.g., an EPC 230).

As illustrated in FIG. 13, the administration information may be handled over the X1-1 and HI1 1304 interfaces. Event related data may be referred to as Intercept Related Information (IRI) and may be transported via the X2 and HI2 1306 interfaces. The Contents of Communications (CC) may be transported via the X3 and HI3 1308 interfaces. A suitable protocol or message format may be implemented over these interfaces. For the X1-1 interface, one or more signals may be supported. For the X2 interface, several events may be reported to the LEMF, for example if surveillance is enabled. For the X3 interface, the IP packets related to a surveillance target may be sent from one or more network elements to the LEMF. For both the X2 and X3 interfaces, a reporting network element may include certain parameters (e.g., whose data triggered the event) and/or may include select parameters (e.g., the location of the device being tracked). The HI1, HI2, and/or HI3 interfaces, respectively, may effect communications between one or more LEAs and the LEMF. There may be a one-to-one mapping between the X and HI interfaces.

Targets for LI surveillance may include one or more users (e.g., a user of a particular device such as an UE or an WTRU), one or more Closed Subscriber Groups (CSGs), and/or one or more network elements (e.g., an HNB, an H(e)NB, or the like). Targets may include one or more devices belonging to a CGW.

If a user is the target of surveillance, the actions taken by the user on the network and/or the contents of the user's communications may be subject to LI (e.g., for monitoring). If a CSG is the target of surveillance, actions and/or the contents of communications of one or more, or each of the users of the CSG may be subject to LI (e.g., monitoring). If a network element (e.g., an H(e)NB) is the target of surveillance, events and/or the contents of communications of each of the users associated with the network element may be subject to LI (e.g., monitoring). A H(e)NB that is the target of surveillance may be in Open, Closed, or Hybrid mode. An H(e)NB may perform LI of IRI events and/or CC for each of the users of the H(e)NB or a subset of users of the H(e)NB. The subset may be, for example, one or more individual users, the members of one or more CSGs, or a combination thereof. LI may be enabled such that events are reported, such that contents of communication are reported, or such that the events and contents of communication together are reported, for example.

The handling of Circuit-Switched (CS) voice and/or supplemental call services such as call forwarding, specialized ring tones, etc. with respect to LI may be defined. The handling of Short Message Services (SMS) messaging with respect to LI may be defined. Support of WLAN interworking with respect to LI may be defined.

If data is encrypted, a LEMF may operate to decode the encrypted data, for example before forwarding the data to one or more LEAs, or to provide decryption keys so that the one or more LEAs a decode the data. One or more interfaces between a LEMF and a LEA, for example the HI1, HI2, and HI3 interfaces, may be secured. If the LEMF and one or more network elements to which it interfaces are within a core network (e.g., the EPC), there may be no security on one or more of the X1-1, X2, and/or X3 interfaces. A level of interception may be determined in accordance with a country the interception is taking place. For example, countries may specify differing levels of interception.

Once activated, for example responsive to receipt of an activation signal from an LEMF Emulator, LI may be performed on the next IRI and/or CC that may occur after receipt of the activation signal. If a user device is already connected and transferring data, LI may be performed upon receipt of the activation message. Forwarding of IRI and/or CC associated with a user under surveillance may be terminated at an appropriate time (e.g., immediately) after surveillance on the user is terminated by the LEMF.

Compression may be implemented with LI. For example, CC data may be compressed before it is transported, for instance from an INE or an ICE to the LEMF. Compression may be employed in accordance with a volume of data to be forwarded to the LEMF.

A list of one or more devices that are the targets of surveillance may be secured. The INE and/or ICE devices may be considered as secure trusted devices, if the devices are within a core network (e.g., an EPC). If INE and/or ICE devices are associated with, but not resident within, the core network, how the INE and ICE may store the list of targeted devices may be specified, for example such that the respective subjects of the surveillance are not aware of and/or able to deduce that they are targets of surveillance.

A gateway device may be associated with, but not resident in, a core network. The gateway device may be configured as a local gateway (e.g., a CGW, a Local Gateway (LGW) and locally route traffic between devices in communication with the local gateway. The traffic may be routed such that the traffic between the devices does not route through a core network (e.g., an EPC). For example, the local gateway may route traffic between devices in communication with the local gateway via Local Selected IP Traffic Offload (L-SIPTO) and/or Local IP Access (LIPA).

The local gateway may be configured to support LI for locally routed traffic, for example traffic routed via L-SIPTO and/or LIPA. To support LI of locally routed traffic, an LI architecture may employ an interface, either direct or indirect, between the LEMF function and one or more local gateways.

At least a portion of LI requirements for user devices connected to a core network (e.g., an EPC) may be handled by the core network. A local gateway may support LI for a subset of IRI events and may transport CC for IP flows that bypass the core network (e.g., L-SIPTO and LIPA IP flows). A device may be monitored based on an identifier, for example an International Mobile Subscriber Identity (IMSI), Mobile Subscriber ISDN Number (MSISDN), and/or International Mobile Equipment Identity (IMEI). An identifier of a target of surveillance may be other than the listed identifiers. For example, an identifier may be a unique characteristic of a device, including but not limited to an IP address, a usage pattern, and/or a physical location. An IMSI may include one or more of the above-described identifiers and a suitable identifier.

Figure 14:
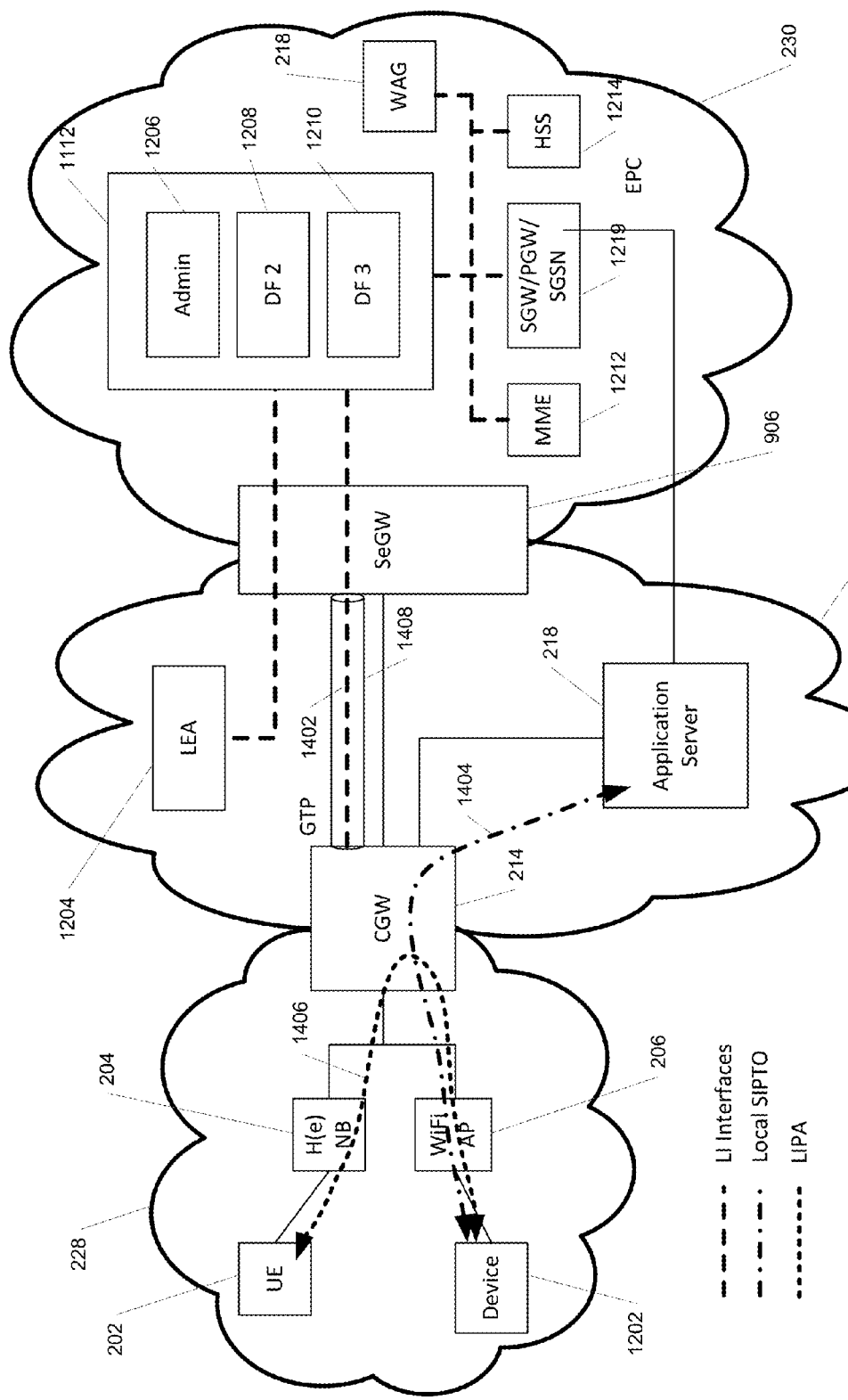
FIG. 14 is a diagram illustrating an example of LI architecture for local routing by a gateway that is associated with, but not resident in, a core network.

FIG. 14 is a diagram illustrating an example of LI architecture that may implement LI for traffic that may be routed (e.g., via L-SIPTO 1404 and/or LIPA 1406 IP flows) by a local gateway that is associated with, but not resident in, a core network. An interface 1402 may be established between the LEMF function 1112 and a local gateway 214 (e.g., a CGW). The interface 1402 may be direct or may be established via a security gateway (SeGW) 906. The interface 1402 may be established via a secured tunnel 1408 (e.g., an IPSEC tunnel). The secured tunnel may allow the messages over the interface 1402 to be protected. The local gateway 214 may be configured similarly to INE and ICE devices within a core network 230 (e.g., an EPC), such that pre-defined LEMF to ICE and/or INE interfaces may be purposed for surveillance of traffic routed locally by the local gateway (e.g., L-SIPTO and/or LIPA IP flows). A local gateway may be configured similarly to an INE, such that it may handle data planes and/or may be configured similarly to an ICE, such that it may manage one or more local WiFi connections (e.g., local WiFi connections established to one or more WiFi APs that may be managed by the local gateway). The local gateway may be configured, for example, as a data plane device (e.g., limited to data plane). An $S_{xx}$ interface may be used for control plane.

Figure 15:
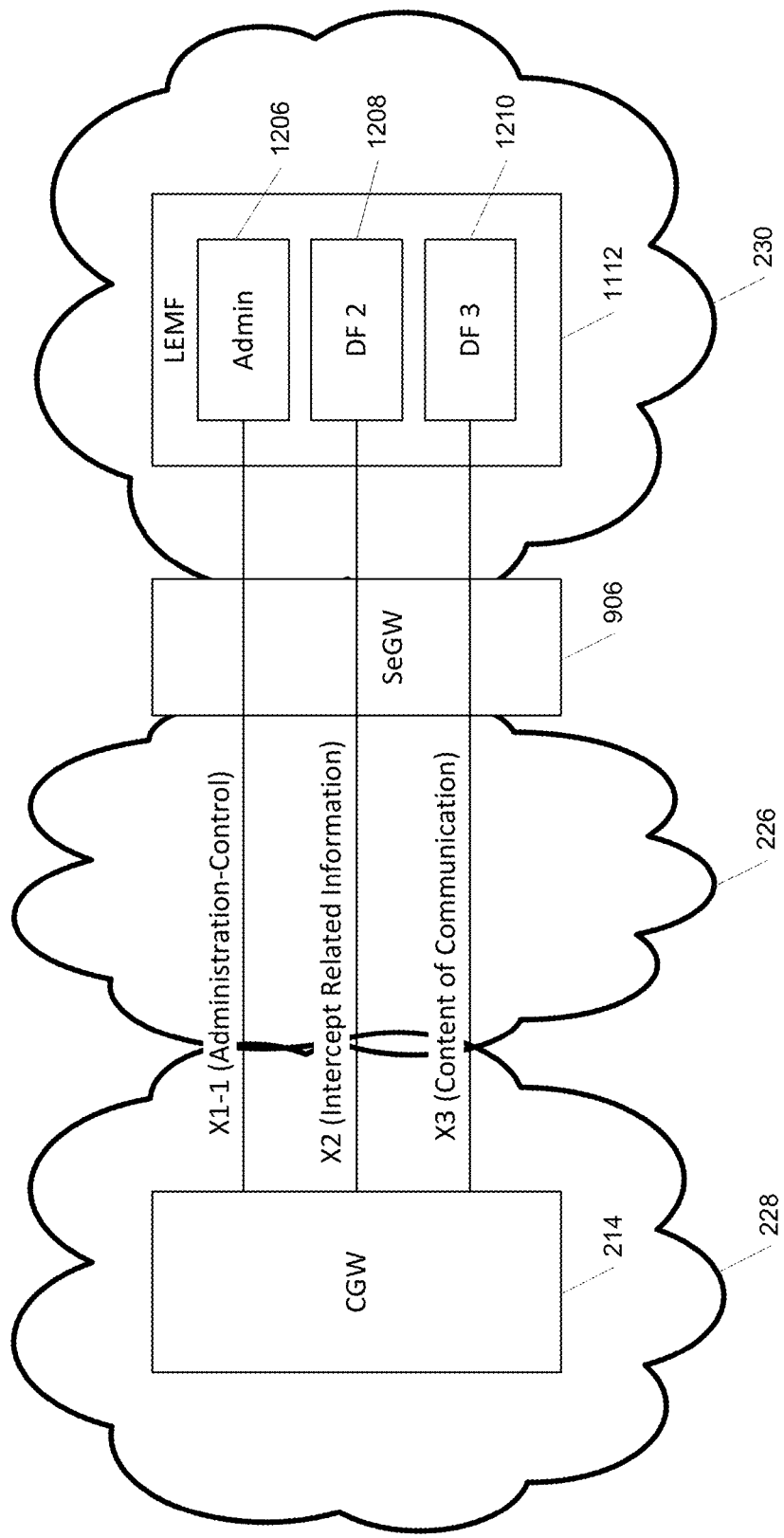
FIG. 15 is a system diagram illustrating an example of an LI interfaces between a core network and a gateway that is associated with, but not resident in, the core network.

FIG. 15 is a diagram illustrating an example of LI interfaces between a core network (e.g., an EPC 230) and a local gateway (e.g., a CGW 214) that may be associated with, but not resident in, the core network. As illustrated in FIG. 15, an interface between a local gateway resident within a Local Area Network (LAN) and a core network may traverse the public Internet. For example, a medium for the backhaul may be Ethernet, TDM, fiber, wireless, or a combination thereof.

As illustrated in FIG. 15, an X1-1 interface may be used by the LEMF 1112 to activate, deactivate, and/or retrieve the status of surveillance of specific devices or groups. The X1-1 interface may be used by the local gateway to inform the LEMF that it is ready to accept LI configurations. The local gateway may perform LI on multiple users simultaneously. LI surveillances performed on respective users may be independently configurable. Activation and/or deactivation of LI for specific users may be independent. For example, two users could be the subject of surveillance and LI of one of the users could be deactivated without affecting LI of the other user. Communications (e.g., messages) between the local gateway and the LEMF may be direct or established via security gateway (SeGW) 906.

FIG. 16 illustrates example messages that may traverse an X1-1 interface. For example, a Ready message may be sent from a CGW 214 to an LEMF 1112 indicating that the CGW is ready to be configured for LI. A Command message may be sent from LEMF 1112 to the CGW 214. The Command message may control LI function within the CGW 214. A Response message may be sent from the CGW 214 to the LEMF 1112. The Response message may be sent in response to the Command message.

Figure 17:
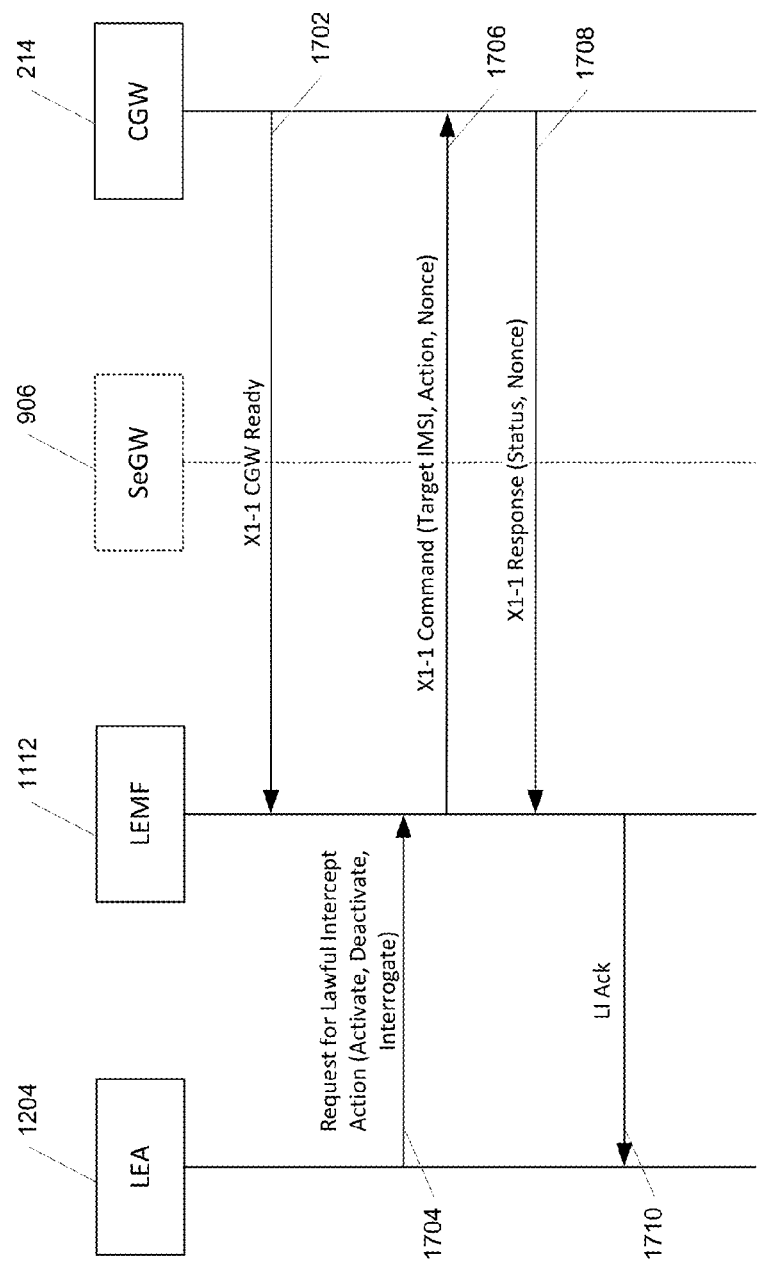
FIG. 17 is a diagram illustrating an example of an X1-1 interface message chart.

FIG. 17 illustrates an example X1-1 interface message chart. At 1702 the CGW 214 may send an X1-1 Ready message to a LEMF 1112. The Ready message may include one or more of the following fields: Message Type, CGW Identity, CGW Capabilities, or Nonce. The Message Type field may identify (e.g., uniquely) the message. A CGW Identity field may include parameters that may identify the CGW device. For example, the CGW Identity field may include an IMSI-like field identifying the CGW, a geo-location, an IP address, and/or a parameter that may uniquely identify the CGW. A CGW Capabilities field may include capabilities of the CGW, such as parameters that indicate whether LIPA and/or L-SIPTO are supported by the CGW as well as whether the CGW supports inter-CGW communications (e.g., Extended LIPA). A Nonce field may include a unique ID to identify the message.

Messages that traverse the X1-1 interface may indicate to the LEMF that the CGW is up and running and/or ready to receive LI configurations. The LEMF may not send X1-1 Command messages to the CGW until the X1-1 CGW Ready message is received from the CGW. If the CGW is power cycled, reset, reconfigured, and/or software is updated, the CGW may not retain the LI configuration, and the LEMF may resend configuration information pertaining to devices targeted for surveillance. For example, if the CGW has been configured with LI configuration for several devices and if the CGW is power cycled, the CGW may issue the X1-1 CGW Ready message after it has been restarted. The LEMF may resend the X1-1 Configuration message for each target of surveillance, for example if the CGW has not retained the previous LI configuration it had prior to being restarted.

At 1704, the LEA 1204 may request a lawful intercept action. At 1706, the LEMF may send an X1-1 Command message to the CGW for an IMSI associated with the CGW to activate surveillance, deactivate surveillance, and/or request the state of surveillance. The Command message may include one or more of the following fields: Message Type, Target IMSI, Action, or Nonce. A Message Type field may identify the message. A Target IMSI field may include an IMSI that corresponds to a device that the LEMF may desire to interrogate. An Action field may include one or more actions that the LEMF may desire to configure. For interaction with the CGW, one or more actions may be defined, for instance: Activate IRI event surveillance only, Activate the IRI event and the CC surveillance, Deactivate surveillance, or Interrogate surveillance status.

If the Action field indicates enablement of IRI event surveillance, the CGW may begin reporting IRI events for that particular IMSI, for example, via the X2 interface. If the Action field indicates enablement of IRI and CC surveillance, the CGW may begin reporting IRI events for that particular IMSI, for example via the X2 interface, and may begin reporting CC data, for example, via the X3 interface. If the Action indicates deactivation of surveillance for a particular IMSI, the CGW may stop reporting IRI events, for example via the X2 interface, and/or may stop reporting CC data, for example via the X3 interface. If the Action is to interrogate the configured surveillance status for a particular IMSI, the CGW may respond with an X1-1 Response message, for example including a currently configured surveillance status. The Nonce field may include a unique ID, for example that may identify the message.

At 1708, the CGW may respond with an X1-1 Response message. A one-to-one relationship may exist between X1-1 Command messages and corresponding X1-1 Response messages. At 1710, the LEMF 1112 may send an LI ACK messages to the LEA.

An X1-1 Response message, for example from the CGW to the LEMF, may include one or more of the following fields: Message Type, Result, or Nonce. The Message Type field may identify the message. The Result field may indicate whether the X1-1 Command message was properly received and/or processed by the CGW, and may include results for sending to the LEMF. For example, the Result field may include: Success, Failure, or Interrogation Results. Success may indicate that the X1-1 Command message was received, decoded and acted upon without incident. Failure may indicate that the X1-1 Command message was received, but not decoded and/or not acted-upon. Interrogation Results may include, for example, the results of an X1-1 Command message that may interrogate the status of a particular IMSI. Results may include the IMSI and the status of surveillance for that IMSI as follows: IRI Active, IRI/CC Active, and/or Not Active.

If the CGW is interrogated for the status of surveillance for an IMSI that has been previously configured for surveillance, the CGW may respond with the current state of surveillance for that IMSI, for example with the IRI Active or IRI/CC Active states. If the CGW is interrogated for the status of surveillance for an IMSI that has been previously deactivated for surveillance, the CGW may respond with the Not Active state. If the CGW is interrogated for the status of surveillance for an IMSI that has not yet been configured for LI, the CGW may respond with the Not Active state.

A Nonce field in an X1-1 Response message may be set to the value of the Nonce field in the X1-1 Command message plus one. This logic may allow the LEMF to match the X1-1 Command and X1-1 Response messages. If the X1-1 Command message is not received by the CGW, there may be no X1-1 Response message from the CGW.

Figure 19:
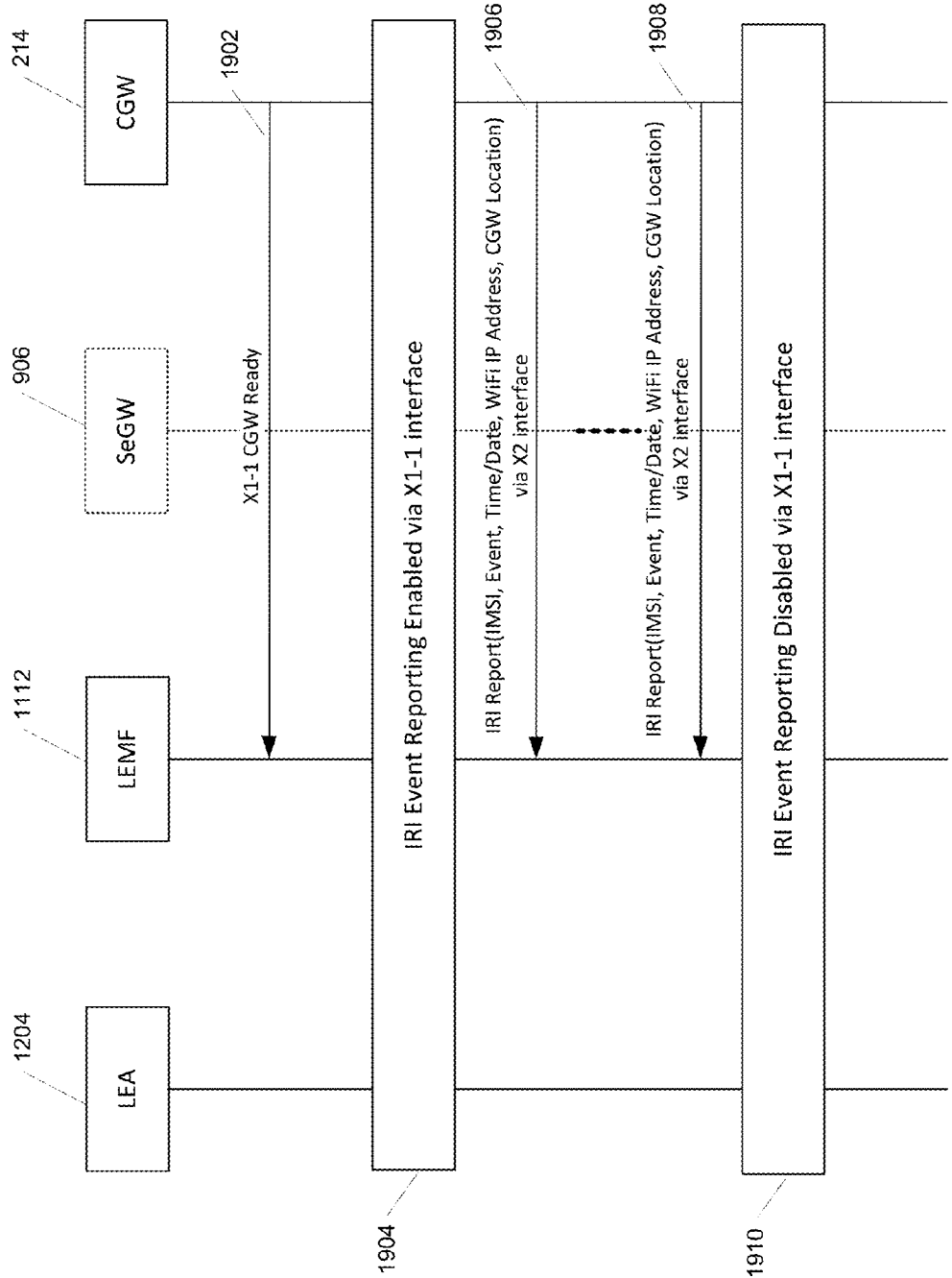
FIG. 19 is a diagram illustrating an example of an X2 interface message chart.

An X2 interface may transport event data for one or more IMSIs, for example from a CGW to the LEMF. FIG. 18 illustrates example messages that may traverse an X2 Interface. As illustrated in FIGS. 15 and 19, a CGW 214, e.g., via an X2 interface, may report one or more IRI events to the LEMF 1112. An IRI Report message sent over an X2 interface from the CGW to the LEMF, may include one or more of the following fields: Message Type, IMSI, Event, Time of Event, Date of Event, IP Addresses of Interest, or CGW Location.

A Message Type field may uniquely identify the message. An IMSI field may be set to the IMSI that is the subject of the IRI Event message. An Event field may be set to one of the following values: Start of Intercept with WiFi Connection Active, WiFi Connection Establishment, WiFi Connection Disconnect, Start of Intercept with LIPA Connection Active, LIPA Connection Establishment, or LIPA Connection Disconnect. A Time of Event field may be set to a time that the event was captured by the CGW. A Date of Event field may be set to a date when the event was captured by the CGW. An IP Addresses of Interest field may include one or more IP addresses relevant to the event, such as a locally assigned WiFi IP address and/or a LIPA IP address. A CGW Location field may include the geo-location of the CGW, the PLMN to which the CGW is connected, and/or an EPC-based IP address of the CGW.

Reportable IRI events may include one or more of Mobile Station (MS) Attach and/or Detach, Packet Data Protocol (PDP) Context Activation and/or Deactivation and/or Modification, Start of Intercept with PDP Context Active, Start of Intercept with MS Attached, Routing Area (RA) Update, SMS Events, Serving System, Start of Intercept with WiFi Connection Active, or WiFi Connection Establishment, or Disconnect. These events (except the WiFi Connection Establishment and/or Disconnect event) may involve EPC elements and may be performed by the CGW without notification.

FIG. 19 illustrates an example X2 interface MSC. At 1902, a CGW 214 may send a CGW Ready message to an LEMF 1112. The LEMF may activate LI for a device. If the LEMF 1112 activates LI for a device with an established WiFi connection managed by the CGW 214, at 1906-1908, the CGW may issue an IRI Report message with the Event field set to Start of Intercept with WiFi Connection Active. If the LEMF activates LI for a device and subsequently a WiFi connection managed by the CGW is established and/or disconnected, the CGW may issue an IRI Report message with the Event field set to WiFi Connection Establishment or Disconnect events.

If the LEMF activates LI for a device with an established LIPA connection managed by the CGW, the CGW may issue an IRI Report message with the Event field set to Start of Intercept with LIPA Connection Active. If the LEMF activates LI for a device and subsequently a LIPA connection managed by the CGW is established and/or disconnected, the CGW may issue an IRI Report message with the Event field set to LIPA Connection Establishment or Disconnect events.

At 1910, the LEMF may deactivate the IR event reporting. If the LEMF deactivates LI for a device, the CGW may stop (e.g., immediately) reporting IRI events, for example via the X2 interface. The CGW may report IRI events for a duration during which the LI is activated.

A local gateway (e.g., a CGW) may be a target of LI surveillance. A CGW may be configured to report one or more CGW-related events to the LEMF. CGW-related events may be reported to the LEMF, for example via the IRI Report message. The events may include one or more of: CGW connected to EPC, CGW disconnected from EPC, CGW powered off, CGW power cycled, CGW restarted, CGW reloaded, and/or CGW software updated, H(e)NB connected to CGW, CGW Access List Modification and/or Creation and/or Deletion of CGW Access List, Cellular and WiFi IP Address linkage, IP Flow Mobility (IFOM) Status, or other CGW-related events.

CGW Access List events may relate to a CGW having an access list of user devices that are permitted to connect to and/or connect through the CGW. A CGW list may function similar to a CSG list and may be maintained by the CGW. A CGW may be configured with a reporting requirement, for example, if it has, maintains, and/or uses an access list.

A CGW may report a linkage between a cellular and a WiFi IP address that may be deduced by the CGW. Information pertaining to a cellular and WiFi IP address linkage may be helpful to one or more LEAs, for example if the LEAs receive traffic that appears to be addressed to two different IP addresses that in reality correspond to the same device.

The IFOM Status may include the state of IFOM for a particular user. For example, IFOM Status may include whether aggregation or segregation is being performed for the user and/or other pertinent state information that may assist law enforcement in surveillance efforts. For example, IFOM status may inform the LEMF as to how data traffic is being sent to the target of surveillance. For instance, in a particular jurisdiction, IFOM status information may be relevant as to the access used to deliver data to a specific surveillance target.

An X3 interface may carry content of communications (CC) data from the CGW to the LEMF, for example CC data pertaining to specific IMSIs. The CC data may include uplink and downlink L-SIPTO and/or LIPA IP traffic that passes through the CGW. It may not include circuit switched data, SMS traffic, or any non-IP traffic, and may not include IP traffic that passes through the EPC (e.g., non-L-SIPTO or non-LIPA data). The CGW may route CC data for a particular IMSI to the LEMF while LI is active for that particular IMSI or may route respective CC data for a plurality of IMSIs, for instance for each IMSI connected to the CGW, to the LEMF while LI is active for the CGW.

FIG. 20 illustrates example messages that may traverse the X3 Interface. A CC Report message, for example sent over an X3 interface from the CGW to the LEMF, may include one or more of the following fields: Message Type, IMSI, Time/Date Stamp, Direction, CGW Location, Start of Segment, End of Segment, Number of Bytes of IP Packet, Sequence Number, or IP Packet. A Message Type field may uniquely identify the message. An IMSI field may be set, for example, to the IMSI that is the subject of the CC message. A Time/Date Stamp field may be set, for example, to the time and date that the packet was replicated at the CGW. A Direction field may indicate a direction of the IP packet, for example, Mobile Terminated (MT) or Mobile Originated (MO). A CGW Location field may include, for example, the geo-location of the CGW, the PLMN to which it is connected, and/or its EPC-based IP address.

A Start of Segment field may indicate whether the IP Packet field corresponds to a beginning of an IP packet or not. For example, if the Start of Segment field is set to TRUE, it may indicate that the IP Packet field is the start of a new IP packet. If the Start of Segment field is set to FALSE, it may indicate that the IP Packet field is a continuation of an IP packet that was started in a previous message and that was segmented over successive CC Report messages. An End of Segment field may indicate whether the IP Packet field corresponds to an end of an IP packet or not. If the End of Segment field is set to TRUE, it may indicate that the contents of the IP Packet field end an IP packet. If the End of Segment field is set to FALSE, may indicate that the IP Packet field continues in a subsequent CC Report message.

A Sequence Number field may be set to a unique number for each CC Report message. A Sequence Number field may start at zero and may increment for each message up to a maximum. After that maximum is reached, the field may reset at zero and may continue incrementing. An IP Packet field may include a copy of the IP packet detected at the CGW. The CGW may segment a replicated packet into two or more CC Report messages. If the IP packets are small, they may be grouped together into a single CC Report message.

If a CC message includes an entire IP packet (e.g., if no packet segmentation was performed), both the Start of Segment and End of Segment may be set to TRUE. If an IP packet is too large to fit in the IP Packet field of a CC message, the IP packet may be segmented. If the IP packet is segmented into two messages, the first CC message may indicate that it is the start of a new IP packet, for example by having the Start of Segment field set to TRUE and the End of Segment field set to FALSE. The second message may indicate that it includes the end of the IP packet, for example by having the Start of Segment field set to FALSE and the End of Segment field set to TRUE.

Figure 21:
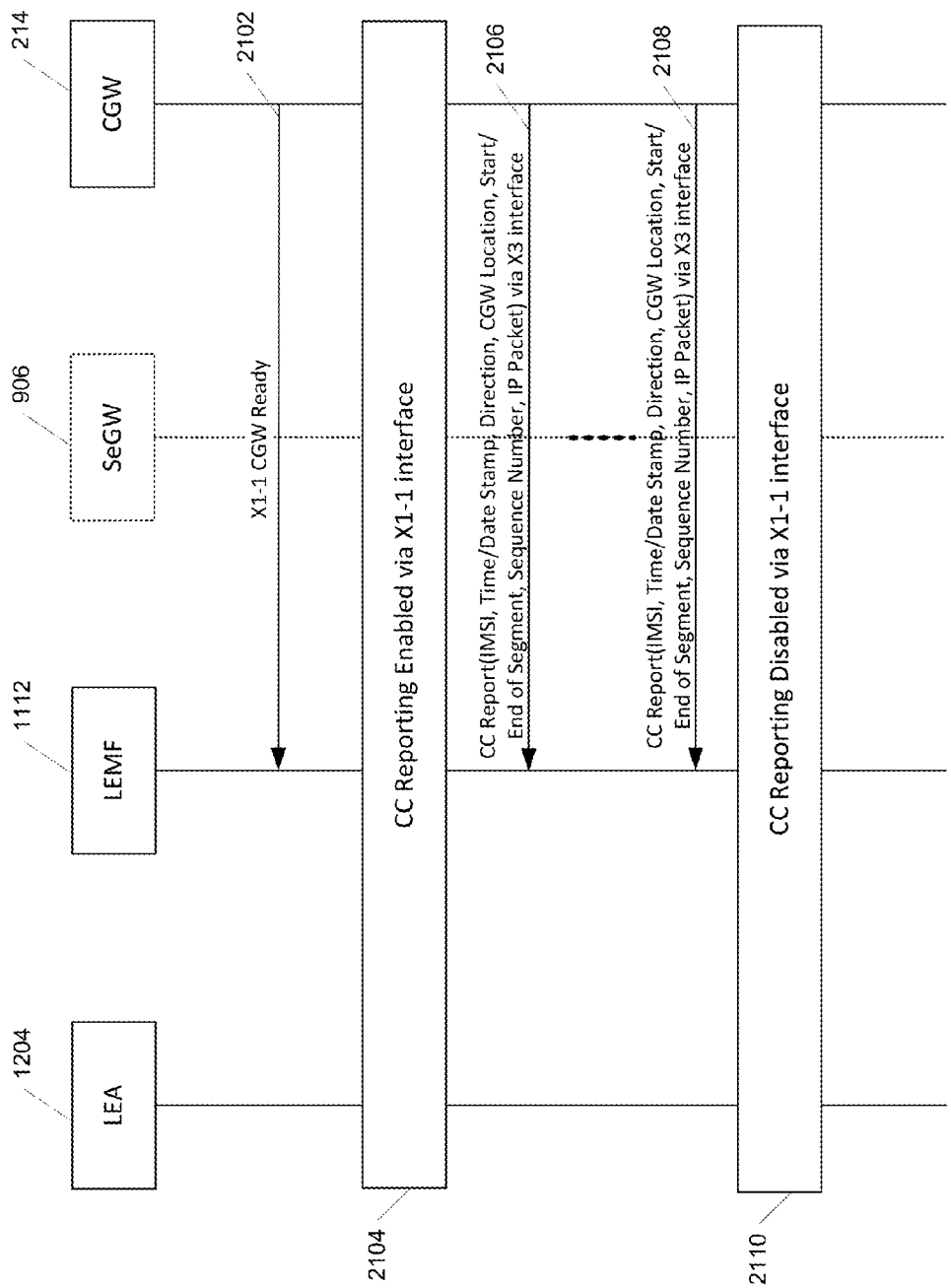
FIG. 21 is a diagram illustrating an example of an X3 interface message chart.

FIG. 21 illustrates an example X3 interface message chart. At 2102, a CGW 214 may send a CGW Ready message to the LEMF 1112. At 2104, the LEMF may activate CC Reporting for a device via X1-1 interface. At 2106-2108, the CGW may send a CC Report message via an X3 interface. At 2110, the LEMF, via X1-1 interface, the LEMF may send a disable CC Reporting message to the CGW. The X1-1, X2, and X3 messages may not be limited to the contents described herein. For example, one or more of the X1-1, X2, or X3 messages, respectively, may include one or more other parameters, as desired.

A physical interface may be established between a LEMF, which may be resident in a core network (e.g., an EPC), and a local gateway (e.g., a CGW) that may be associated with, but not resident in, the core network. The data transported across the interface may leave the core network. For example, data traversing an interface between a local gateway and a core network may be transported over the public Internet.

As illustrated in FIG. 14, to protect the content of messages sent over the interfaces established between a local gateway and a core network, an Internet Protocol Security (IPsec) tunnel 1408 may be established between the local gateway (e.g., a CGW 214) and a Security Gateway (SeGW), such as a SeGW 906 located at an edge of the core network. Implementing IPSec tunneling may allow messages transported over interfaces established between a local gateway and a core network to be protected. The X1-1, X2, and/or X3 interfaces may be encrypted and/or may use integrity protection. Additional layers of encryption and integrity protection may be implemented. Keys and certificates that may provide IPSec security may be pre-configured within the local gateway or may be dynamically provisioned.

An LEMF may have an interface to each ICE and INE within a core network (e.g., an EPC). The LEMF may be informed of respective EPC-based IP addresses of each ICE and/or INE within the EPC. The LEMF may be informed of one or more local gateways (e.g., a CGW) with which it may communicate. For example, if a DNS Server within the EPC maintains one or more lists of IP addresses for the Fully Qualified Domain Names (FQDNs) ICE and INE, one or more CGWs may be added to one or more of the lists. Therefore, when the LEMF resolves the ICE or INE FQDNs, it may receive the EPC-based IP addresses, and may receive a list of CGW IP addresses to which it may communicate. The above-described techniques may be applied to discovery of one or more local gateways (e.g., CGWs) by an LEMF and/or for discovery of the LEMF by the one or more CGWs.

A CGW and/or a LEMF may mutually authenticate each other, for instance to ensure that both the CGW and the LEMF are communicating with a trusted node. The CGW may authenticate the LEMF while the LEMF may authenticate the CGW. The method of authentication may be a valid method, for example using predefined keys and/or certificate based authentication.

A TCP connection between the CGW and the LEMF may be sufficiently sized such that each of the X3 messages sent by the CGW may be received by the LEMF. If one or more packets between the CGW and the LEMF are lost, the LEMF may notice this, as the sequence numbers of the received X3 CC Report messages may not be consecutive.

A CGW may have a list of each device on an operator's network that is the subject of surveillance. The LI function of the CGW may be placed in secure, tamper-resistant, limited access hardware, such as a Trusted Environment (TrE) (e.g., where IPsec credentials are stored), or the like. If the secure hardware is removed from the CGW or is accessed within the CGW, the secure hardware may trigger a self-destruct mechanism. Failure to properly secure information stored in the secured hardware may result in the compromise of law enforcement activities. If a CGW is compromised, or is suspected of being compromised, the CGW may not allow LIPA or L-SIPTO IP flows.

Figure 22:
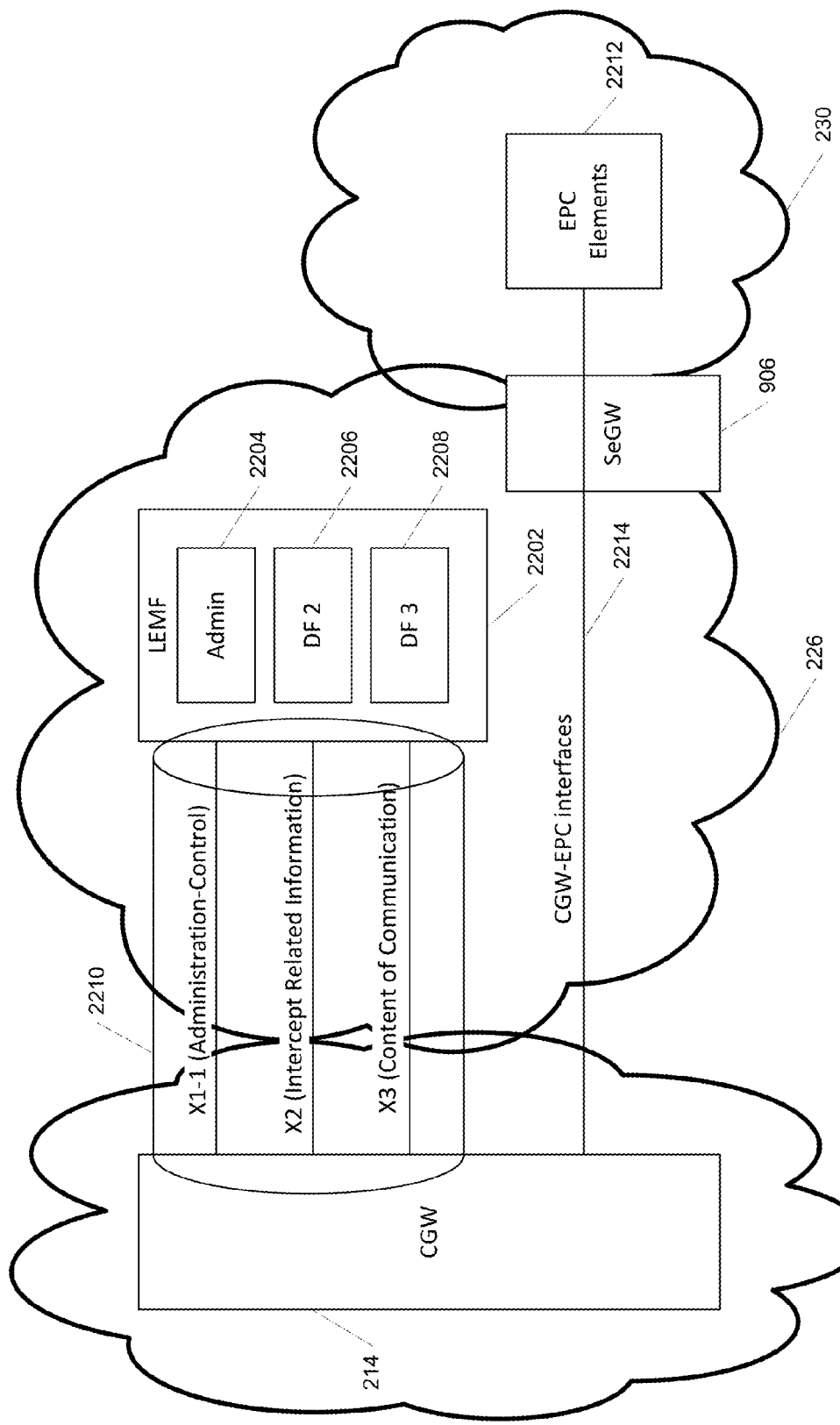
FIG. 22 is a system diagram illustrating an example of an LI architecture that employs a public lawful enforcement management function (LEMF) server.

FIG. 22 illustrates an example LI architecture that may provide LI for local traffic routed by a local gateway (e.g., a CGW 214) that is associated with, but not resident in, a core network (e.g., an EPC 230). The CGW 214 may be connected to the EPC 230, e.g., via CGW-EPC interfaces 2214. As illustrated in FIG. 22, the LEMF 2202 may be located outside the EPC 230, for example in the public Internet 226. The CGW 214 and the LEMF 2202 may discover each other, and a secure tunnel 2210 may be established between the CGW 214 and the LEMF 2202. The tunnel may be an IPSec tunnel or may be a secure method of communication that may mutually authenticate each entity and/or may provide data encryption. After the tunnel is established, the LEMF 2202 and the CGW 214 may communicate, for example via the X1-1, X2, and/or X3 interfaces.

Figure 23:
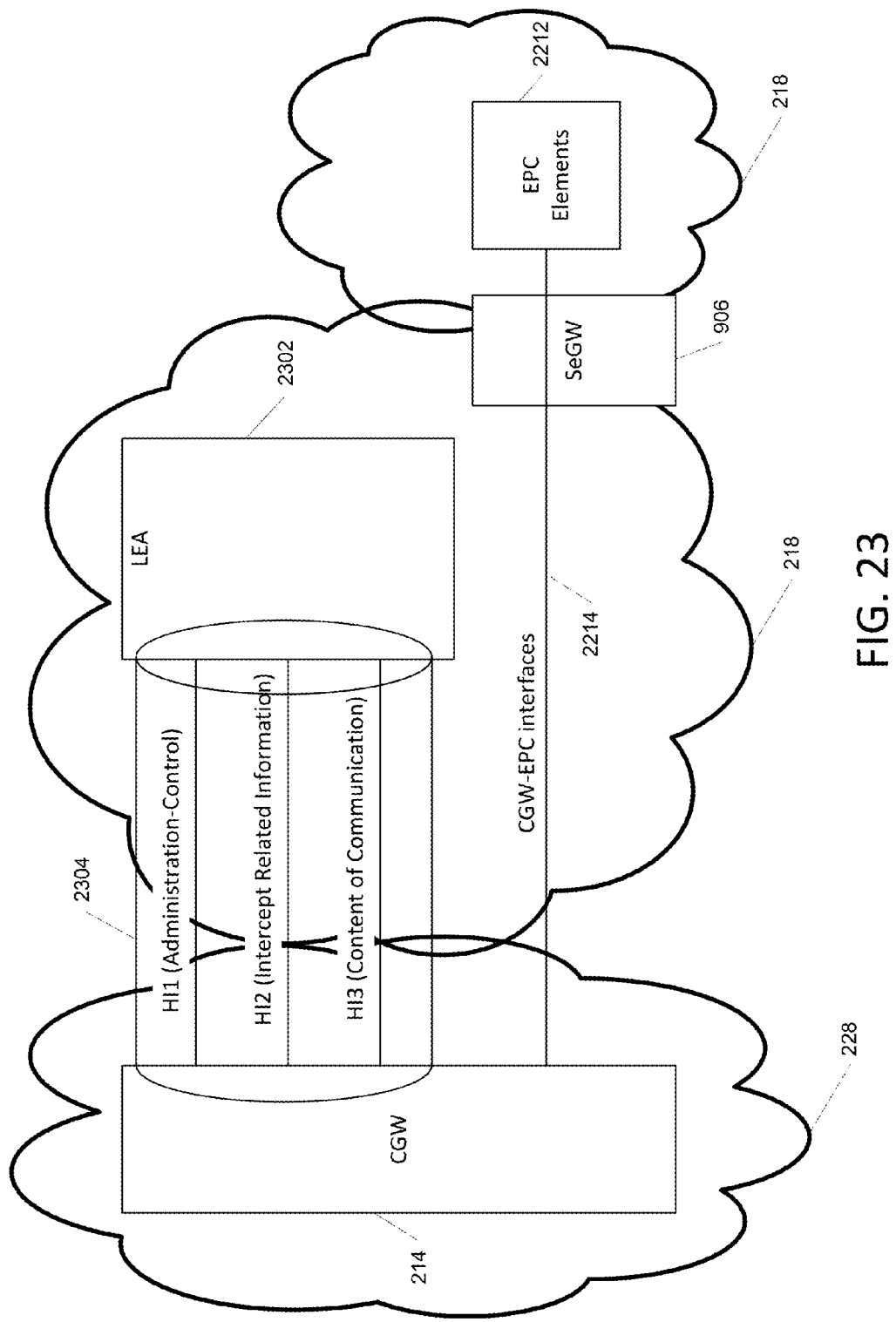
FIG. 23 is a system diagram illustrating an example of an LI architecture that employs a direct interface between a law enforcement agency (LEA) and a gateway that is associated with, but not resident in, a core network.

FIG. 23 illustrates an example LI architecture that may provide LI for local traffic routed by a local gateway (e.g., a CGW 214) that is associated with, but not resident in, a core network (e.g., an EPC 230). The LEA 2302, which may be located outside the EPC, for example in the public Internet, may connect directly to the CGW, for example bypassing an LEMF (not shown) located within the EPC 2212. As illustrated in FIG. 23, the LEA 2302 and the CGW 214 may discover each other, and a secure tunnel 2304 may be established between the CGW 214 and the LEA 2302. The tunnel may be an IPSec tunnel or may be a secure method of communication that may mutually authenticate the CGW and the LEA and/or may provide data encryption. After the tunnel 2304 is established, the LEA 2302 and the CGW 214 may communicate, for example via the HI interfaces (e.g., HI1, HI2, and/or HI3). The LEMF functionality may be enabled in the CGW. The HI1 interface may be used for administration control. The HI2 interface may be used to report intercept related information (IRI) events. The HI3 interface may be used to report CC Reports.

Figure 24:
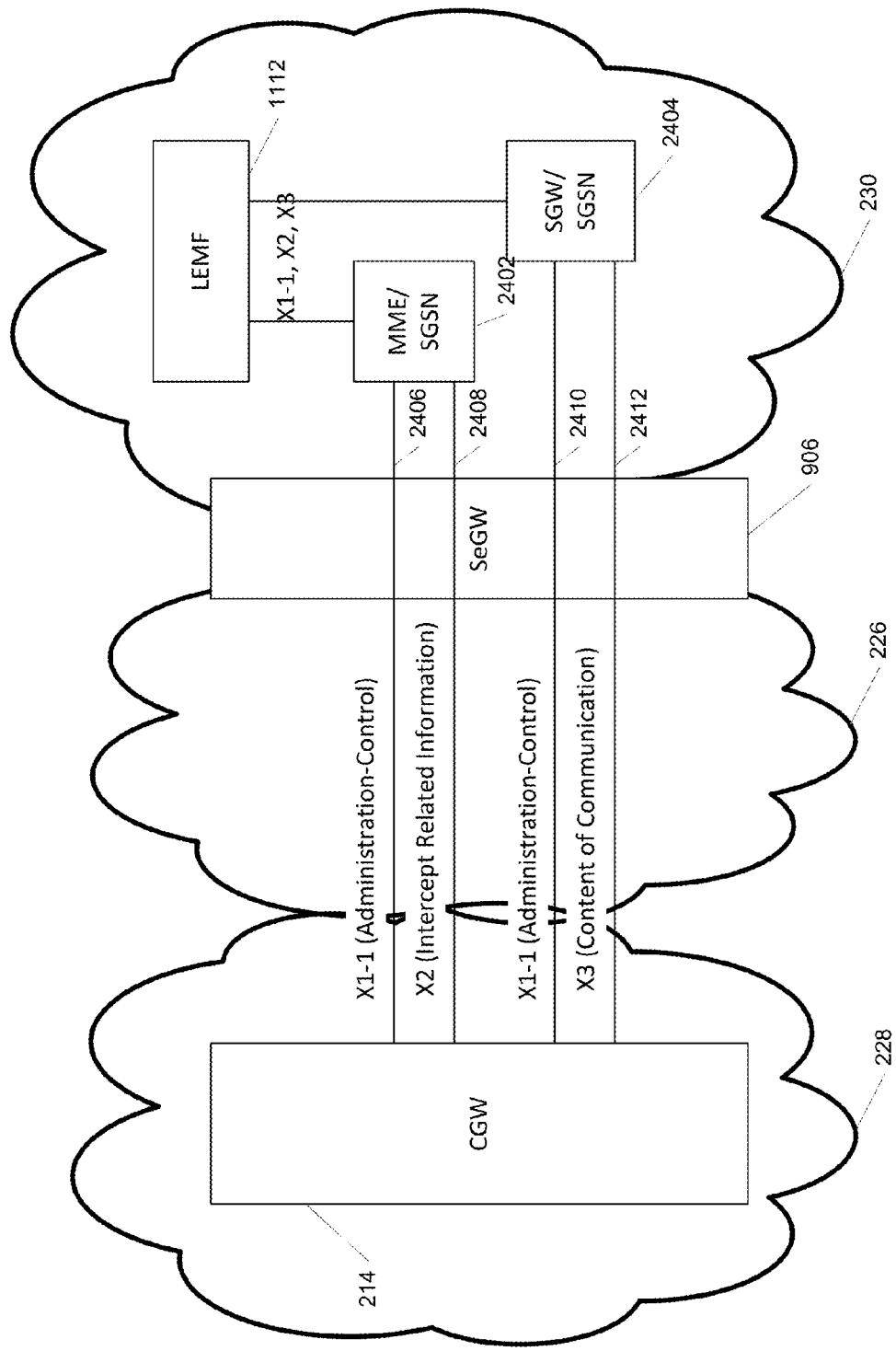
FIG. 24 is a system diagram illustrating an example of an LI architecture that employs an indirect interface between a LEMF and a gateway that is associated with, but not resident in, a core network.

FIG. 24 illustrates an example LI architecture that may provide LI for local traffic routed by a local gateway (e.g., a CGW 214) that is associated with, but not resident in, a core network (e.g., an EPC 230). As illustrated in FIG. 24, the CGW 214 may not have a direct connection to the LEMF 1112 within the EPC 230. The CGW may receive surveillance commands from one or more ICE and/or INE components resident in the EPC 230, and may provide IRI events and/or CC data to the one or more ICE and/or INE components resident in the EPC. The one or more ICE and/or INE components resident in the EPC may be aware of the CGW 214 and may, upon receipt of commands from the LEMF 1112 (e.g., commands received over the X1-1 interface), forward any appropriate commands to the CGW 124. When the CGW 214 reports an IRI event and/or provides an CC data to the one or more ICE and/or INE components resident in the EPC 230, the one or more ICE and/or INE components resident in the EPC may forward the information to the LEMF 1112, for example via the X2 and/or X3 interfaces. While the one or more ICE and/or INE components resident in the EPC are illustrated as an MME/SGSN 2402 and SGW/SGSN 2404, the one or more ICE and/or INE components resident in the EPC may be an INE and/or ICE devices within the core network.

Figure 25:
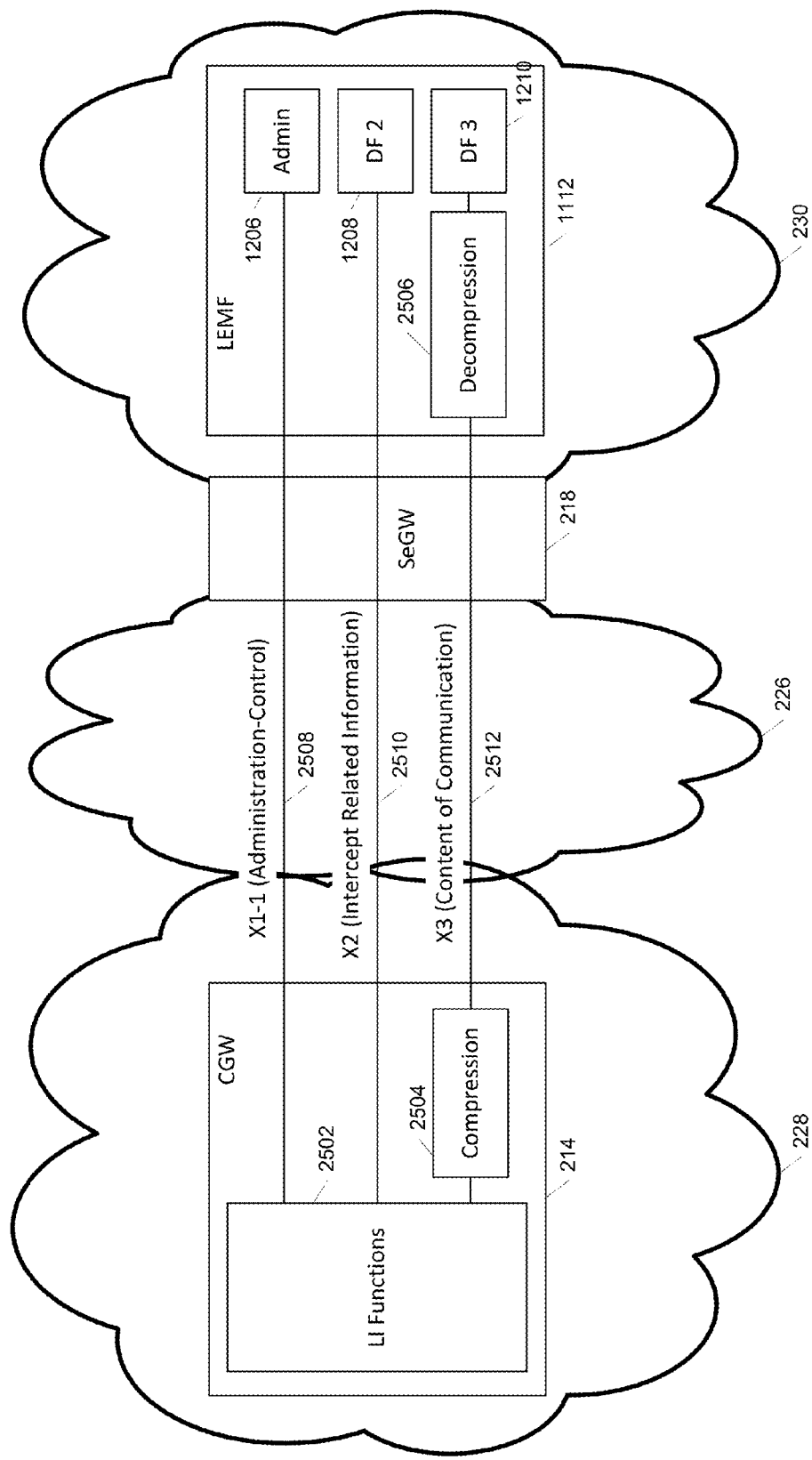
FIG. 25 is a system diagram illustrating an example of an LI architecture that employs compression over an X3 interface.

FIG. 25 illustrates an example LI architecture that may provide LI for local traffic routed by a local gateway (e.g., a CGW 214) that is associated with, but not resident in, a core network (e.g., an EPC 230). As illustrated in FIG. 25, the X1-1 (2508) and X2 (2510) interfaces may be configured to function as described herein with reference to FIG. 14 and the X3 2512 interface may be configured to function differently than as described herein with reference to FIG. 14. A direct connection may be established between the CGW 214 and the LEMF 1112. Content of Communication (CC) transported over the X3 interface may be compressed, for example using a lossless compression algorithm (2504), to reduce an amount of bandwidth consumed over the X3 interface between the CGW 214 and the LEMF 1112. The CC received at the LEMF 1112 may be decompressed (2506).

A lossless compression technique may be used, for example including but not limited to Lempel-Ziv-Welch (LZW) or run-length encoding (RLE). The compression technique implemented may differ, for instance depending on the type of IP data and/or characteristics of IP data that is being compressed. For example, some data may be more compressible using a first select compression algorithm over another, while a different set of data may be more compressible with a second select compression algorithm that is different from the first compression algorithm. The compression technique implemented may vary, for example, during the course of a LI surveillance.

An X3 CC Report message in accordance with the illustrated architecture may include one or more of the following fields: Message Type, IMSI, Time and/or Date Stamp, Direction, CGW Location, Compression Algorithm, Start of Compressed Segment, End of Compressed Segment, Sequence Number, or Compressed IP Packet Content. A Message Type field may uniquely identify the message. An IMSI field may be set to an IMSI that may correspond to a subject of the CC message. A Time and/or Date Stamp field may be set to a time and/or a date that the packet was replicated at the CGW. A Direction field may indicate a direction of the IP packet, for example Mobile Terminated (MT) or Mobile Originated (MO). A CGW Location field may include, for example, the geo-location of the CGW, the PLMN to which it is connected, and/or its EPC-based IP address. A Compression Algorithm field may include a method used to compress the IP packets.

A Start of Segment field may indicate whether the Compressed IP Packet Content field corresponds to a beginning of compressed IP packets or not. If the Start of Segment field is set to TRUE, it may indicate that the message is a start of compressed IP packet data. If the Start of Segment field is set to FALSE, it may indicate that the Compressed IP Packet Content field may be a continuation of compressed IP packet content that was started in a previous message and that was segmented over successive CC Report messages. An End of Segment field may indicate whether the Compressed IP Packet Content field corresponds to an end of compressed IP packets or not. If the End of Segment field is set to TRUE, it may indicate that the message is the end of compressed IP packet data. If the End of Segment field is set to FALSE, it may indicate that the Compressed IP Packet Content field continues in a subsequent CC Report message.

A Sequence Number field may be set to a unique number for each CC Report message. A Sequence Number field may start at zero and may increment for each message up to a maximum. After that maximum is reached, the field may reset at zero and may continue incrementing.

Decompression may occur within the LEMF of the core network (e.g., an EPC 230). If the LEMF is aware of the compression method used, the LEMF may at least partially perform the decompression. The decompression may occur anywhere between the CGW and the LEMF, such as in the SeGW or in an element within the EPC.

Figure 26:
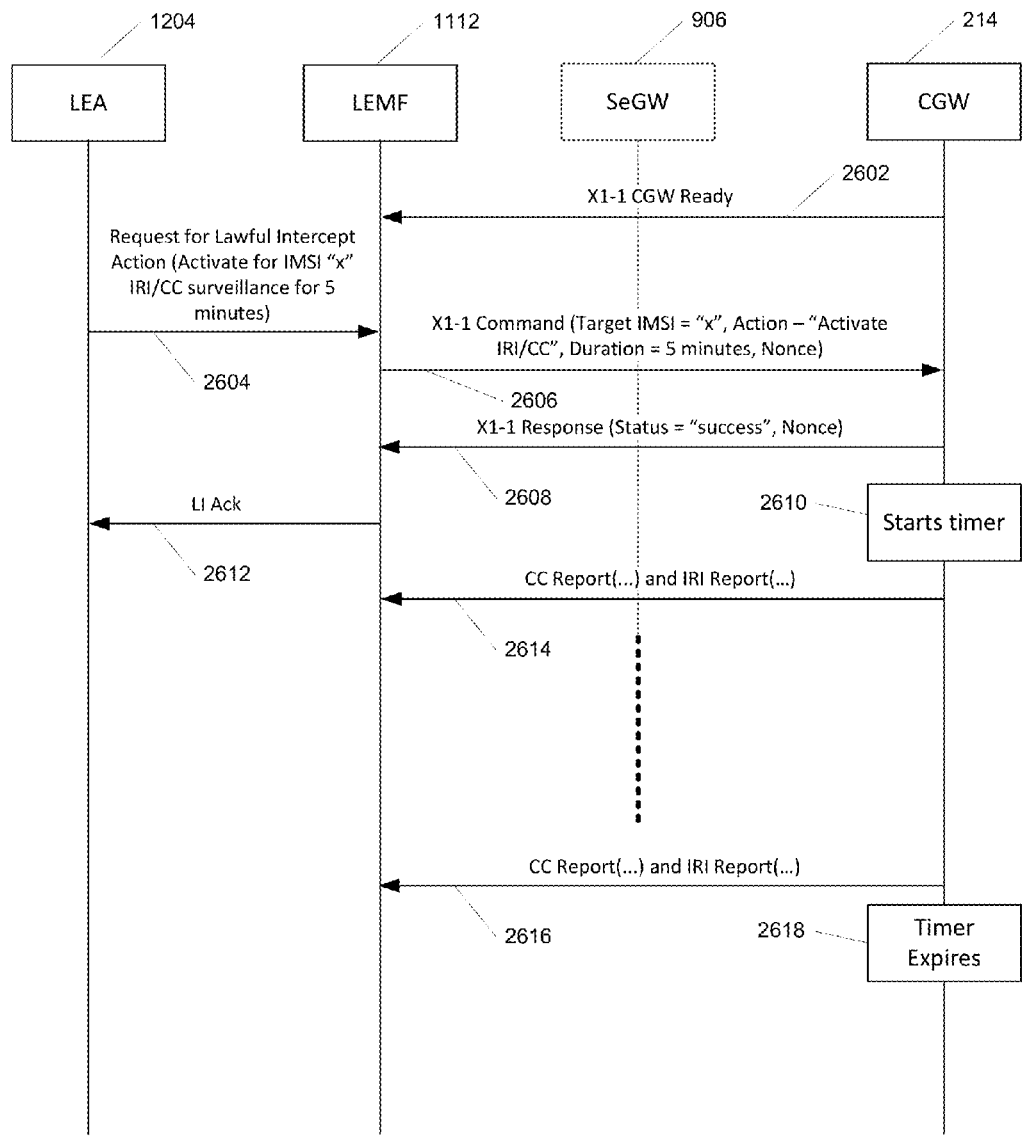
FIG. 26 is an example message chart of an LI activation duration.

FIG. 26 illustrates an example MSC pertaining to the X1-1 interface messaging. The X2 and X3 interfaces may be configured to function as described herein with reference to FIG. 14 and the X1-1 interface may be configured to function differently than as described herein with reference to FIG. 14. A direct connection may be established between the CGW and the LEMF. The format of the X1-1 Command message may be different than as described herein with reference to FIG. 14. The LEMF may activate surveillance of a specific user device for a specific period of time. The time may be a finite amount of time or may be infinite. The X1-1 Command message may include one or more of the following fields: Message Type, Target IMSI, Action, Duration of Surveillance, or Nonce. The listed fields, with the exception of the Duration of Surveillance field, may be configured to function as described herein with reference to FIG. 14.

A Duration of Surveillance field may include a time duration to indicate how long the CGW is to perform surveillance of a specific target. The time duration may be a finite amount of time, for example five minutes, 3,600 seconds or two weeks. The time duration may be infinite, such that the CGW is to perform surveillance until a deactivation message is received from the LEMF.

As illustrated in FIG. 26, at 2602, the CGW 214 may send a CGW Ready message to the LEMF 1112. At 2604, the LEA may send a request for LI for an active IMSI. The LEA may request an LI for 5 minutes time. At 2606, the LEMF may specify a time that an action may be performed. At 2608, the CGW 214 may send a Response message to the LEMF 1112. At 2612, the LEMF may send an LI ACK to LEA. By contrast, in accordance with X1-1 interface messaging as described herein with reference to FIG. 4 actions specified in the X1-1 Command messages may be performed immediately, or as soon as the CGW receives and parses the message. To implement the an X1-1 interface messaging scheme in which the LEMF may specify a time that an action may be performed, the CGW 214 and the LEMF 1112 may be time synchronized to a level of tolerance. The CGW may parse the X1-1 Command message and may perform the action at the specified time. At 2610, the CGW may start a timer. If the time for performing the action has expired, the CGW may perform the action (e.g., immediately). An X1-1 Command message may include one or more of the following fields: Message Type, Target IMSI, Action, Action Time, or Nonce. The listed fields, with the exception of the Action Time field, may be configured to function as described herein with reference to FIG. 14. An Action Time field may include a time at which an action specified in the Action field is to be performed. At 2616, the CGW 214 may provide CC Reports to LEMF 1112 until at 2618 the timer expires. At the expiration of the timer, the CGW 214 may stop sending the CC Reports.

Figure 27:
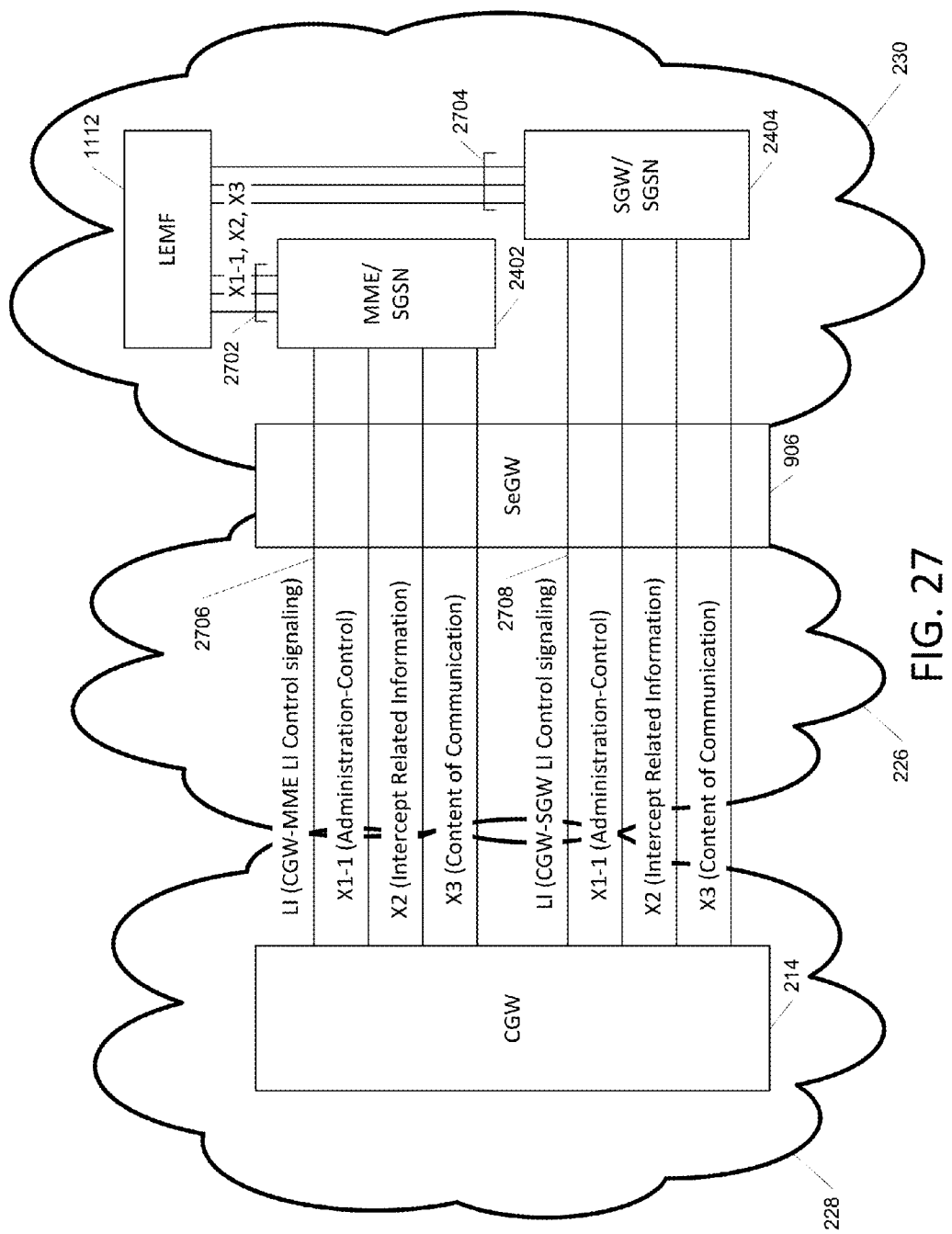
FIG. 27 is a system diagram illustrating an example of an example LI interface.

FIG. 27 illustrates an example LI architecture that may provide LI for local traffic routed by a local gateway (e.g., a CGW 214) that is associated with, but not resident in, a core network (e.g., an EPC 230). The CGW 214 may not interface directly to the LEMF. In accordance with an implementation of the illustrated architecture, the knowledge of the CGW may be limited to the identities of those to be subjected to surveillance that is connected to the EPC via the CGW. The SGW 2404 and the MME 2402 may have a list of surveillance targets. When a device connects to the core network (e.g., an EPC 230) via a local gateway (e.g., a CGW 214), the CGW may know its identity. The CGW may query the SGW or the MME to learn a surveillance status of the device connecting to the EPC. If the SGW or the MME indicates that the device is the subject of surveillance, the CGW may begin surveillance. Surveillance commands communicated from the LEMF 1112 to the MME 2402 and/or the SGW 2402 (e.g., from the time when the CGW begins surveillance onward) may be forwarded to the CGW. When the CGW 214 captures IRI events and/or CC for a user under surveillance, the CGW 214 may forward the IRI events and/or CC to the SGW 2404 and/or MME 2402. The SGW 2404 and/or MME 2402 may route the IRI events and/or CC to the LEMF 1112, or the CGW 214 may directly route the IRI events and/or CC to the LEMF 1112. While the ICE and/or INE components resident in the EPC are illustrated as an MME, SGSN and SGW, the ICE and/or INE components resident in the EPC may be an INE and/or ICE devices within the core network.

In addition to supporting the X1-1, X2 and/or X3 interfaces between the CGW and the MME and/or the SGW, the architecture in FIG. 27 may include an additional interface between the CGW and the MME and/or the SGW. The additional interface may be referred to as an LI interface (2706 or 2708). The LI interface may include an LI Register message that may be sent by the CGW 214 to the MME 2402 and/or the SGW 2404. In the LI Register message, the CGW 214 may indicate to the MME 2402 and/or the SGW 2404 that the CGW desires to register or de-register from receiving LI information for a particular device. The LI Register may include one or more of the following fields: Message Type, Target IMSI, Action, or CGW Identity. A Message Type field may identify this message. A Target IMSI field may have an identity of the device that may have registered with the EPC 230 via the CGW 214.

An Action field may identify an action that the MME and/or the SGW may take with regard to the identity included in the Target IMSI field. If the Action field is set to Register, the MME 2402 and/or the SGW 2404 may know that messages received from the LEMF 1112 and intended for the Target IMSI may be forwarded to the CGW. If the MME 2402, e.g., via 2702 and/or the SGW 2404, e.g., via 2704 received a message from the LEMF 1112 to activate surveillance for a select user device, the MME 2402 and/or SGW 2404 may forward messages received from the LEMF and intended for the Target IMSI to the CGW 214. If the Action field is set to De-Register, the MME and/or the SGW may know that the Target IMSI may no longer be under the purview of the CGW 214 and that the MME 2402 and/or the SGW 2404 no longer may have to relay LI signals from the LEMF 1112 to the CGW 214.

Figure 28:
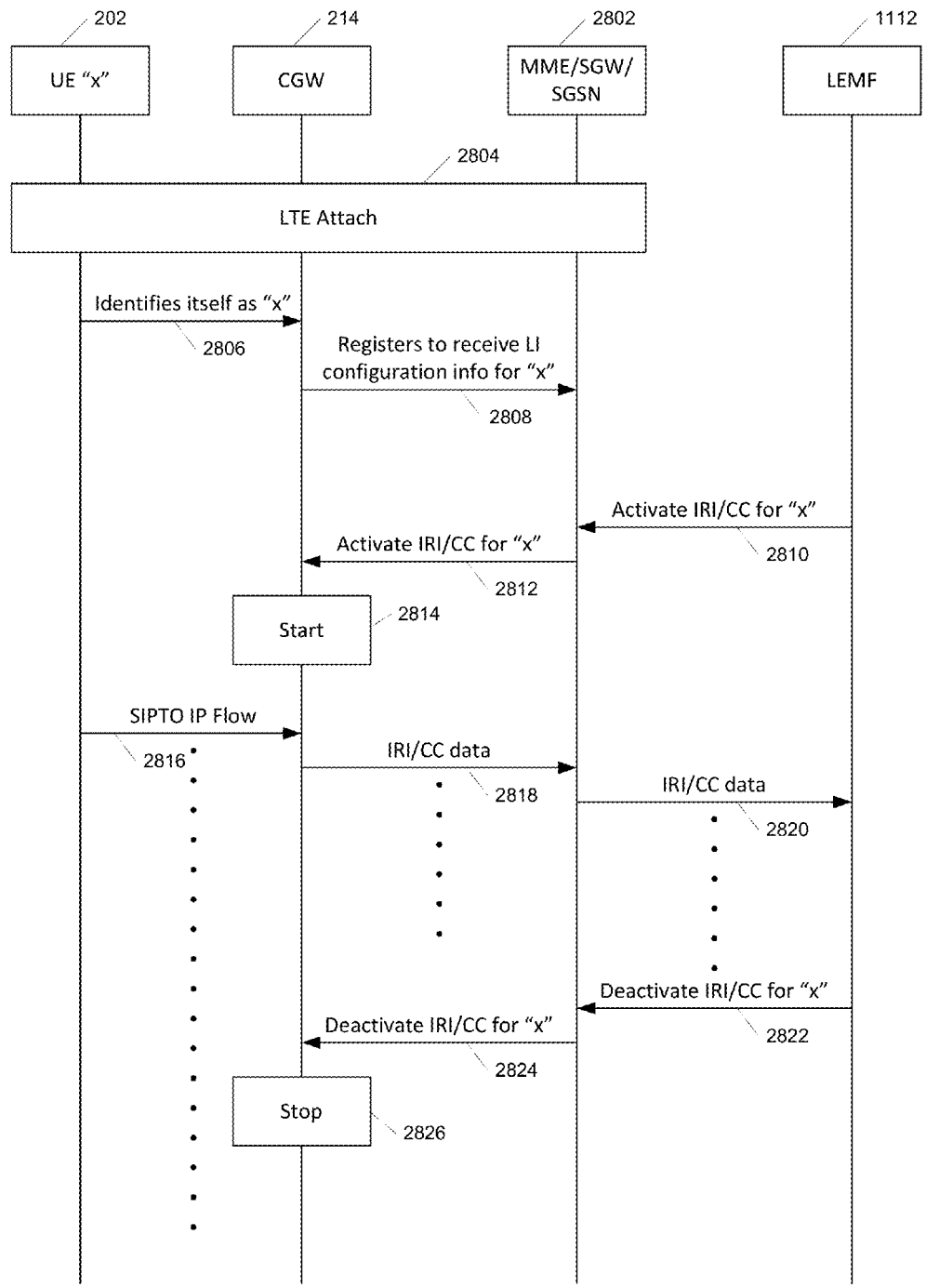
FIG. 28 is an example message chart of the LI interface depicted in FIG. 27.

FIG. 28 is an example message chart illustrating the processing described herein with reference to the exemplary architecture illustrated in FIG. 27. While the ICE and/or INE components resident in the EPC 230 are illustrated in FIG. 27 as an MME/SGSN 2402, and SGW/SGSN 2404, the ICE and/or INE components resident in the EPC 230 may be an INE and/or ICE devices within the core network. At 2804, a UE (e.g., UE x 202) may perform an LTE attach procedure. At 2806, the UE 202 may identify itself to the CGW 214 as x. At 2808, the CGW may register the UE x to receive LI configuration information for the UE x. At 2810, the LEMF 1112 may send an activate signal to MME/SGW/SGSN 2802 to activate an LI (e.g., IRI and/or CC) for the UE x. At 2812, the MME/SGW/SGSN 2802 may forward the activate signal to the CGW. At 2814, the CGW 214 may start monitoring the UE x for IRI and/or CC data. At 2818, the CGW 214 may report the SIPTO IP traffic 2816 to the MME/SGW/SGSN 2802. At 2820, the MME/SGW/SGSN 2802 may forward the IRI and/or CC data to the request LEMF 1112. At 2822, the LEMF may send a deactivate IRI and/or CC signal 2822 to the MME/SGW/SGSN 2802. At 2824, the MME/SGW/SGSN 2802 may forward the deactivate signal to the CGW 214. At 2826, The CGW may stop monitoring the UE x for IRI and/or CC data.

Figure 29:
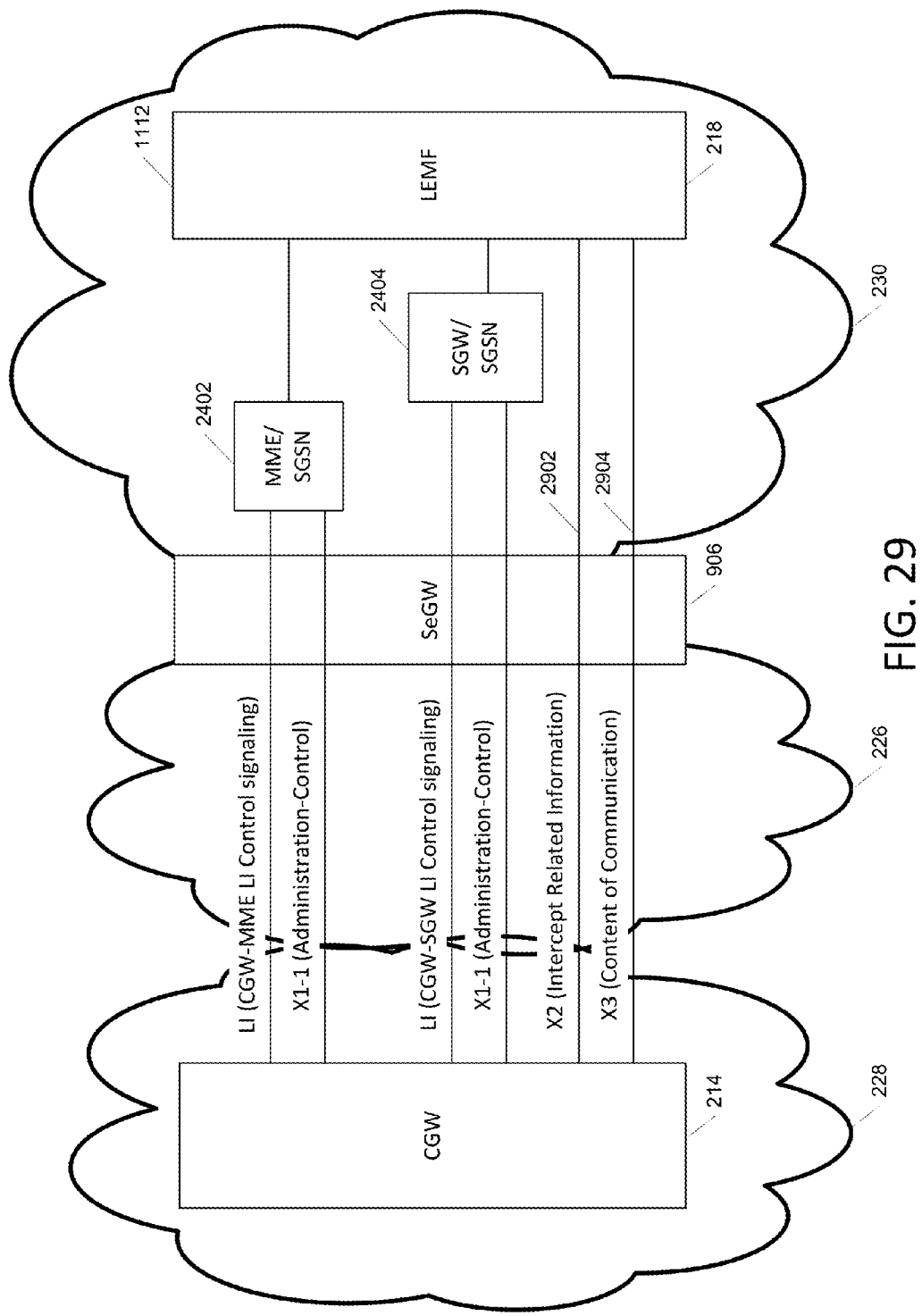
FIG. 29 is a system diagram illustrating an example of an LI interface with direct X2 to X3 interfaces.

FIG. 29 illustrates an example LI architecture of the architecture described herein with reference to FIG. 27. As illustrated in FIG. 29, the CGW 214 may send IRI event, e.g., via 2902 and/or CC data, e.g., via 2904 directly to the LEMF, for example bypassing the MME and/or SGW. The illustrated implementation may minimize efforts of the MME and/or the SGW. For example, the MME 2402 and/or the SGW 2404 may not route X2 and/or X3 data from the CGW to the LEMF. While the ICE and/or INE components resident in the EPC are illustrated as an MME, SGSN and SGW, the ICE and/or INE components resident in the EPC may be an INE and/or ICE devices within the core network.

Figure 30:
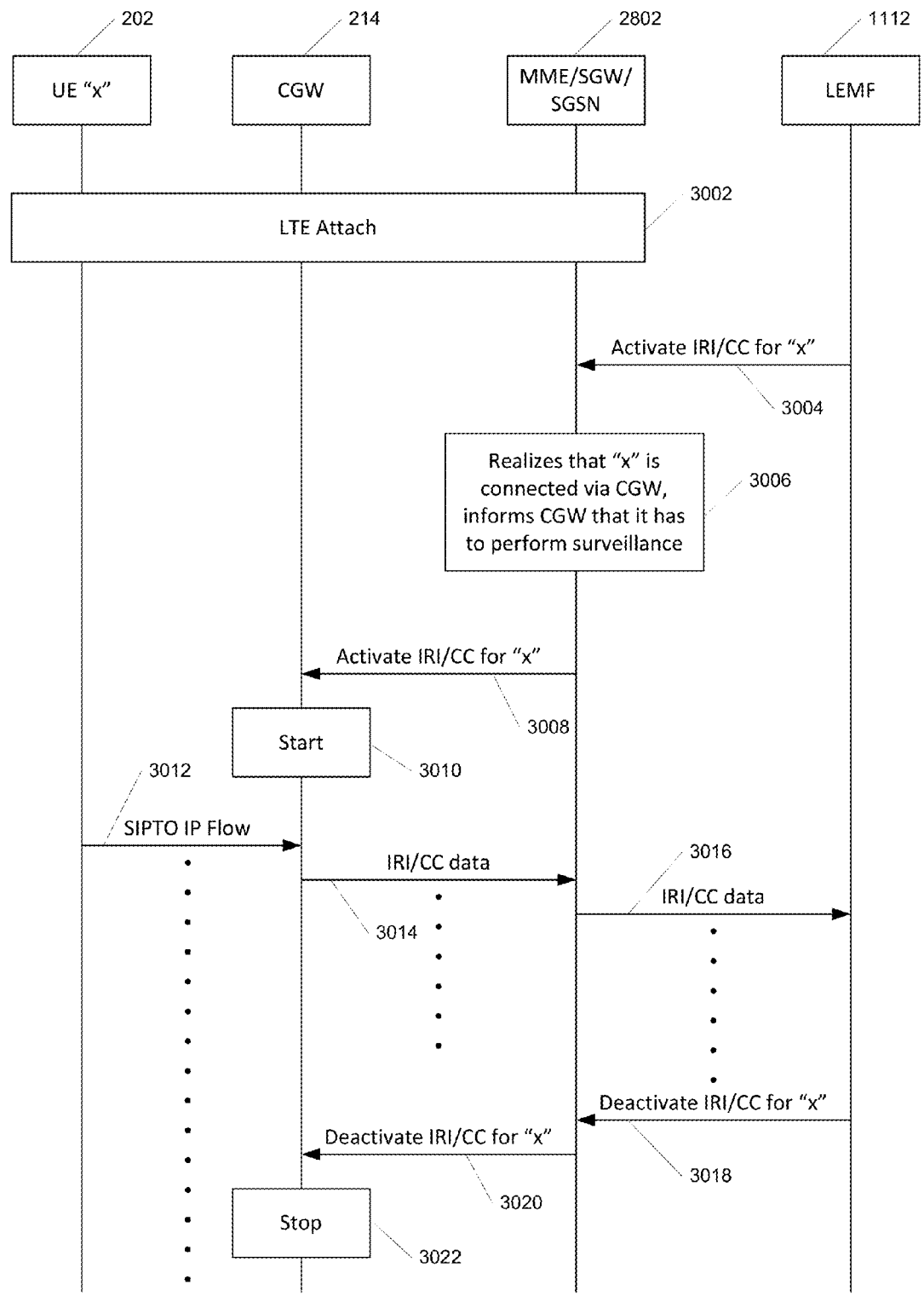
FIG. 30 is an example message chart of the LI interface depicted in FIG. 29.

FIG. 30 is an example message chart illustrating LI in accordance with the implementation of the architecture described herein with reference to FIG. 29. The MME and/or the SGW may notify the CGW when the target of surveillance has connected to the EPC via the CGW. This may obviate the targeted user device from informing the CGW of its presence or the CGW decoding signaling between the H(e)NB and the MME in order to learn the identity of the targeted user device. While the ICE and/or INE components resident in the EPC are illustrated as an MME, SGSN and SGW, the ICE and/or INE components resident in the EPC may be an INE and/or ICE devices within the core network. As illustrated in FIG. 30, at 3002, a UE (e.g., UE x 202) may perform an LTE attach procedure. At 3004, the LEMF 1112 may send an activate signal to MME/SGW/SGSN 2802 to activate an LI (e.g., IRI or CC) for the UE x. At 3006, the MME/SGW/SGSN 2802 may realize that the UE x may be connected via CGW. The MME/SGW/SGSN 2802 may inform the CGW 214 to perform surveillance. At 3008, the MME/SGW/SGSN 2802 may forward the activate signal to the CGW. At 3010, the CGW 214 may start monitoring the UE x for IRI and/or CC data. At 3014, the CGW 214 may report to the MME/SGW/SGSN 2802, the SIPTO IP traffic 3012. At 3016, the MME/SGW/SGSN 2802 may forward the IRI and/or CC data to the request LEMF 1112. At 3018, the LEMF may send a deactivate IRI and/or CC signal to the MME/SGW/SGSN 2802. At 3020, the MME/SGW/SGSN 2802 may forward the deactivate signal to the CGW 214. At 3022, the CGW may stop monitoring the UE x for IRI and/or CC data.

Figure 31:
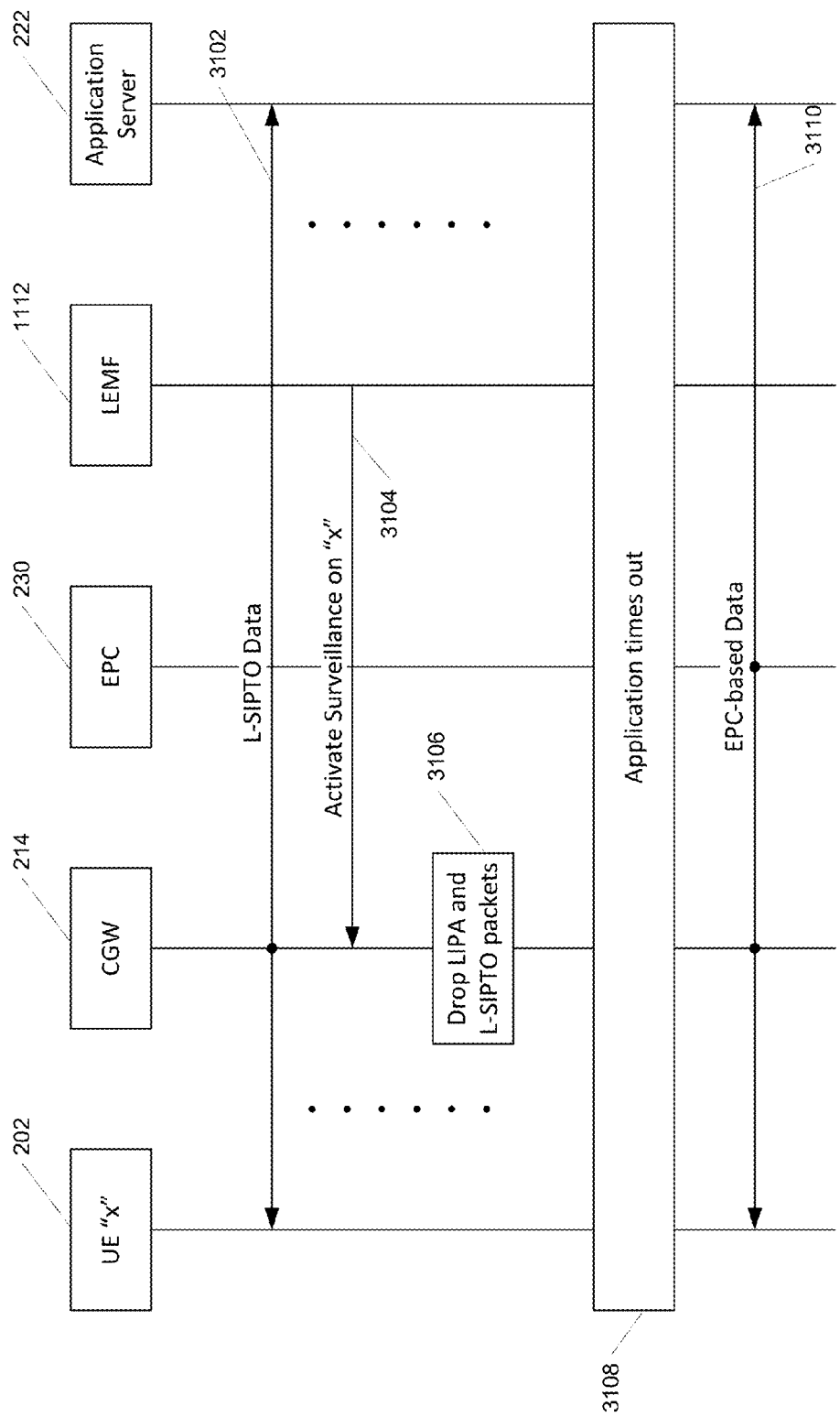
FIG. 31 is an example message chart of an LI architecture that may be configured to drop one or more local routing internet protocol (IP) flows upon activation of LI.

FIG. 31 is an example message chart illustrating an implementation of an LI architecture in which the CGW may drop locally routed IP flows (e.g., LIPA and/or L-SIPTO IP flows) if surveillance is enabled by the LEMF. As illustrated in FIG. 31, the LEMF 1112 may directly inform the CGW to perform surveillance or a command from the LEMF 1112 may be routed through one or more EPC elements. The CGW may be configured such that upon receipt of the command, the CGW may drop LIPA and/or L-SIPTO IP packets for the target of surveillance. This may cause the application client within the device and/or the application server to time-out and re-establish the connection. The CGW may not perform LIPA or L-SIPTO on re-established IP flows. The CGW may have no IRI events and/or CC to report to the LEMF. As illustrated in FIG. 31, at 3102, L-SIPTO data may be flowing between a UE (e.g., UE x 202) and an application server (e.g., application server 222). At 3104, the LEMF 1112, e.g., via EPC 230, may send an activate surveillance signal (e.g., for the UE x 202) to the CGW 214. At 3106, the CGW 214 may drop LIPA and/or L-SIPTO packets. At 3108, the session between the UE x 202 and the application server 222 may timeout. At 3110, the UE x 202 via EPC 230 may re-establish the session to the application server 222.

Figure 32:
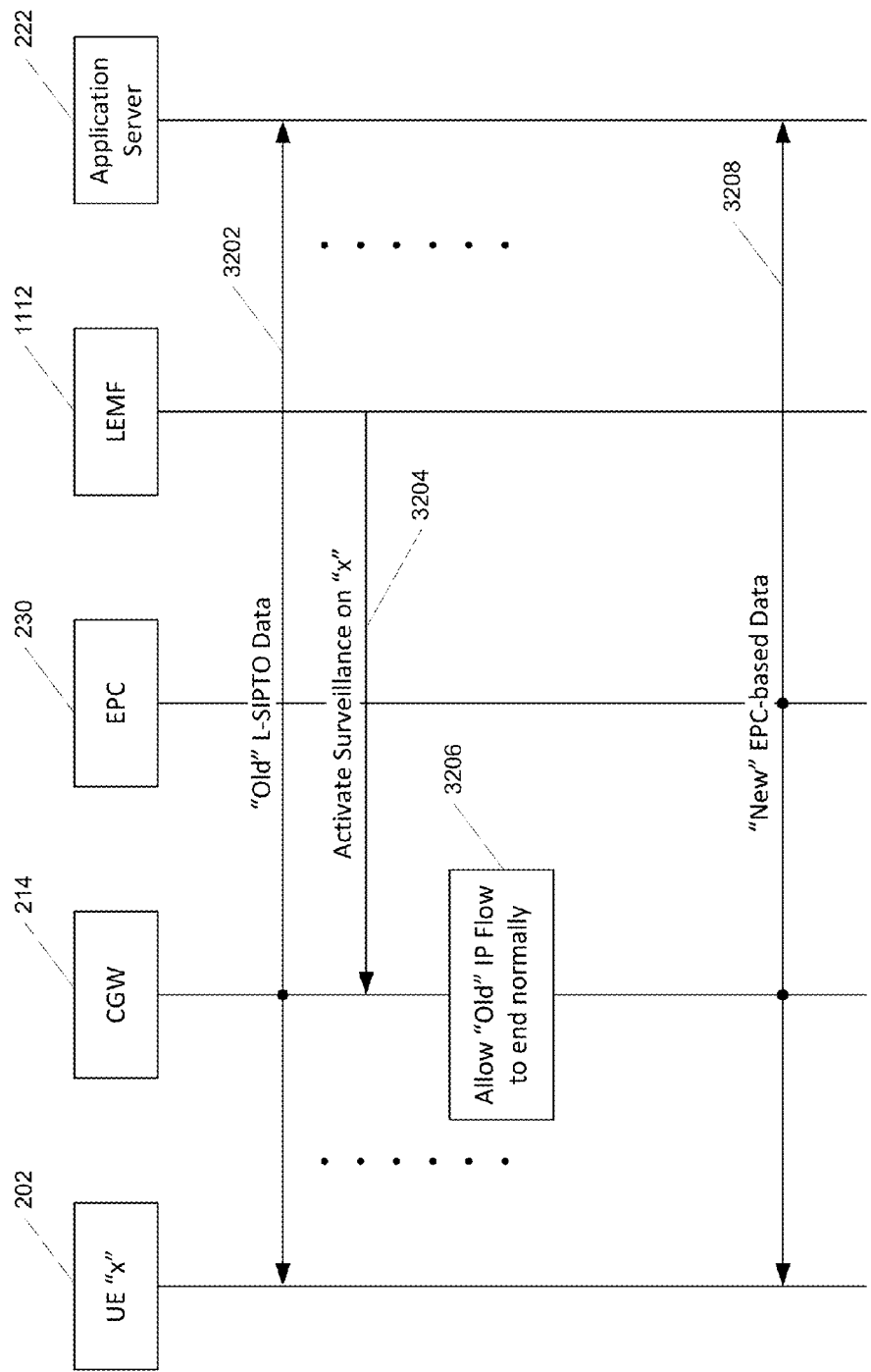
FIG. 32 is an example message chart of an LI architecture that may be configured to drop select local routing internet protocol (IP) flows upon activation of LI.

FIG. 31 is an example message chart illustrating an implementation of an alternative LI architecture in which the CGW may allow established IP Flows to complete when surveillance is activated by the LEMF (e.g., either directly or indirectly). The established IP flows may be allowed to conclude using L-SIPTO and/or LIPA. IP flows (e.g., L-SIPTO and/or LIPA IP flows) generated after surveillance is activated may be routed into the EPC. As illustrated in FIG. 32, at 3202, an L-SIPTO session between a UE x 202 and an application server 222 may exist. At 3204, the LEMF 1112, e.g., via EPC 230, may send an activate surveillance signal (e.g., for the UE x 202) to the CGW 214. At 3206, the CGW 214 may allow the existing L-SIPTO session between the UE x 202 and the application server 222 to end normally. At 3108, a new EPC-based session may be created between the UE x 202 and the application server 222.

In accordance with an implementation of an LI architecture, the CGW may be the target of surveillance. Each user device that connects to the CGW may be targeted for LI. This LI architecture may be implemented in combination with any of the above-described LI architectures, for instance to facilitate CGW-wide surveillance. The X1-1 interface may be modified so that the CGW may be informed that the CGW is to perform surveillance on a plurality of devices, for instance each device that connects to the CGW. The X1-1 Command message may include one or more of the following fields: Message Type, Target CGW, Action, or Nonce. A Target CGW field may be used to indicate to the CGW that it is the target of surveillance. The Target CGW field may indicate a unique ID that may act as an IMSI for the CGW, or may indicate a combination of other parameters that uniquely identify a CGW, for instance the geographic location of the CGW, an IP address of the CGW, a location of the CGW with respect to other cells, etc.

Figure 33:
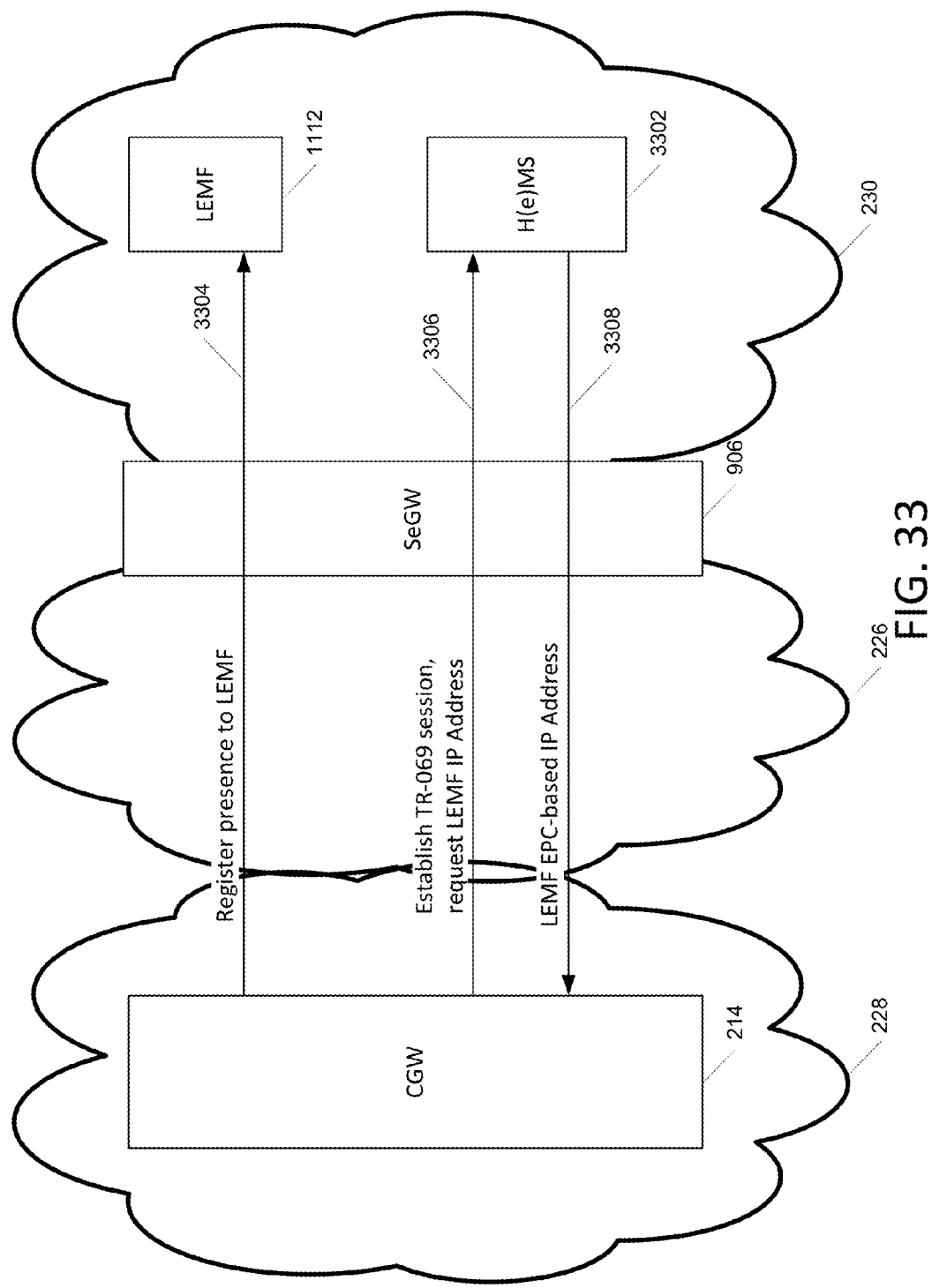
FIG. 33 is a system diagram illustrating an example of an LEMF discovery architecture.

FIG. 33 illustrates an example LEMF discovery architecture that may be employed in an architecture that may effectuate LI for local traffic routed by a local gateway (e.g., a CGW 214) that is associated with, but not resident in, a core network (e.g., an EPC 230). As illustrated in FIG. 33, the CGW 214 may discover the LEMF 1112 in the EPC 230. For example, the CGW 214 may discover the LEMF 1112 as part of a TR-069 session that may be established between the CGW 214 and a H(e)NB Management System (H(e)MS). As part of a TR-069 session, the CGW 214, e.g., via 3306 may request for LEMF IP address. The H(e)MS 3302 may inform the CGW 214, e.g., via 3308, of the IP address of the LEMF that may be responsible for LI. After the CGW 214 learns the IP address of the LEMF 1112, the CGW 214 may register to the LEMF 1112 (e.g., via 3304). The registration may alert the LEMF 1112 to the presence of the CGW 214. As part of this registration, the CGW 214 may provide the LEMF 1112 with an EPC-based IP address of the CGW, for instance, so that the LEMF 1112 and the CGW 214 may establish the X1-1, X2, and/or X3 interfaces.

Figure 34:
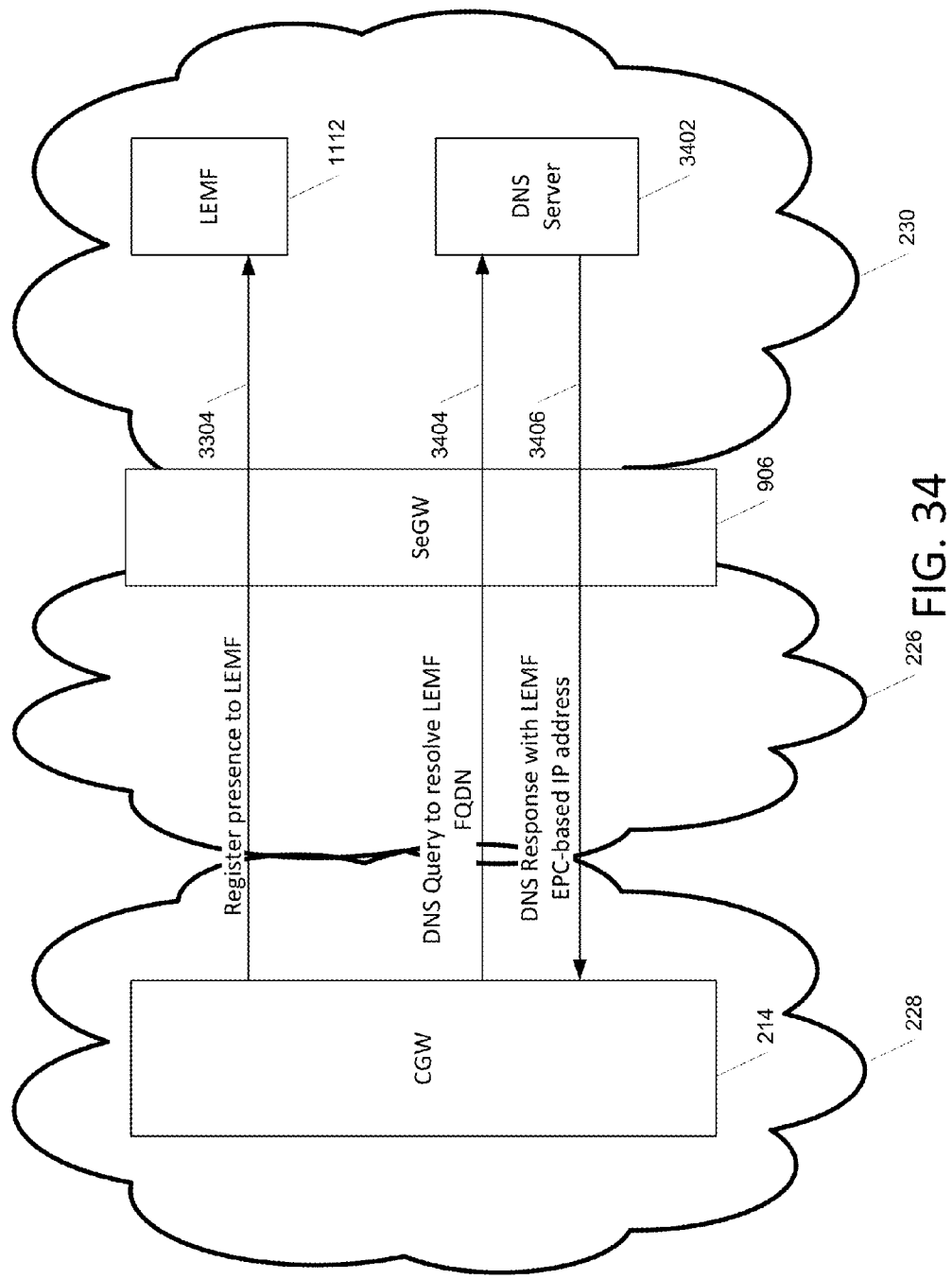
FIG. 34 is a system diagram illustrating an example of an LEMF discovery architecture.

FIG. 34 illustrates an example LEMF discovery architecture that may be employed to effectuate LI for local traffic routed by a local gateway (e.g., a CGW 214) that is associated with, but not resident in, a core network (e.g., an EPC 230). As illustrated in FIG. 34, the LEMF 1112 may inform a DNS Server 3402 located within the EPC 230 of an EPC-based IP address of the LEMF 1112. After the CGW 214 has connected to the EPC 230 (e.g., via SeGW 960), it may resolve the LEMF FQDN with the DNS Server 3402 located within the EPC 230. The DNS Server 3402 may provide the EPC-based IP address of the LEMF 1112. After this resolution, the CGW 214 may register itself with the LEMF 1112, which may inform the LEMF that the CGW 214 may operate as an ICE and/or INE. As part of this registration, the CGW 214 may provide the LEMF 1112 with an EPC-based IP address of the CGW 214, for instance so that the LEMF and the CGW may establish the X1-1, X2, and/or X3 interfaces.

Figure 35:
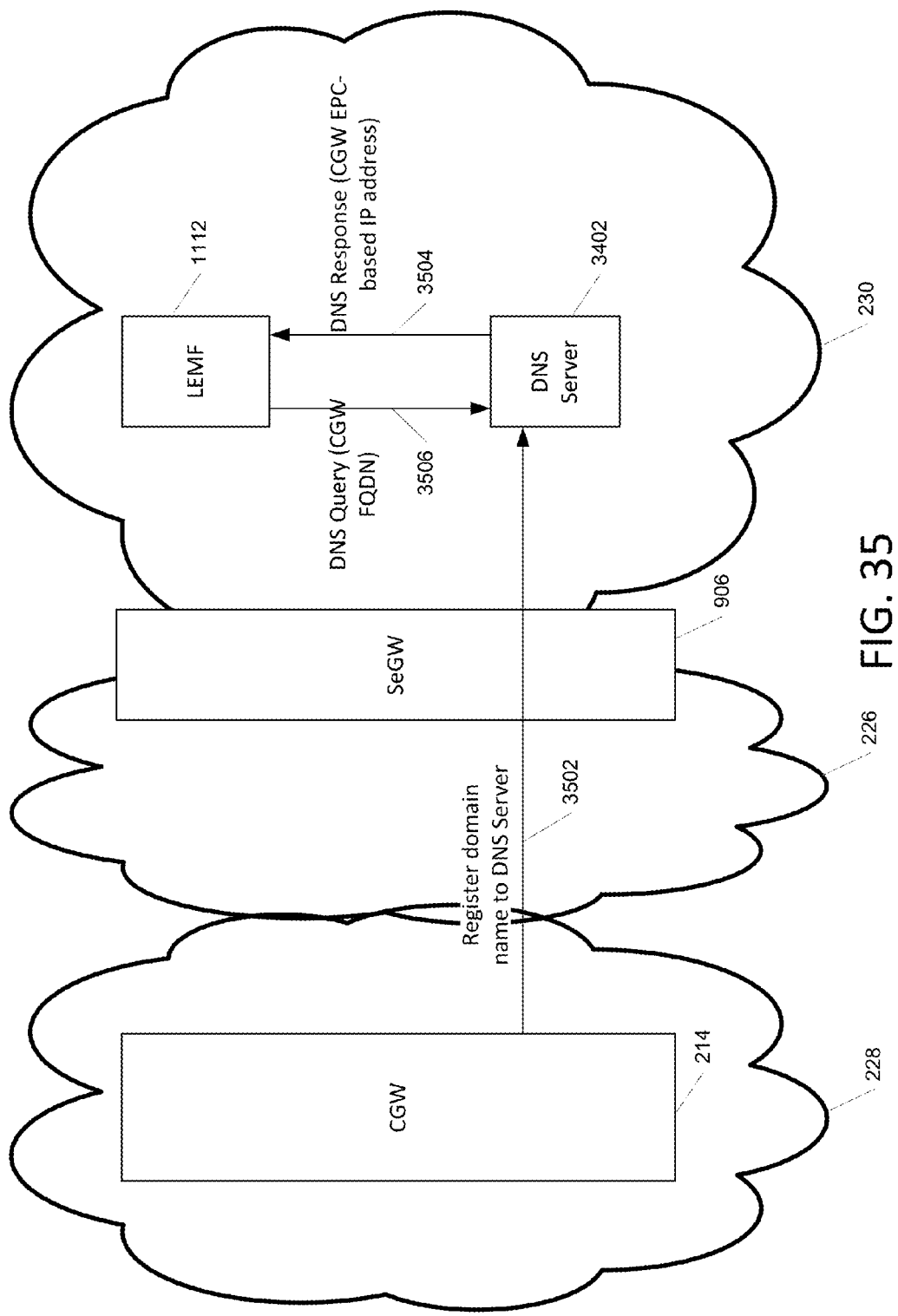
FIG. 35 is a system diagram illustrating an example of an LEMF discovery architecture.

FIG. 35 illustrates an example LEMF discovery architecture that may be employed to effectuate LI for local traffic routed by a local gateway (e.g., a CGW 214) that is associated with, but not resident in, a core network (e.g., an EPC 230). After the CGW 214 has connected to the EPC 230, the CGW 214 may inform a DNS Server 3402 located within the EPC network 230 of an EPC-based IP address of the CGW 214. The LEMF 1112 may attempt (e.g., periodically) to resolve the CGW FQDN with the DNS Server 3402 located within the EPC 230. After the CGW 214 has registered with the DNS Server 3402, the CGW FQDN may resolve to the EPC-based IP address of the CGW 214 and the LEMF 1112 may treat the CGW 214 as an ICE and/or INE for the purposes of LI.

Figure 36:
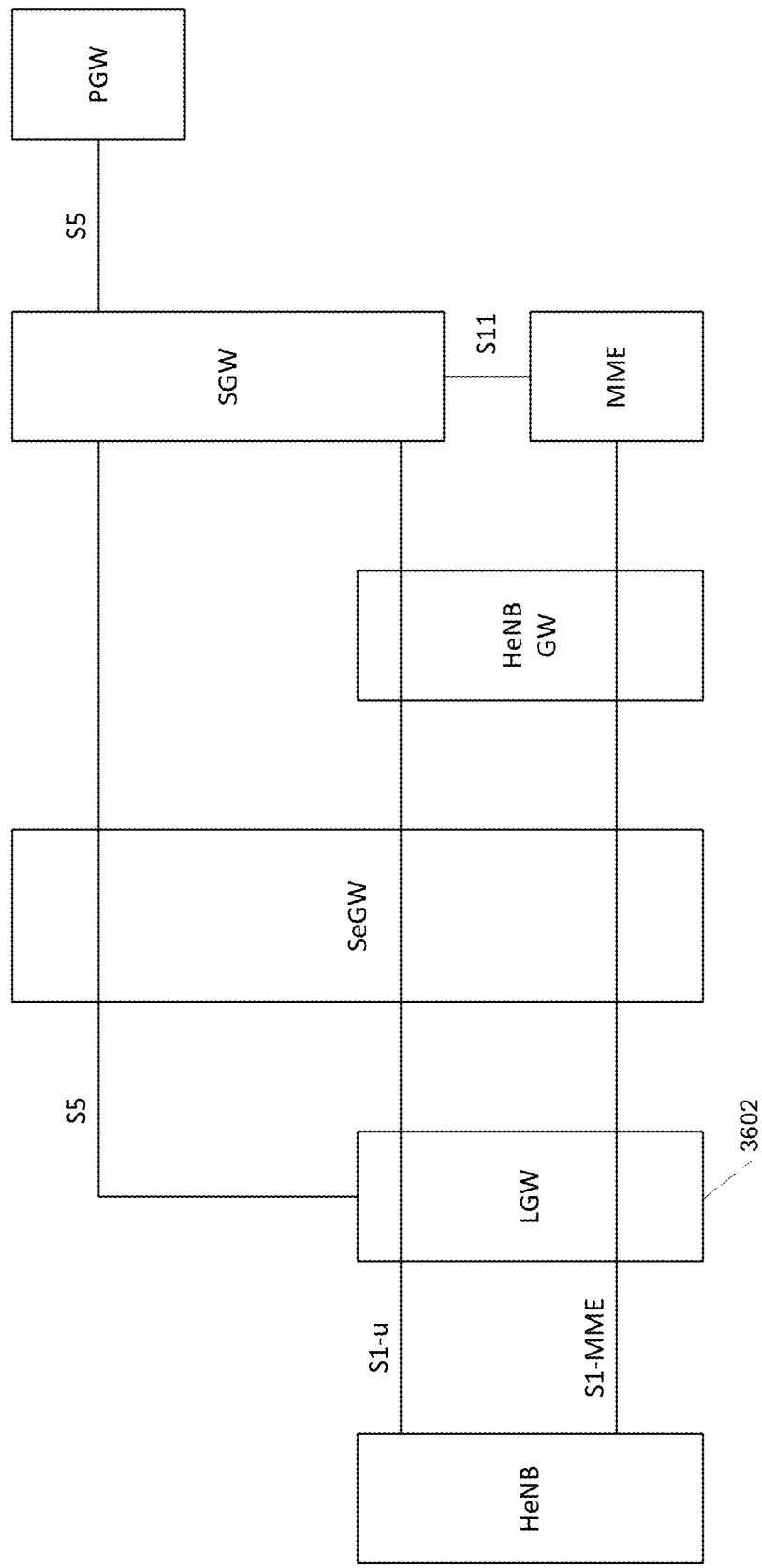
FIG. 36 is an example architecture for a gateway that is associated with, but not resident in, a core network.
Figure 37:
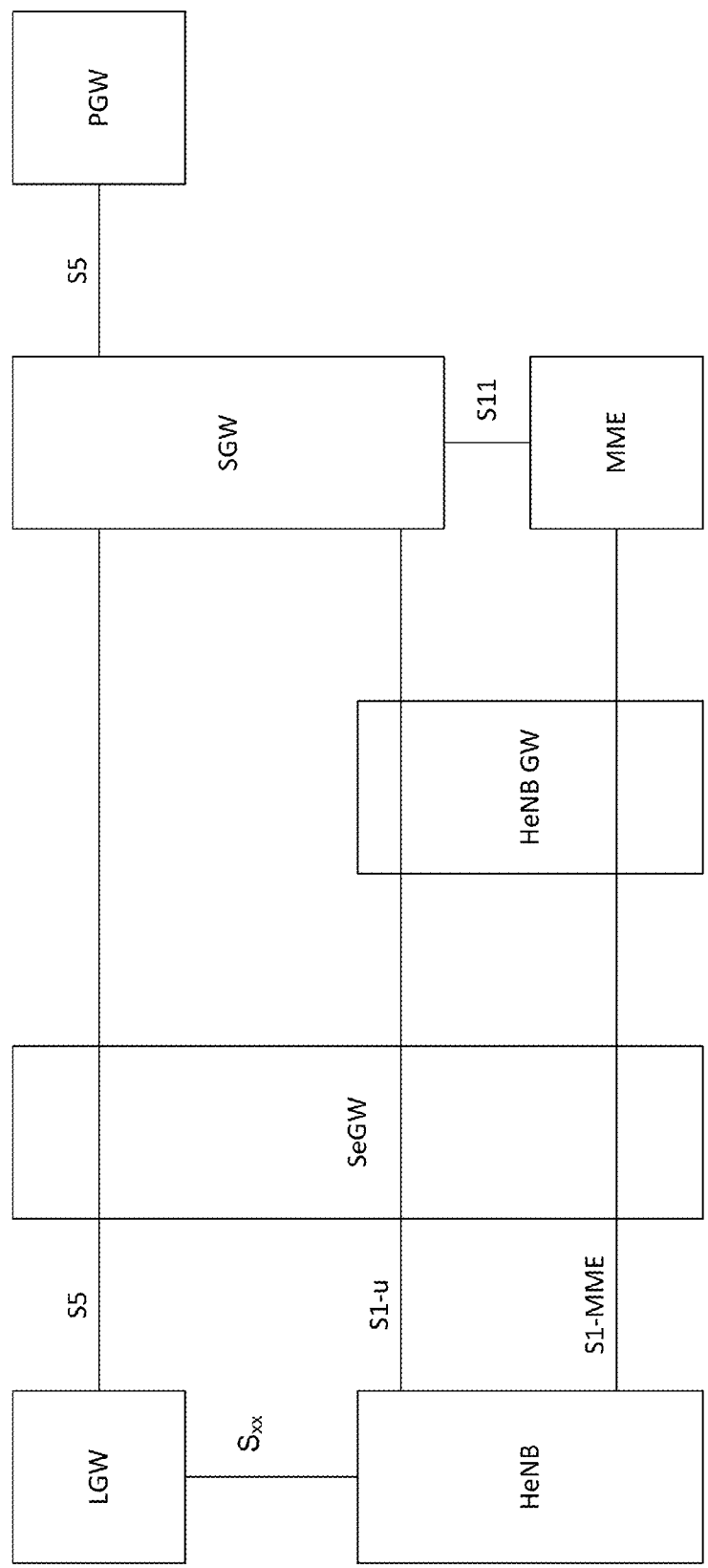
FIG. 37 is another example architecture for a gateway that is associated with, but not resident in, a core network.

FIGS. 36 and 37 illustrate example architectures, respectively, of local gateways (e.g., LGWs) that are associated with, but not resident in, a core network. As illustrated in FIG. 36, the LGW 3602 may be configured as an inline LGW. The architectures illustrated in FIGS. 36 and 37 may operate substantially equivalently to each other with respect to LI of L-SIPTO and/or LIPA traffic at a local gateway (e.g., a LGW, CGW, or the like).

One or more local gateways configured in accordance with the architectures illustrated in FIGS. 36 and/or 37 may be implemented as respective local gateways in accordance with the architectures described herein for providing LI for local traffic routed by a local gateway that is associated with, but not resident in, a core network.

Although features and elements are described above in particular combinations, one of ordinary skill in the art will appreciate that each feature or element may be used alone or in a combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or a host computer. Features and/or elements described herein in accordance with one or more example embodiments may be used in combination with features and/or elements described herein in accordance with one or more other example embodiments.

What is claimed is:

1. A method of reporting information associated with a device, the method comprising:
    a gateway device intercepting a communication associated with the device;
    the gateway device routing the communication such that the communication bypasses a mobile core network;
    the gateway device sending a registration message to a first mobile core network node for delivery to a second mobile core network node, wherein the registration message comprises a gateway device identity and an indication to register the gateway device, and wherein the registration message is sent via a first interface;
    the gateway device receiving an activate signal from the second mobile core network node via the first mobile core network node; and
    the gateway device reporting, based on the activate signal, information associated with the bypassed communication, via a second interface, to the first mobile core network node for delivery to the second mobile core network node.

2. The method of claim 1, wherein the reporting is performed by a gateway that is located outside the mobile core network.

3. The method of claim 1, wherein the first mobile core network node is a secure gateway (SeGW), and the second mobile core network node is a law enforcement management function (LEMF) node.

4. The method of claim 1, wherein the information associated with the bypassed communication is reported via an internet protocol security (IPsec) tunnel.

5. The method of claim 1, further comprising:
    the gateway device receiving a request for a surveillance status of the device; and
    the gateway device sending a response message, wherein the response message indicates the surveillance status of the device.

6. The method of claim 1, wherein the first interface is a lawful interception (LI) interface and the second interface is an X3 interface.

7. The method of claim 1, further comprising:
    receiving a deactivate surveillance signal for the device; and
    stopping further reporting.

8. The method of claim 1, comprising sending a de-registration message over the first interface.

9. The method of claim 1, wherein the registration message comprises one or more of a target international mobile subscriber (IMSI), an action, or a gateway identity.

10. The method of claim 1, further comprising:
    the gateway device sending a request for identity of the second mobile core network node; and
    the gateway device receiving a response including the requested identity of the second mobile core network node.

11. A gateway device comprising:
    a first interface and a second interface; and
    a processor configured to:
        intercept a communication associated with a device;
        route the communication such that the communication bypasses a mobile core network;
        send a registration message to a first mobile core network node for delivery to a second mobile core network node, wherein the registration message comprises a gateway device identity and an indication to register the gateway device, and wherein the reaistration message is sent via the first interface;
        receive an activate signal from the second mobile core network node via the first mobile core network node; and
        report, based on the activate signal, information associated with the bypassed communication, via the second interface, to the first mobile core network node for delivery to the second mobile core network node.

12. The gateway device of claim 11, wherein the gateway device is located outside the mobile core network.

13. The gateway device of claim 11, wherein the first mobile core network node is a secure gateway (SeGW), and the second mobile core network node is a law enforcement management function (LEMF) node.

14. The gateway device of claim 11, wherein the information associated with the bypassed communication is reported via an internet protocol security (IPsec) tunnel.

15. The gateway device of claim 11, wherein the processor is further configured to:
    receive a request for a surveillance status of the device; and
    send a response message, wherein the response message indicates the surveillance status of the device.

16. The gateway device of claim 11, wherein the first interface is a lawful interception (LI) interface and the second interface is an X3 interface.

17. The gateway device of claim 11, wherein the processor is further configured to:
   receive a deactivate surveillance signal for the device; and
   stop further reporting.

18. The gateway device of claim 11, wherein the processor is further configured to send a de-registration message over the first interface.

19. The gateway device of claim 11, wherein the registration message comprises one or more of a target international mobile subscriber (IMSI), an action, or a gateway identity.

20. The gateway device of claim 11, wherein the processor is further configured to:
   send a request for identity of the second mobile core network node; and
   receive a response including the requested identity of the second mobile core network node.

* * * * *